US012251949B2

(12) United States Patent
Takai et al.

(10) Patent No.: US 12,251,949 B2
(45) Date of Patent: Mar. 18, 2025

(54) PRINTING SYSTEM, OPERATION SYSTEM, PRINTER, AND TERMINAL

(71) Applicant: FUJIFILM Corporation, Tokyo (JP)

(72) Inventors: Ryuichiro Takai, Tokyo (JP); Saki Takeyama, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/460,301

(22) Filed: Sep. 1, 2023

(65) Prior Publication Data

US 2023/0415495 A1 Dec. 28, 2023

Related U.S. Application Data

(62) Division of application No. 16/810,415, filed on Mar. 5, 2020, now Pat. No. 11,858,283.

(30) Foreign Application Priority Data

Mar. 27, 2019 (JP) ................................. 2019-060820

(51) Int. Cl.
*B41J 3/44* (2006.01)
*B41J 3/36* (2006.01)
(Continued)

(52) U.S. Cl.
CPC ................ *B41J 3/445* (2013.01); *B41J 3/36* (2013.01); *B41J 3/4075* (2013.01); *G06F 1/1694* (2013.01); *G06F 1/3206* (2013.01)

(58) Field of Classification Search
CPC .. B41J 3/36; B41J 3/445; B41J 3/4075; G06F 1/3206; G06F 1/1694
See application file for complete search history.

(56) References Cited

U.S. PATENT DOCUMENTS 8,885,196 B2 11/2014 Tsuji
2006/0061659 A1 3/2006 Niwa
(Continued)

FOREIGN PATENT DOCUMENTS

CN 107092938 A 8/2017
CN 108369491 A 8/2018
(Continued)

OTHER PUBLICATIONS

An Office Action; "Decision of Refusal," mailed by the Japanese Patent Office on Jan. 29, 2024, which corresponds to Japanese Patent Application No. 2022-152168 and is related to U.S. Appl. No. 18/460,301; with English language translation.
(Continued)

*Primary Examiner* — Christopher E Mahoney
*Assistant Examiner* — Marissa Ferguson-Samreth
(74) *Attorney, Agent, or Firm* — Studebaker & Brackett PC

(57) ABSTRACT

A printing system includes a printer and a terminal capable of wirelessly communicating with each other. The printer include a portable printer main body, a movement detection unit that detects a movement of the printer main body, and a first processor configured to transmit a first control signal to the terminal in a case where a first movement is detected by the movement detection unit, and transmit a second control signal to the terminal in a case where a second movement is detected by the movement detection unit. The terminal includes a display unit, a second processor configured to receive the control signals from the printer; and display a first operation screen on the display unit in a case where the first control signal is received, and display a second operation screen on the display unit in a case where the second control signal is received.

18 Claims, 42 Drawing Sheets

(51) Int. Cl.
    *B41J 3/407*      (2006.01)
    *G06F 1/16*       (2006.01)
    *G06F 1/3206*     (2019.01)

(56) References Cited

U.S. PATENT DOCUMENTS

| | | |
|---|---|---|
| 2011/0298700 A1 | 12/2011 | Ito et al. |
| 2012/0127319 A1 | 5/2012 | Rao et al. |
| 2014/0313356 A1 | 10/2014 | Sakamoto et al. |
| 2016/0057365 A1 | 2/2016 | Uosawa et al. |
| 2016/0239244 A1 | 8/2016 | Kanakubo |
| 2016/0335981 A1 | 11/2016 | Koo et al. |
| 2017/0243091 A1 | 8/2017 | Yamada |
| 2017/0243094 A1 | 8/2017 | Yamada |
| 2017/0251138 A1 | 8/2017 | Yoon et al. |
| 2018/0173471 A1 | 6/2018 | Kitagawa et al. |
| 2018/0359372 A1 | 12/2018 | Tsuji |
| 2019/0075212 A1 | 3/2019 | Yokoyama |

FOREIGN PATENT DOCUMENTS

| | | | |
|---|---|---|---|
| CN | 109462715 A | | 3/2019 |
| EP | 3208705 A1 | | 8/2017 |
| JP | 2001-018491 A | | 1/2001 |
| JP | 2004-112007 A | | 4/2004 |
| JP | 2006-087049 A | | 3/2006 |
| JP | 2008-168580 A | | 7/2008 |
| JP | 2009-063663 A | | 3/2009 |
| JP | 2009-224918 A | | 10/2009 |
| JP | 2011172094 A | * | 9/2011 |
| JP | 2011-253493 A | | 12/2011 |
| JP | 2013157878 A | * | 8/2013 |
| JP | 2014-143501 A | | 8/2014 |
| JP | 2014-149860 A | | 8/2014 |
| JP | 2014-179956 A | | 9/2014 |
| JP | 2015-055902 A | | 3/2015 |
| JP | 2016-046633 A | | 4/2016 |
| JP | 2016-151950 A | | 8/2016 |
| JP | 2017-118337 A | | 6/2017 |
| JP | 2017-144668 A | | 8/2017 |
| JP | 2017-165003 A | | 9/2017 |
| JP | 2017-175294 A | | 9/2017 |
| JP | 2018-014569 A | | 1/2018 |
| WO | 2017/061083 A1 | | 4/2017 |

OTHER PUBLICATIONS

The extended European search report issued by the European Patent Office on Aug. 7, 2020, which corresponds to European Patent Application No. 20160508.6-1203 and is related to U.S. Appl. No. 16/810,415.

An Office Action; "Notice of Reasons for Refusal," mailed by the Japanese Patent Office on Feb. 8, 2022, which corresponds to Japanese Patent Application No. 2019-060820 and is related to U.S. Appl. No. 16/810,415 with English language translation.

An Office Action mailed by the Japanese Patent Office on Oct. 2, 2023, which corresponds to Japanese Patent Application No. 2022-152168 and is related to U.S. Appl. No. 18/460,301.

An Office Action mailed by China National Intellectual Property Administration on Apr. 11, 2024, which corresponds to Chinese Patent Application No. 202010159696.8 and is related to U.S. Appl. No. 18/460,301; with English language translation.

"Notice of Reasons for Refusal" Office Action issued in JP 2024-07179; mailed by the Japanese Patent Office on Feb. 3, 2025. (US 2014/0313356 A1, which is a counterpart to the single document cited as material to patentability in the Japanese Office Action, serves as a concise explanation of the relevance.).

"Notice of Reasons for Refusal" Office Action issued in JP 2024-071719; mailed by the Japanese Patent Office on Feb. 3, 2025; with an English language translation.

* cited by examiner

FIG. 1
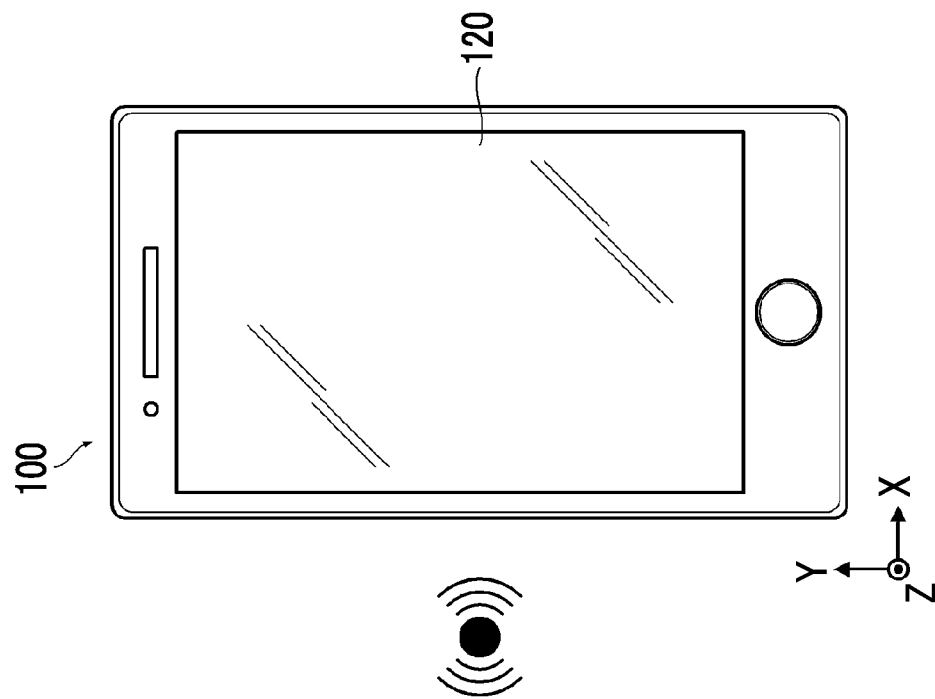
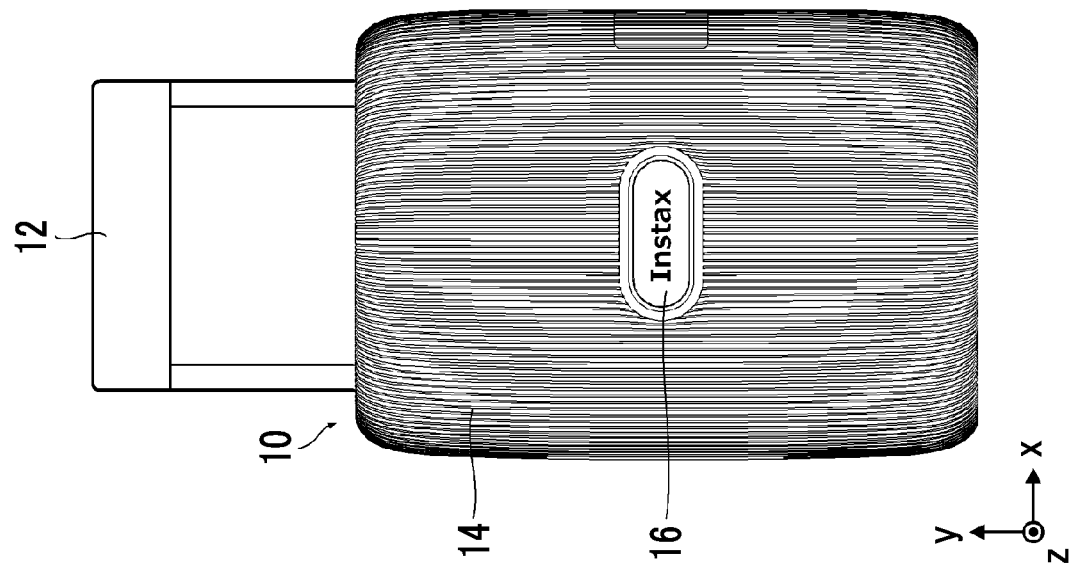

PRINTING SYSTEM, OPERATION SYSTEM, PRINTER, AND TERMINAL

CROSS-REFERENCE TO RELATED APPLICATIONS

The present application is a Divisional of U.S. patent application Ser. No. 16/810,415, filed on Mar. 5, 2020, which claims priority under 35 U.S.C. § 119 to Japanese Patent Application No. 2019-060820, filed on Mar. 27, 2019. Each of the above application is hereby expressly incorporated by reference, in its entirety, into the present application.

BACKGROUND OF THE INVENTION

1. Field of the Invention

The present invention relates to a printing system, an operation system, a printer, and a terminal, and particularly, to a printing system comprising a printer and a terminal capable of wirelessly communicating with each other an operation system, a printer, and a terminal.

2. Description of the Related Art

JP2017-144668A describes a technology for detecting an installation posture of a printer in a printer having a keyboard mounted thereon and automatically switching an operation mode of the printer according to the detected installation posture. Specifically, in a case where the printer is horizontally placed, the printer is set to a mode in which information input from the keyboard is printed, and in a case where the printer is vertically placed, the printer is set to a mode in which print data is wirelessly received from a portable terminal such as a smartphone.

SUMMARY OF THE INVENTION

The performance of the portable terminal such as the smartphone has been improved year by year, and the number of executable functions has been increased. In a relationship with the printer, it is possible to process or generate data to be printed in addition to printing stored data.

However, as the number of executable functions is increased, since the amount of information to be displayed on a screen of the portable terminal is also increased, there is a disadvantage that operability is degraded.

The present invention has been made in view of such circumstances, and an object of the present invention is to provide a printing system, an operation system, a printer, and a terminal with favorable operability.

(1) There is provided a printing system that comprises a printer and a terminal capable of wirelessly communicating with each other, and wirelessly transmits data to the printer from the terminal to cause the printer to perform printing. The printer comprises a portable printer main body, a movement detection unit that detects a movement of the printer main body, and a control signal transmission unit that transmits a first control signal to the terminal in a case where a first movement is detected by the movement detection unit, and transmits a second control signal to the terminal in a case where a second movement is detected by the movement detection unit. The terminal comprises a display unit, a display controller that controls display on the display unit, and a control signal reception unit that receives the control signal from the printer. The display controller displays a first operation screen on the display unit in a case where the first control signal is received by the control signal reception unit, and displays a second operation screen on the display unit in a case where the second control signal is received by the control signal reception unit.

(2) In the printing system according to (1), in a case where the printer main body is capable of being horizontally and vertically placed, the first movement is a movement of horizontally placing the printer main body, and the second movement is a movement of vertically placing the printer main body.

(3) In the printing system according to (1) or (2), the printer further comprises a status information acquisition unit that acquires status information of the printer, and a status information transmission unit that transmits the status information acquired by the status information acquisition unit to the terminal in a case where a third movement is detected by the movement detection unit. The terminal further comprises a status information reception unit that receives the status information from the printer, and the display controller displays the status information of the printer on the display unit in a case where the status information is received by the status information reception unit.

(4) In the printing system according to (3), information of the number of printable sheets and information of state of charge of a battery are included in the status information of the printer.

(5) In the printing system according to (3), the third movement is a movement of lifting the printer.

(6) In the printing system according to any one of (1) to (5), the printer further comprises a print image storage unit that stores a printed image, and a print controller that controls printing of the printer reprints a previously printed image in a case where a fourth movement is detected by the movement detection unit.

(7) In the printing system according to any one of (1) to (5), the printer further comprises a print image storage unit that stores a printed image, and a print controller that controls printing of the printer reprints a previously printed image in a case where a fourth movement is detected by the movement detection unit and an operation member provided at the printer main body is operated.

(8) In the printing system according to (6) or (7), the fourth movement includes a movement of directing a discharge port of a medium downward or a movement of tilting the discharge port downward for a predetermined time or more.

(9) In the printing system according to any one of (1) to (8), the printer further comprises a power controller that turns off a power supply in a case where a fifth movement is detected by the movement detection unit.

(10) In the printing system according to (9), the fifth movement is a movement of directing a power button provided at the printer main body downward for a predetermined time or more.

(11) In the printing system according to any one of (1) to (10), the printer further comprises a light emitting unit, and a light emission controller that controls light emission of the light emitting unit, and in a case where a specific movement is detected by the movement detection unit, the light emission controller causes the light emitting unit to emit light in a light emission color and/or a light emission pattern corresponding to the detected movement.

(12) In the printing system according to any one of (1) to (11), the printer further comprises a mode setting unit that sets a mode, and an operation signal transmission unit that transmits an operation signal corresponding to the movement detected by the movement detection unit and/or an operation of an operation member provided at the printer to the terminal in a case where a remote control mode is set by the mode setting unit, and the terminal further comprises an operation signal reception unit that receives the operation signal from the printer, and a terminal controller that controls an operation of the terminal according to the operation signal received by the operation signal reception unit.

(13) In the printing system according to (12), the terminal further comprises a camera unit, and the terminal controller controls an operation of the camera unit according to the operation signal.

(14) In the printing system according to (13), in a case where a sixth movement is detected by the movement detection unit and/or in a case where the operation member provide at the printer is operated, the operation signal transmission unit transmits an operation signal for operating a release of the camera unit, and the terminal controller controls an operation of the release of the camera unit according to the operation signal.

(15) In the printing system according to (13) or (14), in a case where a seventh movement is detected by the movement detection unit and/or in a case where the operation member provided at the printer is operated, the operation signal transmission unit transmits an operation signal for operating a zoom of the camera unit, and the terminal controller controls an operation of a zoom of the camera unit according to the operation signal.

(16) In the printing system according to (15), the seventh movement is a movement of tilting the printer main body.

(17) In the printing system according to any one of (1) to (16), the movement detection unit includes a combination of a plurality of sensors including an acceleration sensor and a gyro sensor.

(18) There is provided an operation system comprising a terminal comprising a camera unit, and a portable electronic device capable of wirelessly communicating with the terminal. The portable electronic device comprises a movement detection unit that detects a movement of a main body, and an operation signal transmission unit that transmits an operation signal corresponding to the movement detected by the movement detection unit to the terminal. The terminal comprises an operation signal reception unit that receives the operation signal from the portable electronic device, and a terminal controller that controls an operation of the camera unit according to the operation signal received by the operation signal reception unit.

(19) In the operation system according to (18), the movement detected by the movement detection unit is a movement tilting the main body, and the terminal controller controls an operation of a zoom of the camera unit according to the operation signal received by the operation signal reception unit.

(20) In the operation system according to (18) or (19), the terminal controller further controls an operation of a release of the camera unit according to the operation signal received by the operation signal reception unit.

(21) In the operation system according to (18) or (19), the operation signal transmission unit further transmits an operation signal corresponding to an operation of an operation member provided at the main body to the terminal, and the terminal controller controls an operation of a release of the camera unit according to the operation signal based on the operation of the operation member.

(22) There is provided a printer that receives data wirelessly transmitted from a terminal and performs printing. The printer comprises a portable printer main body, a movement detection unit that detects a movement of the printer main body, and a control signal transmission unit that transmits, to the terminal, a first control signal for displaying a first operation screen on a display unit of the terminal in a case where a first movement is detected by the movement detection unit, and transmits, to the terminal, a second control signal for displaying a second operation screen on the display unit of the terminal in a case where a second movement is detected by the movement detection unit.

(23) There is provided a terminal that wirelessly transmits data to a printer and causes the printer to perform printing. The terminal comprises a display unit, a display controller that controls display on the display unit, and a control signal reception unit that receives a control signal corresponding to a movement of a printer main body from the printer. The display controller displays a first operation screen on the display unit in a case where a first control signal corresponding to a first movement of the printer main body is received by the control signal reception unit, and displays a second operation screen on the display unit in a case where a second control signal corresponding to a second movement of the printer main body is received by the control signal reception unit.

According to the present invention, it is possible to provide a printing system, an operation system, a printer, and a terminal with favorable operability.

BRIEF DESCRIPTION OF THE DRAWINGS

FIG. 1 is a diagram showing an example of a system configuration of a printing system.

DESCRIPTION OF THE PREFERRED EMBODIMENTS

Hereinafter, a preferred embodiment of the present invention will be described with reference to the accompanying drawings.

First Embodiment

Printing System

FIG. 1 is a diagram showing an example of a system configuration of a printing system of the present embodiment.

As shown in this diagram, the printing system according to the present embodiment is a system that comprises a printer 10 and a smartphone 100 that can wirelessly communicate with each other, and is configured such that print data is transmitted from the smartphone 100 to the printer 10 and printing is performed in the printer 10. The smartphone 100 is an example of a terminal.

The printer 10 is a portable mobile printer. The printer 10 is an instant printer that prints an image on an instant film 12. A sheet film type (also referred to as a mono sheet type) is used as the instant film 12.

The printer 10 and the smartphone 100 are wirelessly connected. For example, the communication between the printer 10 and the smartphone 100 is performed by short range wireless communication such as Bluetooth (registered trademark) or Wireless Fidelity (WiFi).

Appearance Configuration of Printer

Figure 2:
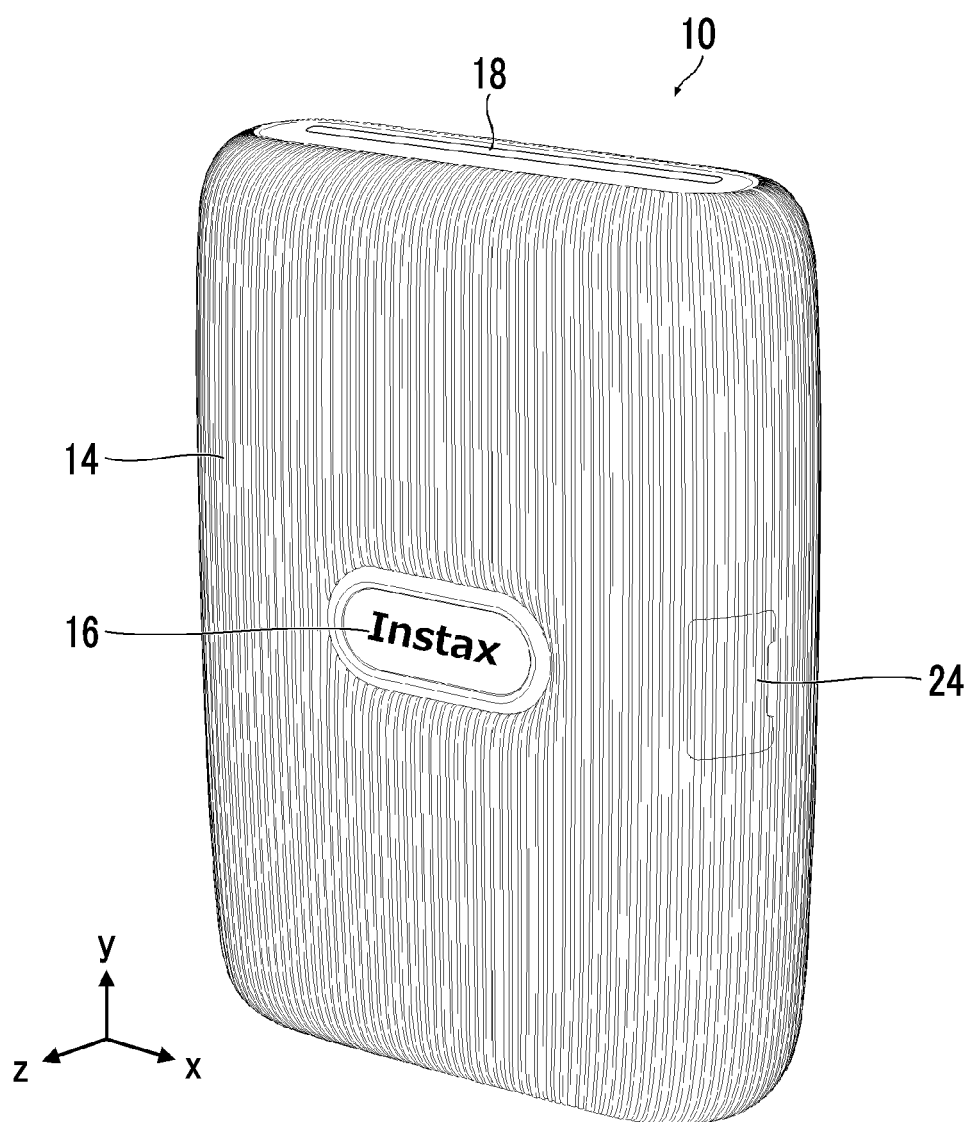
FIG. 2 is a front perspective view showing an example of an appearance configuration of a printer.
Figure 3:
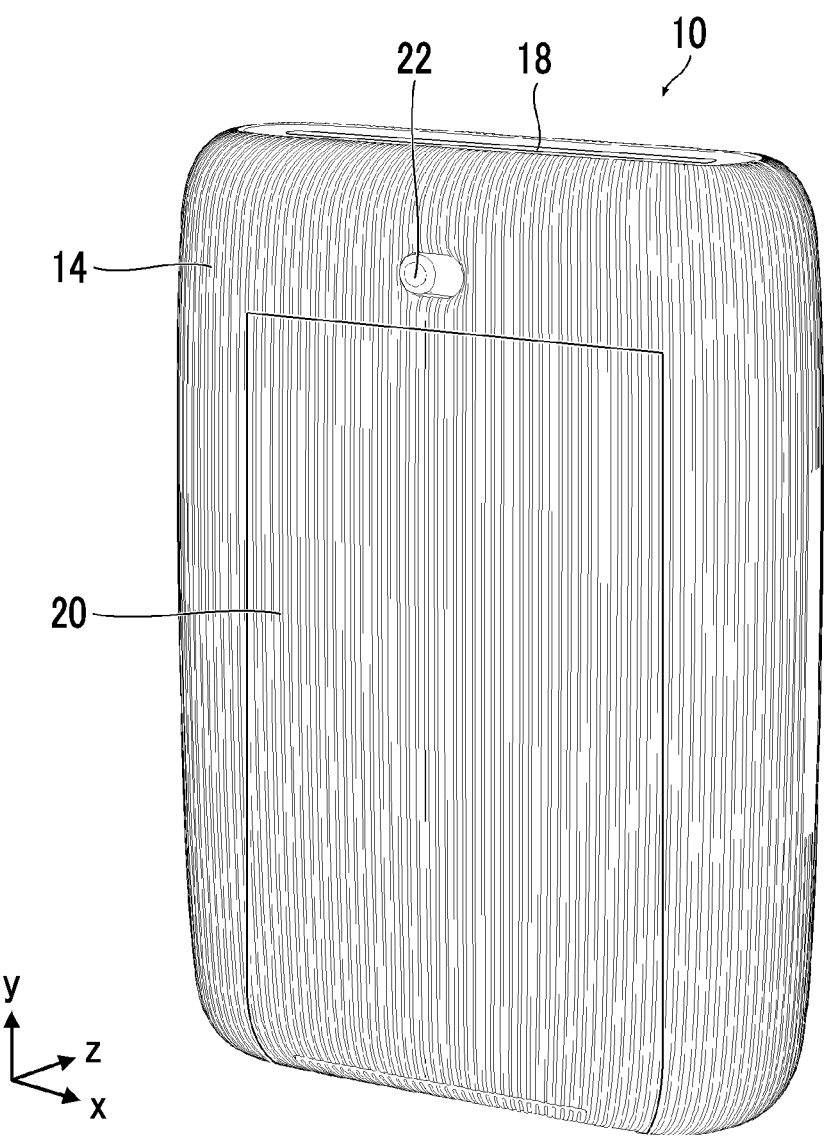
FIG. 3 is a rear perspective view of the printer shown in FIG. 2.

FIG. 2 is a front perspective view showing an example of an appearance configuration of the printer. FIG. 3 is a rear perspective view of the printer shown in FIG. 2.

As described above, the printer 10 is an instant printer (printer that prints on an instant film). The instant film 12 is loaded into the printer 10 in a state of a film pack (see FIG. 5) in which a plurality of instant films is accommodated in a case.

A printer main body 14 constituting a body of the printer 10 has a rounded flat rectangular box shape and is configured to be portable by being held with one hand. The printer main body 14 is configured to be vertically placed (stand upright on a flat place) and horizontally placed (laid on a flat place). FIGS. 1 and 2 show a case where the printer 10 is vertically placed.

On a front side of the printer main body 14, a push-type power button 16 is provided at a substantially central position. The power of the printer 10 is turned on and off by a long push of the power button 16 (an operation of continuously pushing the power button for a predetermined time or more). The power button 16 also serves as a light emitting unit, and emits light by causing a light source unit provided therein to emit light. The power button 16 is an example of an operation member provided in the printer main body 14.

A discharge port 18 is provided at an upper portion of the printer main body 14 (upper portion when the printer is vertically placed). The printed instant film 12 is discharged from the discharge port 18.

A film pack lid 20 for opening and closing a film pack loading chamber (see FIG. 4) is provided on a rear side of the printer main body 14. An unlock lever 22 that unlocks the film pack lid 20 is provided. In a case where the unlock lever 22 releases the lock and the film pack lid 20 is opened, the film pack loading chamber is opened. When the film pack lid 20 is closed after the instant film pack is loaded, the film pack lid 20 is locked by a lock mechanism (not shown), and the film pack is sealed in a light-shielded state.

A USB cable connection portion cover 24 that opens and closes a Universal Serial Bus (USB) cable connection portion (not shown) is provided on one side of the printer main body 14. The printer 10 is charged with a built-in battery through the USB cable connection portion exposed by opening the USB cable connection portion cover 24.

Configuration of Printing Unit of Printer

Figure 4:
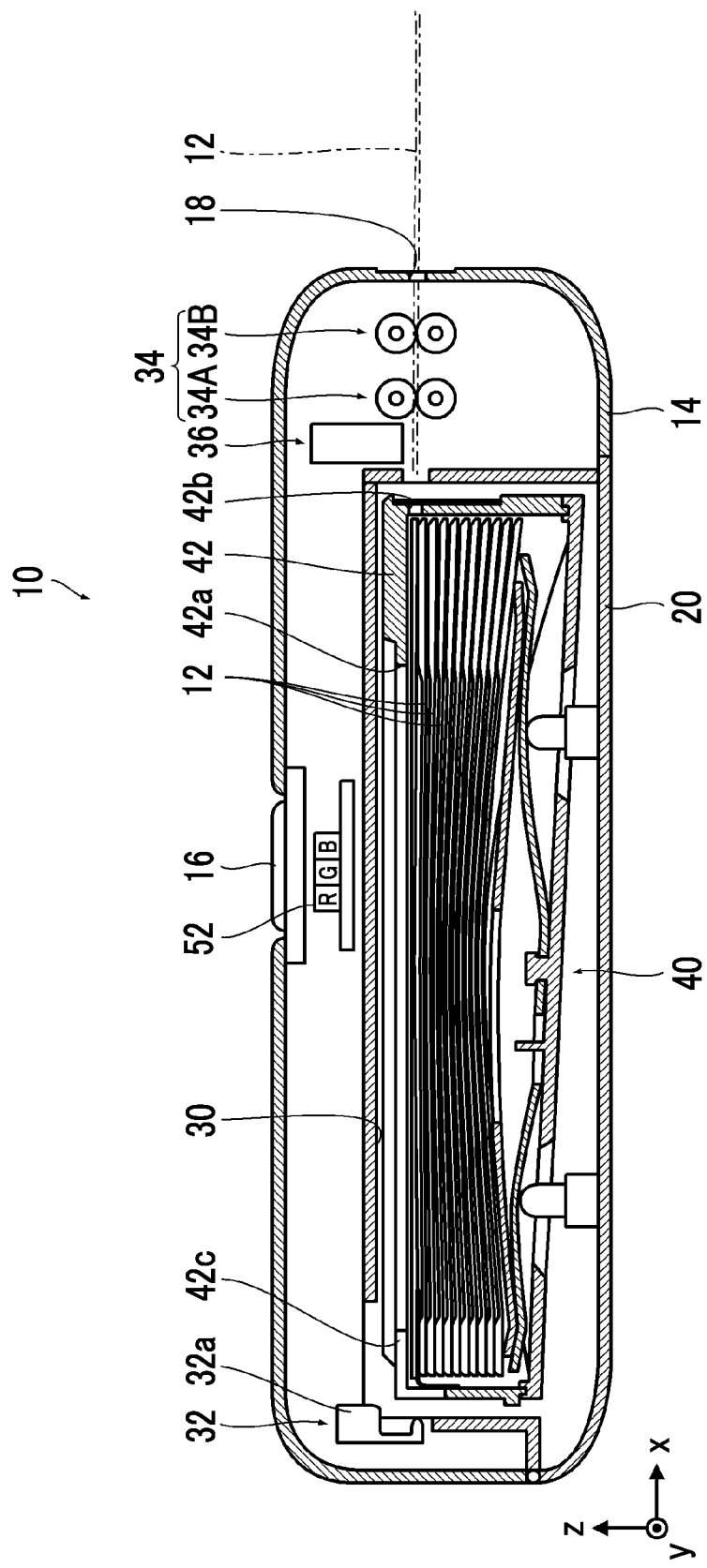
FIG. 4 is a cross-sectional view showing a schematic configuration of a printing unit of the printer.

FIG. 4 is a cross-sectional view showing a schematic configuration of a printing unit of the printer. This diagram shows a state in which the printer is horizontally placed.

As shown in this diagram, the printer 10 comprises a film pack loading chamber 30, a film delivery mechanism 32 that delivers the instant film 12 from the film pack loaded in the film pack loading chamber 30, a film transport mechanism 34 that transports the instant film 12 delivered from the film pack, and a print head 36 that records an image on the instant film 12 therein. The film delivery mechanism 32, the film transport mechanism 34, and the print head 36 constitute a printing unit of the printer 10.

The film pack loading chamber 30 includes a recess into which a film pack 40 is fitted, and is opened and closed by the film pack lid 20.

Figure 5:
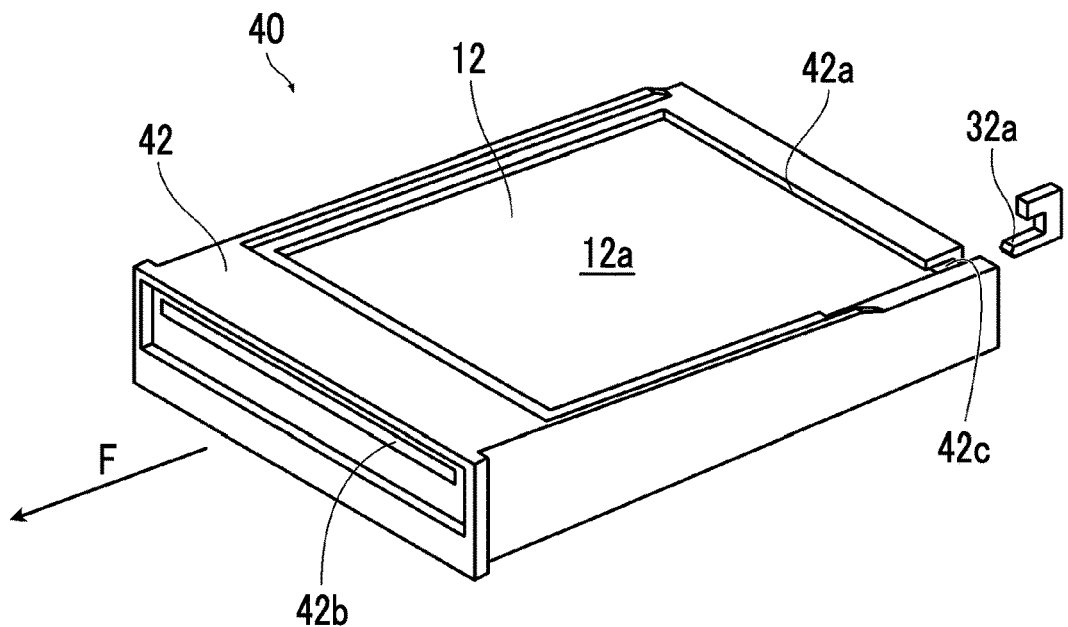
FIG. 5 is a perspective view of a film pack.
Figure 6:
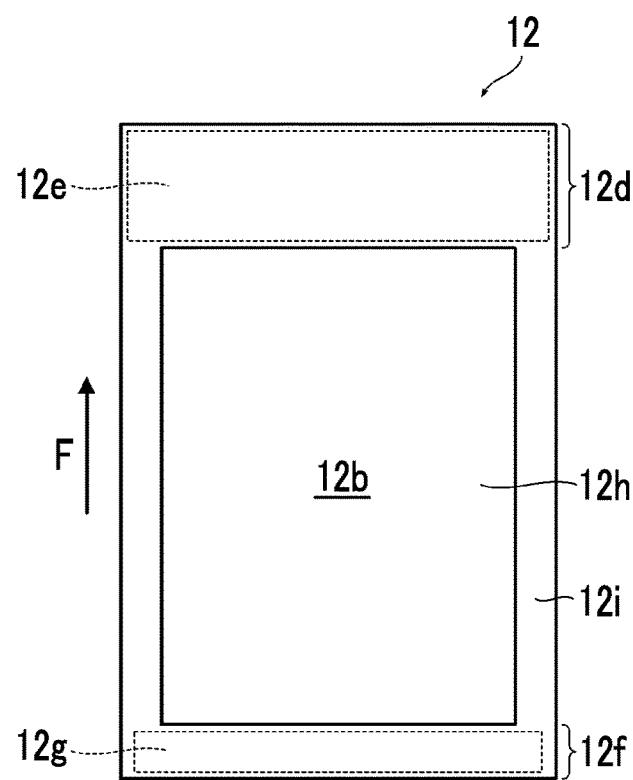
FIG. 6 is a front view of an instant film.
Figure 7:
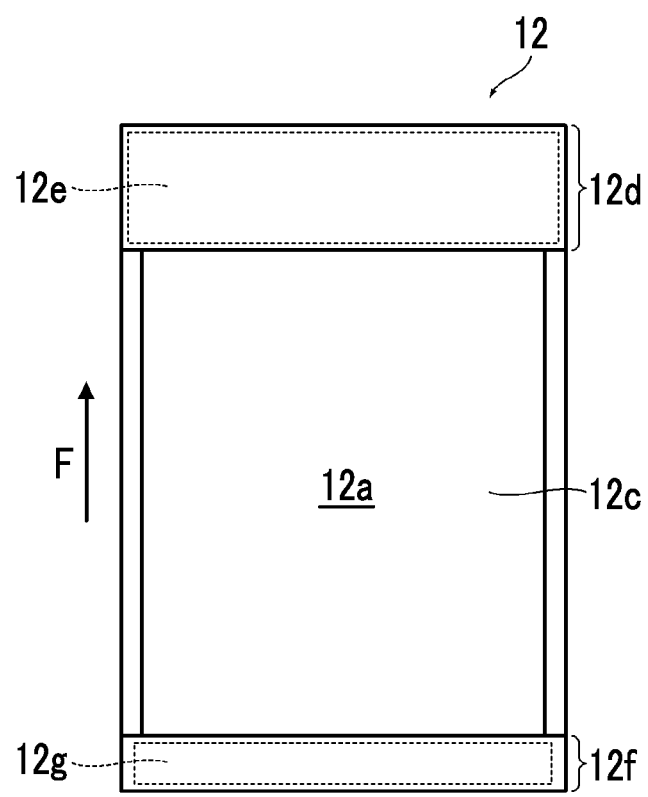
FIG. 7 is a rear view of the instant film.

FIG. 5 is a perspective view of the film pack. FIG. 6 is a front view of the instant film, and FIG. 7 is a rear view of the instant film. In FIGS. 5 to 7, a direction indicated by an arrow F is a delivery direction of the instant film 12. The instant film 12 is delivered in the direction indicated by the arrow F, and is discharged from the case 42.

The instant film 12 has a rectangular card shape. The instant film 12 is configured such that one surface is an exposure surface (surface on which an image is recorded through exposing) 12a and the other surface is an observation surface (surface on which the recorded image is observed) 12b.

As shown in FIG. 7, an exposure region 12c, a pod portion 12d, and a trap portion 12f are provided on the exposure surface 12a of the instant film 12. The exposure region 12c is a region in which the image is recorded through exposing. The exposure region 12c is a region in which the instant film 12 can be printed. The pod portion 12d and the trap portion 12f are arranged in front and back in the delivery direction F with the exposure region 12c interposed therebetween. The pod portion 12d is disposed in front in the delivery direction F with respect to the exposure region 12c. A developing solution pod 12e that contains a developing solution is provided within the pod portion 12d. The trap portion 12f is disposed in the back in the delivery direction F with respect to the exposure region 12c. An absorbent 12g is provided within the trap portion 12f.

As shown in FIG. 6, an observation region 12h is formed on the observation surface 12b of the instant film 12. The observation region 12h is a region in which the image is displayed. The image is displayed on the observation region 12h by developing the exposure region 12c. The observation region 12h is disposed so as to correspond to the exposure region 12c. A frame 12i is provided near the observation region 12h. Accordingly, the image is displayed within the frame. The observation region 12h is set so as to be slightly narrower (set so as to be one size smaller) than the exposure region 12c. Accordingly, in a case where the image is recorded in the entire region of the exposure region 12c, the image of which the surrounding is trimmed is printed.

The instant film 12 is viewed in an orientation in which the trap portion 12f is at the top and the pod portion 12d is at the bottom. Accordingly, the image is printed in an orientation in which the trap portion 12f is at the top and the pod portion 12d is at the bottom.

The instant film 12 is developed by spreading the developing solution of the pod portion 12d to the exposure region 12c after exposing. The developing solution of the pod portion 12d is squeezed out of the pod portion 12d, and is spread to the exposure region 12c by causing the instant film 12 to pass between a spreading roller pair 34B. The developing solution remaining at the time of spreading is captured in the trap portion 12f.

The case 42 has a rectangular box shape. The case 42 has a rectangular exposure opening 42a formed in a front portion. The case 42 has a slit-like film discharge port 42b on the top surface portion. The instant films 12 are accommodated so as to be stacked such that the exposure surface 12a faces a front surface (exposure opening 42a) of the case 42 and the pod portion 12d faces a top surface (film discharge port 42b) of the case 42. The case 42 has a slit-like claw opening portion 42c formed in a bottom portion. A claw 32a enters through the claw opening portion 42c, and thus, the instant films 12 accommodated in the case 42 are delivered toward the film discharge port 42b one by one and are discharged through the film discharge port 42b.

A plurality (for example, ten) of instant films 12 is accommodated so as to be stacked in one film pack 40.

The film delivery mechanism 32 delivers the instant films 12 one by one from the film pack 40 loaded in the film pack loading chamber 30. The film delivery mechanism 32 comprises the claw 32a that moves back and forth along the delivery direction of the instant film 12. The film delivery mechanism 32 scrapes the instant films 12 within the case one by one by the claw 32a, and delivers the instant film 12 from the film pack 40.

The film transport mechanism 34 transports the instant film 12 delivered from the film pack 40 by the film delivery mechanism 32 at a constant speed. The film transport mechanism 34 comprises a transport roller pair 34A and the spreading roller pair 34B. The transport roller pair 34A is rotated by being driven by a motor (not shown), and transports the instant film 12 while holding both sides of the instant film. The spreading roller pair 34B is rotated by being driven by a motor (not shown), and transports the instant film 12 while holding the entire instant film. The pod portion 12d is crushed while the instant film is transported by the spreading roller pair 34B, and the instant film 12 is developed.

The print head 36 records the image on the instant film 12 delivered from the film pack 40. The print head 36 is a line-type exposure head. The print head 36 irradiates the exposure surface 12a of the instant film 12 transported by the film transport mechanism 34 with print light line by line, and records the image on the instant film 12 in a single pass.

Electrical Configuration of Printer

Figure 8:
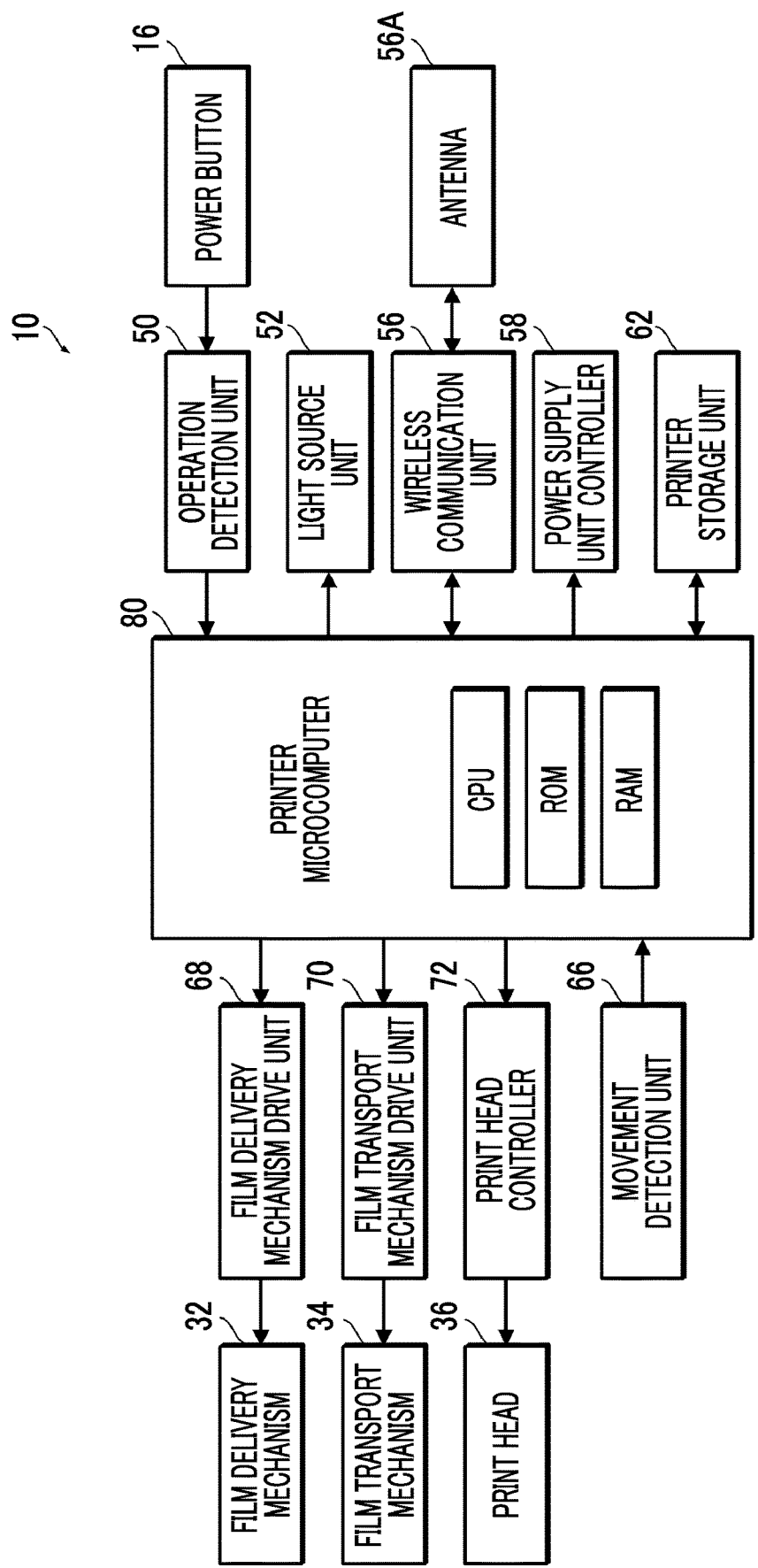
FIG. 8 is a block diagram showing an electrical configuration of the printer.

FIG. 8 is a block diagram showing an electrical configuration of the printer.

As shown in this diagram, the printer 10 comprises an operation detection unit 50 that detects an operation of the power button 16, a light source unit 52 that emits light from the power button 16, a wireless communication unit 56 that wirelessly communicates with the smartphone 100 via an antenna 56A, a power supply unit 58 that supplies a power to the units of the printer 10, a printer storage unit 62 that stores image data, a movement detection unit 66 that detects the movement of the printer 10, a film delivery mechanism drive unit 68 that drives the film delivery mechanism 32, a film transport mechanism drive unit 70 that drives the film transport mechanism 34, a print head controller 72 that drives the print head 36, and a printer microcomputer 80.

The operation detection unit 50 detects the operation of the power button 16. The power button 16 is a push button, and the printer 10 is turned on and off by long push. While the printer is turned on, a function for inputting a reprint instruction is assigned to the power button 16. The reprinting is a function for reprinting the last printed image. The operation detection unit 50 detects a short push (operation of pushing and then releasing immediately) of the power button 16 while the printer 10 is turned on, and outputs a detection signal to the printer microcomputer 80 (a first processor).

The light source unit 52 includes a light source and a control circuit thereof. A light source configured to switch light emission colors is used as the light source. In the printer 10 of the present embodiment, a three-color LED (also referred to as a full-color LED) comprising three color elements of red (R), green (G), and blue (B) is used as the light source. The light emission colors of the three-color LED are switched by selecting a mixing ratio of three colors of R, G, and B. An electroluminescent (EL) source such as an organic light emitting diode (OLED) may be employed as the light source.

The light source unit 52 is disposed inside the power button 16 (see FIG. 4). The power button 16 is transparent or translucent in whole or in part. In a case where the light source unit 52 emits light, light is transmitted through the transparent portion or translucent part of the power button 16, and is emitted.

The wireless communication unit 56 wirelessly communicates with an external device (for example, the smartphone 100) through the antenna 56A under the control using the printer microcomputer 80.

The power supply unit 58 includes a battery as a power supply and a control circuit thereof. The power supply unit 58 supplies a power to the units of the printer 10 under the control of the printer microcomputer 80. The battery is a rechargeable secondary battery, and is charged by receiving a power from the outside. The power supply unit 58 has a function of detecting a state of charge of the battery (a function of a battery state-of-charge detection unit).

The printer storage unit 62 includes a memory and a control circuit thereof. The printer storage unit 62 stores image data of the printed image and setting data of the printer 10. The memory is, for example, a nonvolatile memory such as an electrically erasable programmable read-only memory (EEPROM). The printer storage unit 62 is an example of a print image storage unit.

The image data of the printed image is stored by a preset number of sheets. In a case where the number of images capable of being stored reaches an upper limit, the oldest image is deleted. The minimum number of images capable of being stored is one. That is, at least the image data of the last printed image is stored. In this case, the data is rewritten whenever printing is performed.

The movement detection unit 66 detects the movement of the printer main body 14. The movement detection unit 66 is, for example, a motion sensor. Since the motion sensor itself is well-known, the detailed description is omitted. In general, the motion sensor is configured by combining an acceleration sensor and a gyro sensor. The movement detection unit 66 detects a posture of the printer main body 14 (vertical placement, horizontal placement, or tilt) and movement (lifting, placing down, or turning over).

The film delivery mechanism drive unit 68 includes a motor that drives the claw 32a of the film delivery mechanism 32 and a drive circuit thereof, and drives the film delivery mechanism 32 according to a command from the printer microcomputer 80.

The film transport mechanism drive unit 70 includes a motor that drives the transport roller pair 34A of the film transport mechanism 34 and a drive circuit thereof, and a motor that drives the spreading roller pair 34B and a drive circuit thereof, and drives the film transport mechanism 34 according to a command from the printer microcomputer 80.

The print head controller 72 includes a control circuit of the print head 36, and operates the print head 36 according to a command from the printer microcomputer 80.

The printer microcomputer 80 (a first processor) is a controller that performs overall control of the operation of the printer 10. The printer microcomputer 80 is a microcomputer that comprises a central processing unit (CPU), a read only memory (ROM), and a random access memory (RAM), and realizes various functions by executing predetermined control programs.

Figure 9:
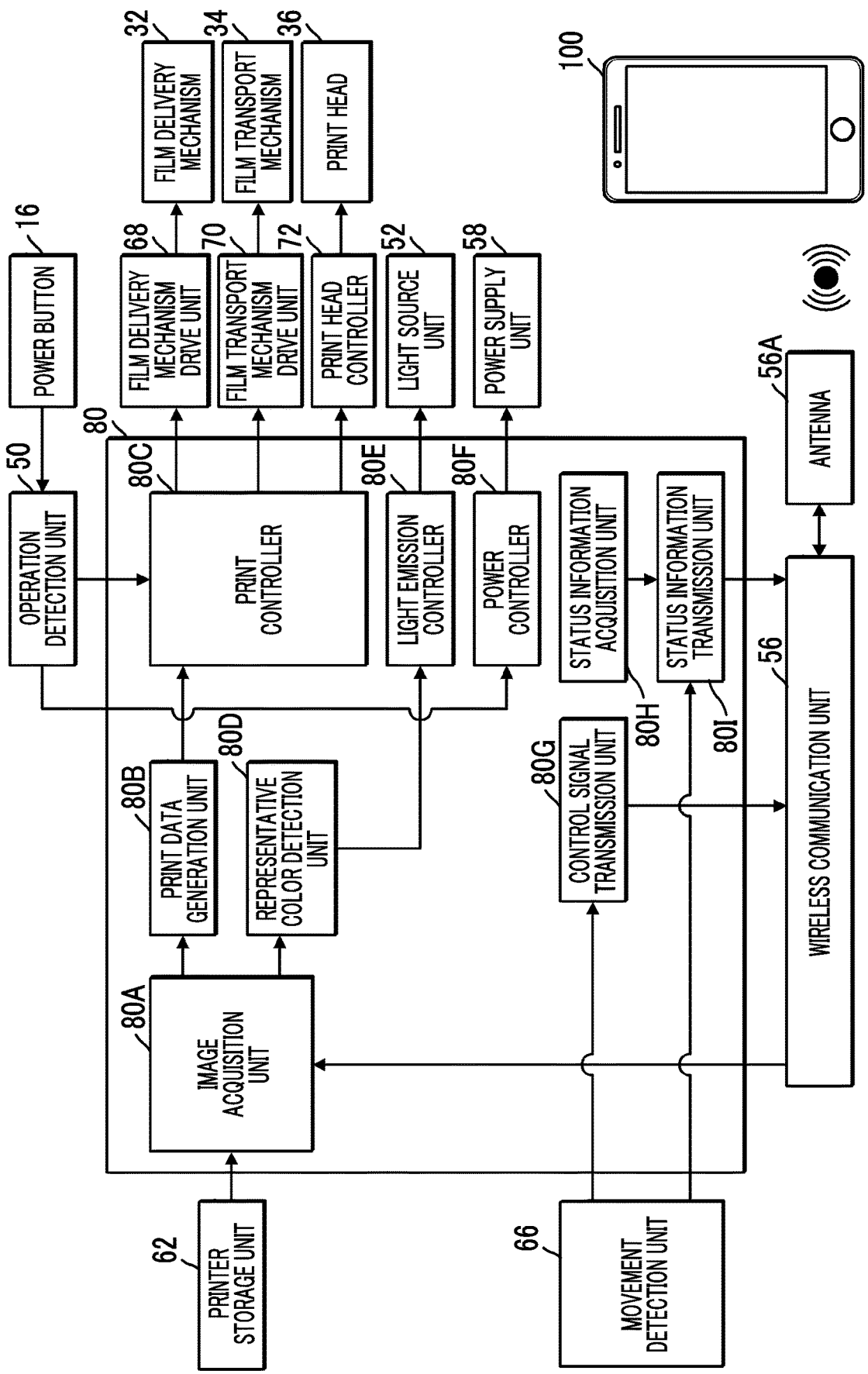
FIG. 9 is a block diagram of main functions realized by a printer microcomputer.

FIG. 9 is a block diagram of main functions realized by the printer microcomputer.

The printer microcomputer 80 mainly functions as an image acquisition unit 80A, a print data generation unit 80B, a print controller 80C, a representative color detection unit 80D, a light emission controller 80E, a power controller 80F, a control signal transmission unit 80G, and a status information acquisition unit 80H, and a status information transmission unit 80I.

The image acquisition unit 80A wirelessly communicates with the smartphone 100 via the wireless communication unit 56, and acquires image data of an image to be printed from the smartphone 100. In the case of reprinting, the image data of the last printed image is read out from the printer storage unit 62 and is acquired.

The print data generation unit 80B converts the image data acquired by the image acquisition unit 80A into a data format printable by the printing unit (data format printable on the instant film 12 by the print head 36), and generates data for printing (print data).

The print controller 80C controls the delivery of the instant film 12 by the film delivery mechanism 32 via the film delivery mechanism drive unit 68. The transport of the instant film 12 by the film transport mechanism 34 is controlled via the film transport mechanism drive unit 70. The driving of the print head 36 is controlled via the print head controller 72. The driving of the print head 36 is controlled in synchronization with the transport of the instant film 12 based on the print data generated by the print data generation unit 80B.

The print controller 80C has a function (a function of a printable sheet number detection unit) of detecting the number of printable sheets (the number of remaining films). The number of printable sheets is detected by counting the total number of printed sheets after the film pack is loaded. Since a predetermined number of (for example, 10) instant films 12 are accommodated in the film pack, the number of printable sheets can be detected by counting the total number of printed sheets after the film pack is loaded. That is, a value obtained by subtracting the number of printed sheets from the total number of instant films 12 loaded in the film pack before the use of the film pack is started is the number of printable sheets (the number of remaining films).

The representative color detection unit 80D detects the representative color of the image to be printed. The representative color of the image to be printed is a color used centrally in the image to be printed. For example, the representative color detection unit 80D obtains a color distribution of the entire image to be printed, and detects the color occupying the widest area as the representative color. For example, orange is detected as the representative color for a sunset image in which the entire screen is dyed in orange. For example, green is detected as the representative color for a grassland image. The representative color detection unit 80D detects the representative color within a color gamut range reproducible in the light source unit 52. The representative color may be obtained from a part of the image to be printed, or may be obtained by dividing the image to be printed into a plurality of regions. For example, in a case where the representative color is obtained from a partial region, a detection region is set at a center of the image, and the representative color is detected from the detection region. For example, in a case where the representative color is obtained by dividing the image into the plurality of regions, the image to be printed is equally divided into a plurality of regions in an up-down direction (for example, divided into three equal regions), and the representative color is detected from each region.

The light emission controller 80E controls the light emission of the light source unit 52, and causes the power button 16 which is the light emitting unit to emit light in a predetermined color and pattern. The light emission controller 80E causes the power button 16 to emit light at a predetermined timing. For example, the power button 16 emits light in a case where data of the image to be printed is received from the smartphone 100 and the image is printed. In a case where the image to be printed is received from the smartphone 100, a plurality of predetermined colors is emitted while being switched in order at regular time intervals. For example, seven colors (so-called rainbow colors) of red, orange, yellow, green, light blue, blue, and purple are emitted while being switched in order at regular time intervals. The light emission is continuously performed while the image is received. Meanwhile, in a case where the image is printed, the representative color detected by the representative color detection unit 80D is emitted. The light emission is continuously performed while the image is printed. In a case where the representative color is obtained by dividing the image into the plurality of regions, the obtained representative colors are emitted while being switched in order. For example, in a case where the image to be printed is divided into three equal regions in the up-down direction and the representative colors are detected from the respective regions, the representative colors detected in the respective regions are emitted at regular time intervals in order from the top. In a case where an achromatic color such as black or gray is detected as the representative color, a specific color is instead emitted. Alternatively, for example, the representative colors are emitted in a specific emission pattern (for example, seven colors (so-called rainbow colors) of red, orange, yellow, green, light blue, blue, and purple are emitted while being switched in order at regular time intervals. Alternatively, a specific color is turned on and off (for example, white is turned on and off).). Alternatively, the light emission is stopped.

The power controller 80F controls the power supply unit 58 to control the supply of a power to each unit and the charging of the battery. The turned-on and turned-off of the printer 10 are controlled by the power controller 80F. The power controller 80F turns on and off the printer 10 based on an output from the operation detection unit 50.

The control signal transmission unit 80G wirelessly transmits a predetermined control signal to the smartphone 100 based on the detection result of the movement detection unit 66. That is, in a case where a predetermined movement is detected by the movement detection unit 66, the control signal transmission unit generates a control signal corresponding to this movement, and wirelessly transmits the generated control signal to the smartphone 100 via the wireless communication unit 56. The smartphone 100 performs a predetermined operation by receiving this control signal. Specifically, in a case where the movement detection unit 66 detects a movement (first movement) in which the printer main body 14 is horizontally placed, the control signal transmission unit transmits a first control signal to the smartphone 100. In a case where the movement detection unit 66 detects a movement (second movement) in which the printer main body 14 is vertically placed, the control signal transmission unit transmits a second control signal to the smartphone 100. In a case where the first control signal is received, the smartphone 100 displays, as a top screen, a first top screen (first operation screen) having a predetermined screen configuration on the touch panel 120. Meanwhile, in a case where the second control signal is received, the smartphone displays, as the top screen, a second top screen (second operation screen) having a predetermined screen configuration on the touch panel 120. The aforementioned top screen will be described in detail below. The top screen (also referred to as a home screen) is a screen that is displayed first in a case where an application program is activated. Buttons of executable functions are displayed on the top screen.

The status information acquisition unit 80H acquires status information of the printer 10. The status information of the printer 10 includes information of the number of printable sheets and information of the state of charge of the battery. The status information acquisition unit 80H acquires the information of the state of charge of the battery from the power supply unit 58. The information of the number of printable sheets is acquired from the print controller 80C.

The status information transmission unit 80I transmits the status information acquired by the status information acquisition unit 80H to the smartphone 100 based on the detection result of the movement detection unit 66. That is, in a case where a predetermined movement is detected by the movement detection unit 66, the status information acquired by the status information acquisition unit 80H is transmitted to the smartphone 100. Specifically, in a case where the movement detection unit 66 detects a movement (third movement) of lifting the printer main body 14, the status information is transmitted to the smartphone 100. The aforementioned top screen will be described in detail below.

Smartphone

Figure 10:
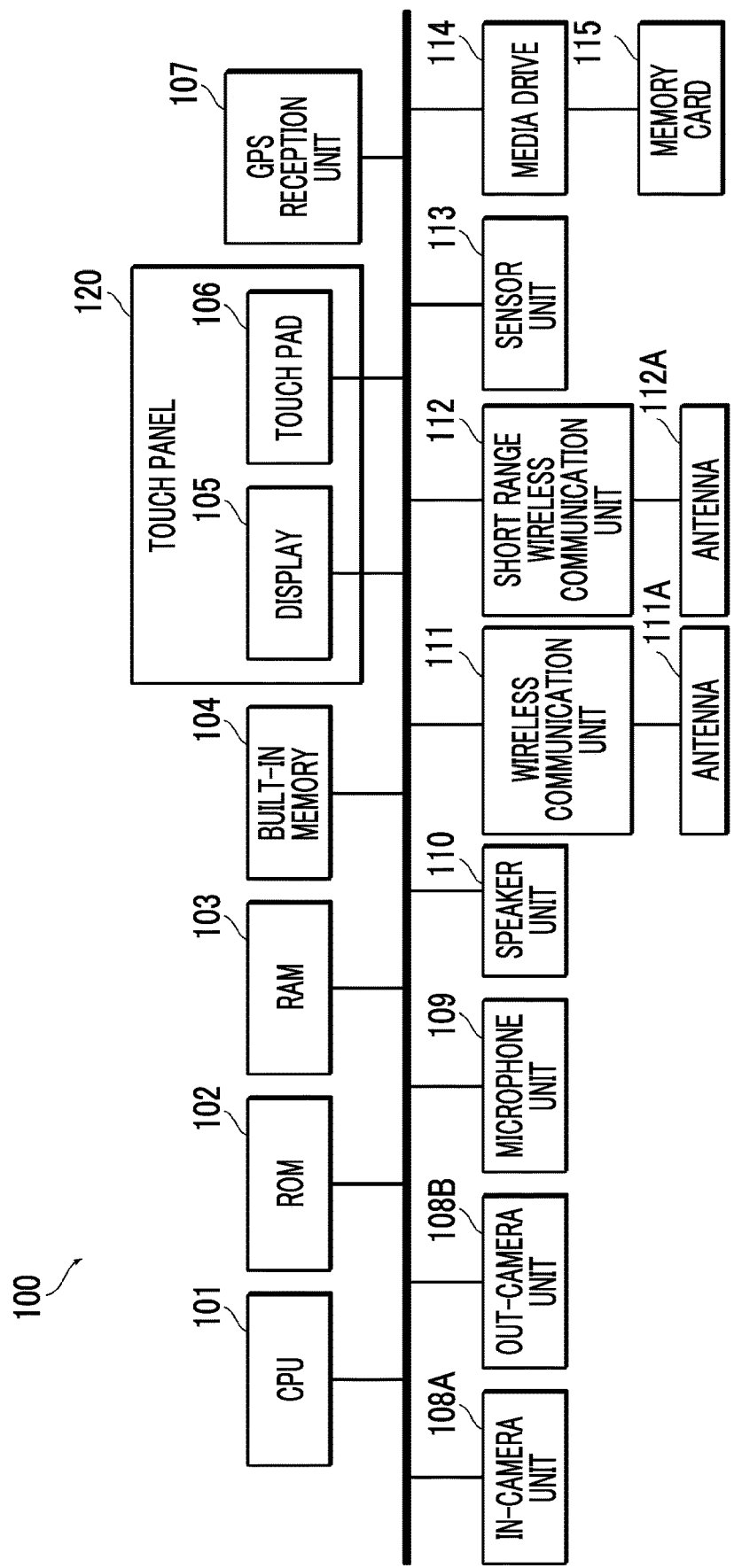
FIG. 10 is a block diagram showing an example of a hardware configuration of a smartphone.

FIG. 10 is a block diagram showing an example of a hardware configuration of the smartphone.

As shown in this diagram, the smartphone 100 comprises a CPU 101 that controls the entire operation, a ROM 102 that stores a basic input and output program, a RAM 103 that is used as a work area of the CPU 101, a built-in memory 104, a display 105, a touch pad 106 that detects a touch operation (position input) for a display screen, a Global Positioning Systems (GPS) reception unit 107 that receives a GPS signal including positional information (latitude, longitude, and altitude) of the smartphone 100 by a GPS satellite or an Indoor MEssaging System (IMES) as an indoor GPS, an in-camera unit 108A (a camera unit provided on a screen side of the touch panel 120) and an out-camera unit 108B (a camera unit provided on a surface (rear surface) opposite to the screen of the touch panel 120) that includes an imaging lens and an image sensor and electronically images an image, a microphone unit 109 that includes a microphone and inputs voice, a speaker unit 110 that includes a speaker and outputs voice, a wireless communication unit 111 that wirelessly communicates with a nearest base station by using an antenna 111A, a short range wireless communication unit 112 that communicates with another external device (for example, the printer 10) by using an antenna 112A through short range wireless, a sensor unit 113 that includes various sensors such as a geomagnetic sensor, a gyrocompass, and an acceleration sensor, and a media drive 114 that reads and writes data in and from a memory card 115. The built-in memory 104 is a nonvolatile memory such as an EEPROM. The built-in memory 104 stores various data such as image data of an image captured by the in-camera unit 108A and an out-camera unit 108B and image data acquired from other devices in addition to various programs (for example, display control program) including an operating system. The display 105 and the touch pad 106 constitute the touch panel 120.

The screen of the touch panel 120 has a rectangular shape. The smartphone 100 has a normal utilization pattern in which the screen of the touch panel 120 is vertically oriented (a longitudinal direction of the screen is along a vertical direction). In the smartphone 100 of the present embodiment, the longitudinal direction of the screen of the touch panel 120 is a vertical direction (Y direction in the diagram), and a direction (X direction in the diagram) orthogonal to the vertical direction, that is, a direction of a short side of the screen is a width direction.

The smartphone 100 has a function of causing the printer 10 to print the image captured by the in-camera unit 108A or the out-camera unit 108B, a function of causing the printer 10 to print the image recorded in the built-in memory 104, and a function of confirming a state (for example, the state of charge of the battery and the number of printable sheets) of the printer 10 in the relationship with the printer 10. As a function related to the printing of the image, the smartphone has a function of processing and editing the image to be printed.

Figure 11:
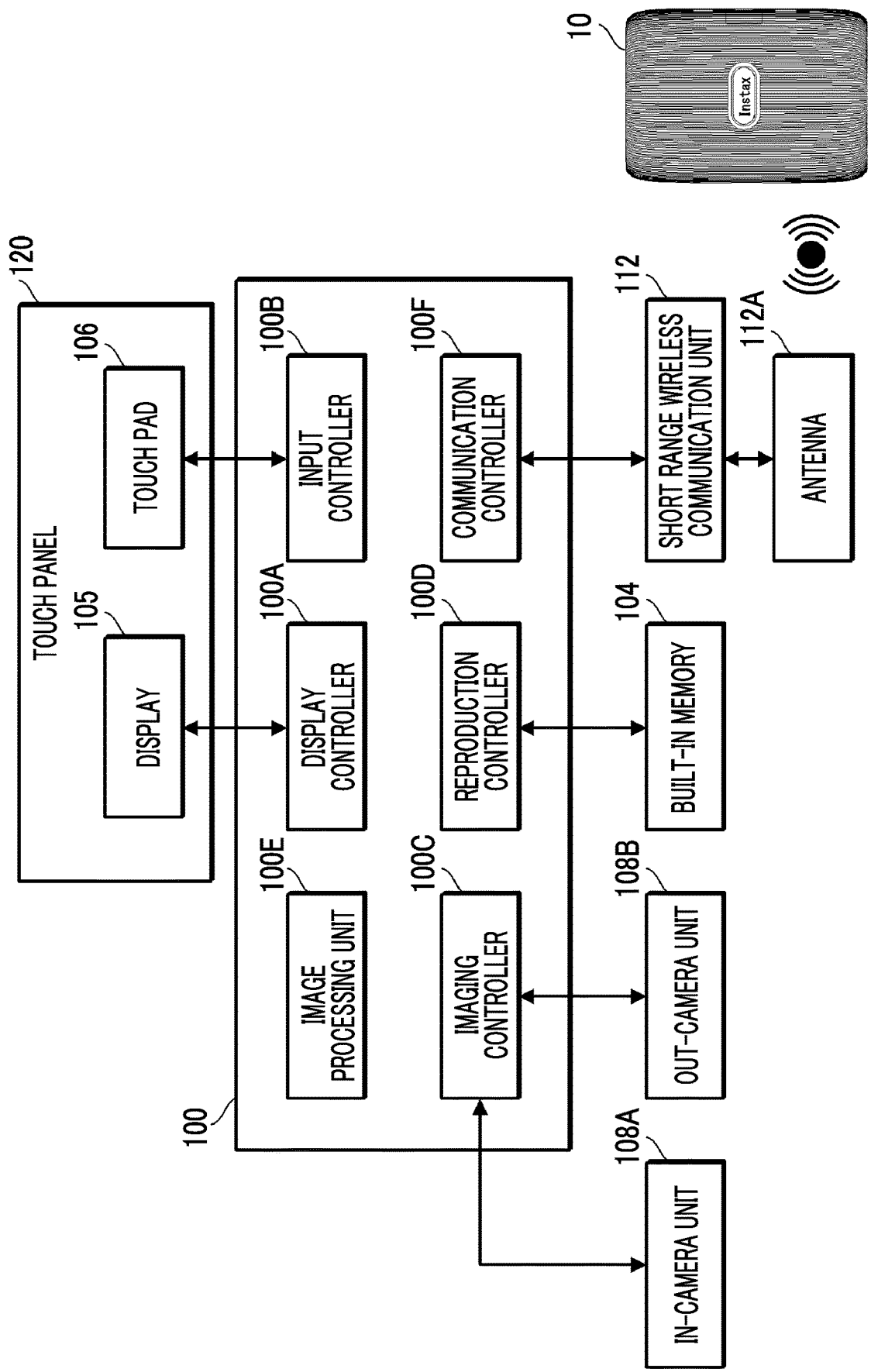
FIG. 11 is a block diagram of main functions of the smartphone related to printing of an image.

FIG. 11 is a block diagram of main functions of the smartphone related to the printing of the image.

As shown in this diagram, the smartphone 100 has functions of a display controller 100A that controls display on the touch panel 120, an input controller 100B that controls an input to the touch panel 120, and an imaging controller 100C that controls the imaging of the image to be printed, a reproduction controller 100D that controls reproduction of the image to be printed, an image processing unit 100E that processes and edits the image to be printed, and a communication controller 100F that controls communication with the printer 10 which are related to the printing of the image. These functions are realized by the CPU 101 (a second processor) executing a predetermined program.

The display controller 100A controls the display of the screen on the touch panel 120 to display an operation screen at the time of printing the image on the touch panel 120. The display controller 100A controls the display on the screen of the touch panel 120 by controlling the display on the display 105 which is a display unit. The display of the operation screen to be described below is controlled by the display controller 100A.

The input controller 100B controls an operation input at the time of printing the image by controlling an operation input to the touch panel 120. The input controller 100B controls the input of the touch pad 106, which is the position input unit of the touch panel 120, and controls the operation input to the touch panel 120.

The imaging controller 100C controls the in-camera unit 108A and the out-camera unit 108B based on an operation input to the touch panel 120, and controls the imaging of the image to be printed.

The reproduction controller 100D controls access to the built-in memory 104 based on an operation input to the touch panel 120, and controls the reproduction of the image to be printed.

The image processing unit 100E processes and edits the image to be printed based on an operation input to the touch panel 120. For example, the image to be printed is processed and edited by performing image processing such as enlargement (trimming) of the image, rotation of the image, filter processing, template combination, and collage. The filter processing refers to a function of changing a color tone of the image or deforming the image. For example, color tone correction, noise removal, mosaic processing, and embossing. The template combination is a process of generating a combination image by combining a template image with an image. The collage mentioned herein is processing for generating a single combination image by applying images to regions of a frame (divided frame) having a plurality of divided regions therein. The generated combination image is called a collage image.

The communication controller 100F controls the short range wireless communication unit 112 based on an operation input on the touch panel 120, and controls the communication with the printer 10. Data of the image to be printed and a print command thereof are transmitted from the smartphone 100 to the printer 10. Meanwhile, the status information and the control signal are transmitted from the printer 10 to the smartphone 100. The communication controller 100F functions as a status information reception unit that receives the status information transmitted from the printer 10 and a control signal reception unit that receives the control signal transmitted from the printer 10.

Printing Method of Image

Display on Top Screen

In a case where the printer 10 prints the image stored in the smartphone 100 and the image captured in the smartphone 100, a predetermined application program (hereinafter, referred to as a print application) is activated on the smartphone side.

In a case where the print application is activated, the top screen is displayed on the screen of the smartphone 100. As described above, there are two types of top screens (the first top screen and the second top screen). Any one of the top screens is displayed according to the posture of the printer 10 at the time of activation. That is, the first top screen is displayed in a case where the printer main body 14 is vertically placed, and the second top screen is displayed in a case where the printer main body is horizontally placed.

Figure 12:
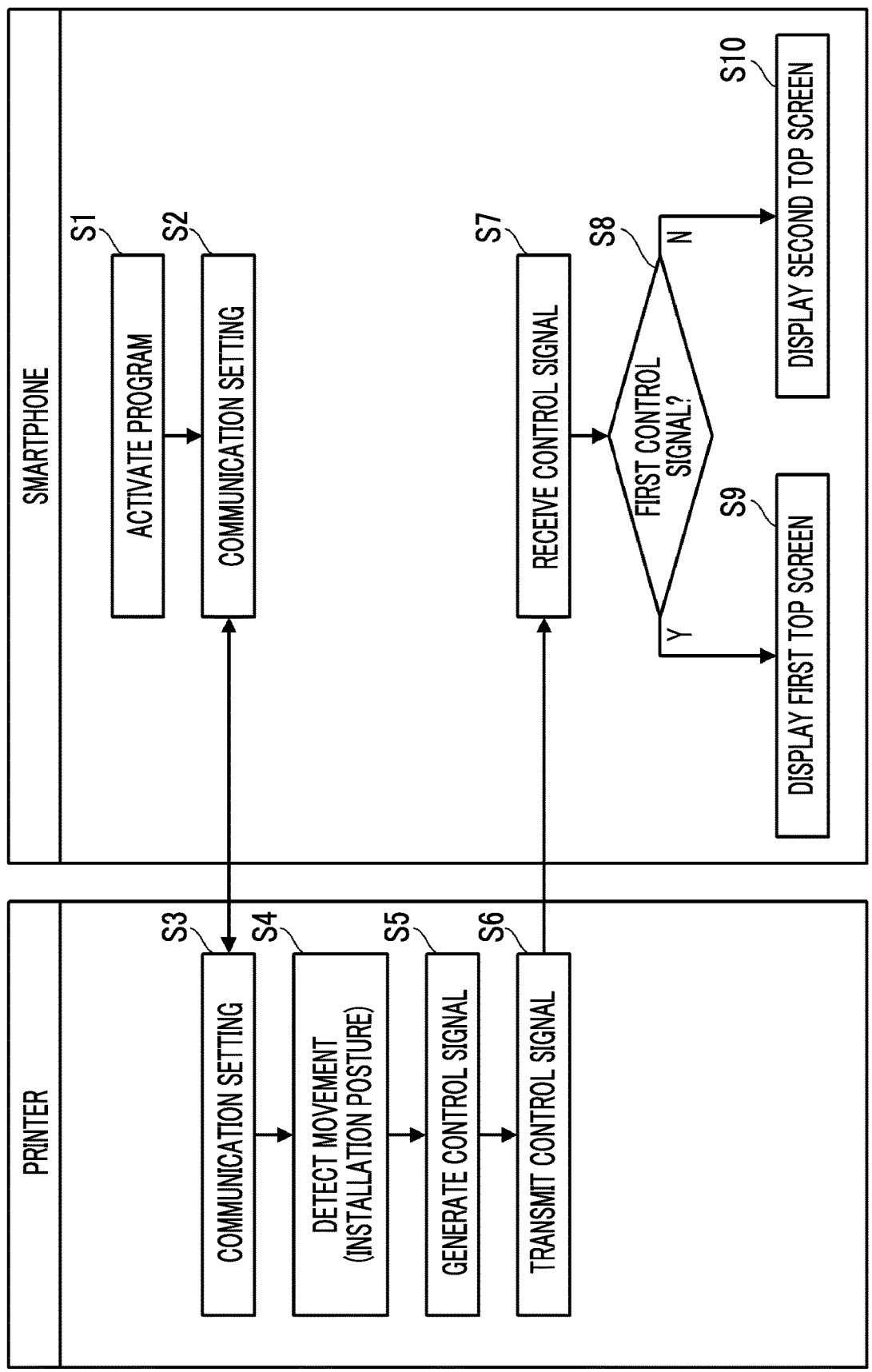
FIG. 12 is a flowchart showing a processing procedure of display on a top screen at the time of activating a print application.

FIG. 12 is a flowchart showing a processing procedure for displaying the top screen in a case where the print application is activated.

In a case where the print application is activated in the smartphone 100 (step S1), communication settings are initially performed with the printer 10 (step S2). That is, the connectable printer 10 is detected, and a process of establishing connection with the detected printer 10 through short range wireless communication is performed. Similarly, on the printer 10 side, a process of establishing connection with the smartphone 100 through short range wireless communication is performed (step S3).

In a case where the connection through the short range wireless communication is established, the movement (installation posture) of the printer 10 is detected on the printer 10 side (step S4). Here, it is detected whether the printer main body 14 is placed vertically (first movement) or horizontally (second movement). The control signal is generated based on the detection result (step S5), and transmitted to the smartphone 100 (step S6). In a case where the state of the vertical placement (first movement) is detected as the installation posture, the first control signal is transmitted. Meanwhile, in a case where the horizontal placement (second movement) is detected as the installation posture, the second control signal is transmitted.

The smartphone 100 receives the control signal transmitted from the printer 10 (Step S7). The screen to be displayed as the top screen is selected based on the received control signal. In this case, first, it is determined whether or not the received control signal is the first control signal (step S8). In a case where the received control signal is the first control signal, a first top screen 200A (see FIG. 13) is displayed on the touch panel 120 (step S9). Meanwhile, in a case where the received control signal is the second control signal, a second top screen 200B (see FIG. 14) is displayed on the touch panel 120 (step S10).

Screen Configurations of First Top Screen and Second Top Screen

Figure 13:
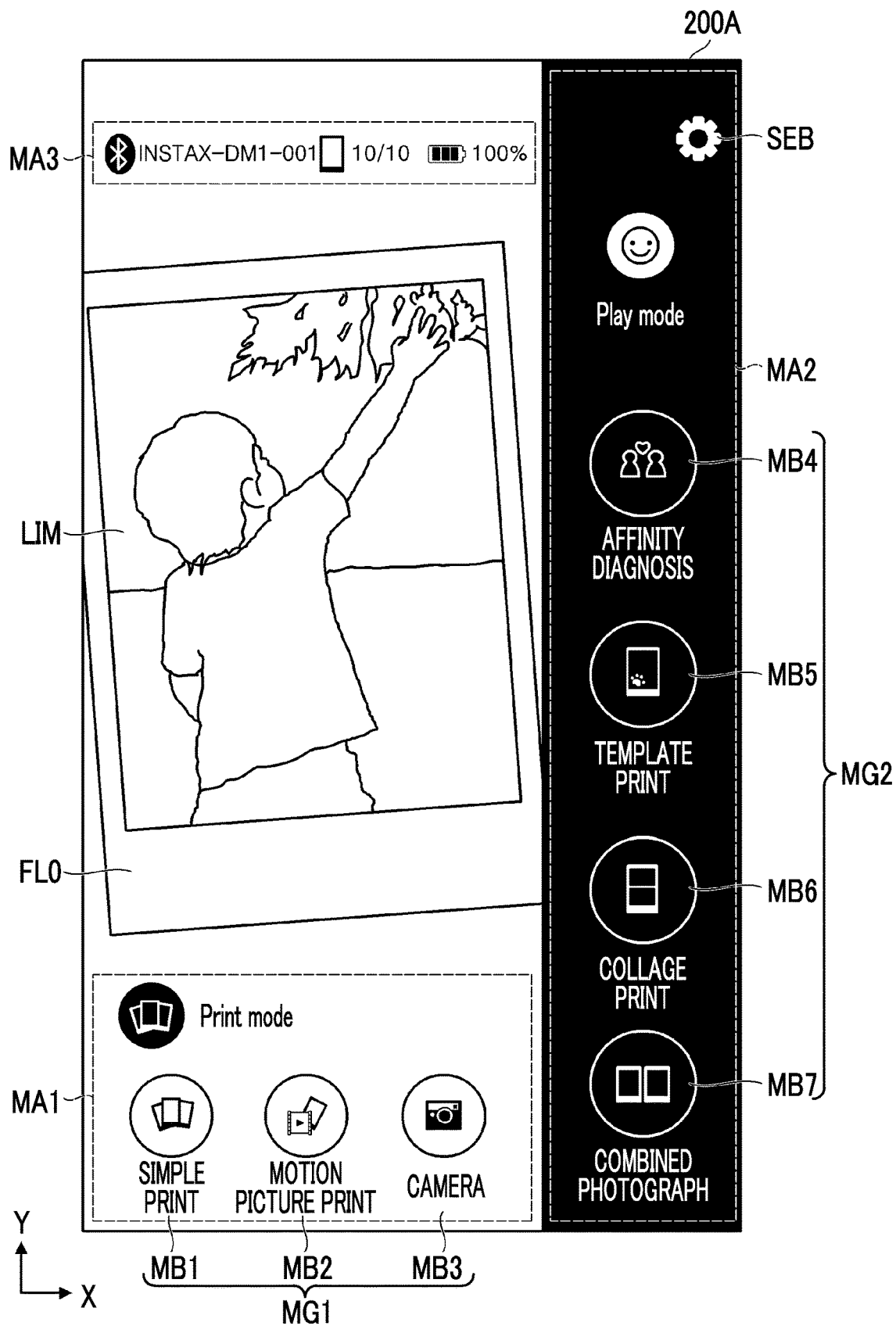
FIG. 13 is a diagram showing an example of a first top screen.
Figure 14:
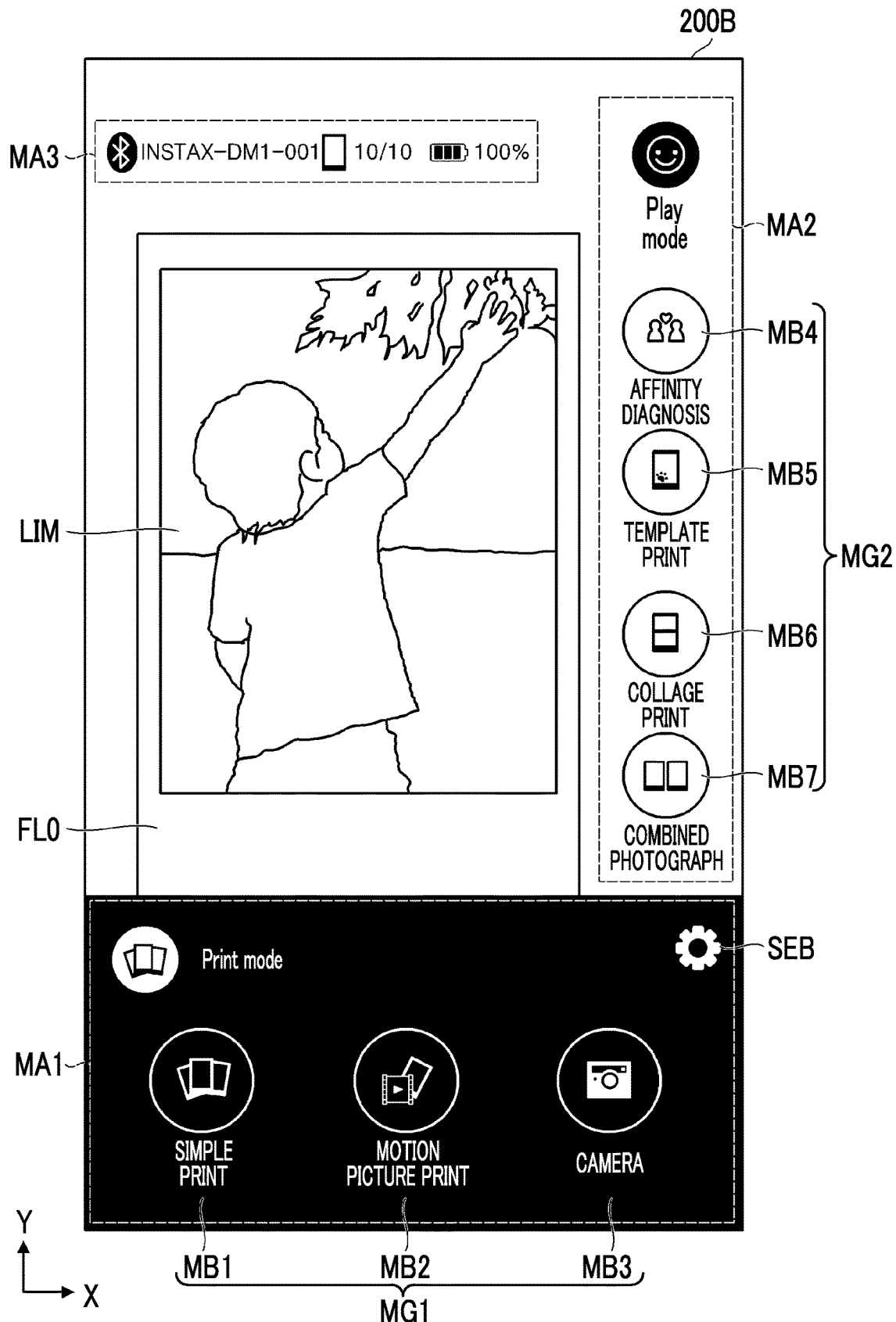
FIG. 14 is a diagram showing an example of a second top screen.

FIG. 13 is a diagram showing an example of the first top screen. FIG. 14 is a diagram showing an example of the second top screen.

As shown in FIGS. 13 and 14, the first top screen 200A and the second top screen 200B are configured such that the same items are displayed in different layouts. Items to be displayed are a button of a function executable by the print application, a setting button of the print application, status information of the printer 10, and a last printed image.

The button of the function executable by the print application is a simple print button MB1 which is a button of a "simple print" function, a motion picture print button MB2 which is a button of a "motion picture print" function, a camera button MB3 which is a button of a "camera" function, an affinity diagnosis button MB4 which is a button of an "affinity diagnosis" function, a template print button MB5 which is a button of a "template print" function, a collage print button MB6 which is a button of a "collage print" function, and a combined photograph button MB7 which is a button of a "combined photograph" function.

The "simple print" function is a function of printing the image (still image) stored in the smartphone 100. The present function is activated by touching the simple print button MB1 on the screen.

The "motion picture print" function is a function of extracting and printing one scene from the motion picture. The present function is activated by touching the motion picture print button MB2 on the screen.

The "camera" function is a function of performing imaging by using the camera function of the smartphone 100 and printing the captured image with the printer 10. The present function is activated by touching the camera button MB3 on the screen.

The "affinity diagnosis" function is a function of performing affinity diagnosis from the image. For example, the image is analyzed by using a learned model, and the affinity between persons (two persons) appearing in the image is diagnosed. The present function is activated by touching the affinity diagnosis button MB4 on the screen.

The "template print" function is a function of combining the template image with the image and printing the combined image. The present function is activated by touching the template print button MB5 on the screen.

The "collage print" function is a function of generating and printing the collage image. As described above, the collage image is generated by applying the images to the regions of the frame (divided frame) having the plurality of divided regions therein. The present function is activated by touching the collage print button MB6 on the screen.

The "combined photograph" function is a function of dividing one image into a plurality of regions and printing the image. The present function is activated by touching the combined photograph button MB7 on the screen.

Each function button is displayed as an icon. That is, a combination of figures, symbols, or patterns is displayed. In the present embodiment, each function button is formed by a figure obtained by combining a circle and a pattern. The circle defines an outer shape of the button.

A name (for example, model name) of the connected printer 10, the information of the number of printable sheets (the number of remaining films), and the information of the state of charge of the battery are displayed as the status information of the printer 10. In a case where the number of printable sheets is N and the total number of instant films 12 loaded in a new film pack is M, the number of printable sheets is displayed in the form of "N/M". That is, the number of sheets printed after the film pack is replaced is also displayed in an understandable form. The information of the state of charge of the battery is displayed as a figure.

A last printed image LIM is displayed inside an image display frame FLO. The image display frame FLO is an image imitating the instant film 12. That is, the image display frame is a figure imitating the frame 12i provided near the observation region 12h of the instant film 12. The region inside the image display frame FLO is an image display region. The last printed image LIM is displayed being fitted in the image display region.

As shown in FIGS. 13 and 14, the function buttons are grouped into two groups (a first group MG1 and a second group MG2), and are displayed on the first top screen 200A and the second top screen 200B.

The first group MG1 is a group to which the function buttons of the motion picture print and the camera belong. The first group MG1 is a group of print modes, and is a group of functions to simply print the image.

The second group MG2 is a group to which the function buttons of the affinity diagnosis, the template print, the collage print, and the combined photograph belong. The second group MG2 is a group of plays modes, and a group of functions including a play element and a creation element.

The buttons (the simple print button MB1, the motion picture print button MB2, and the camera button MB3) belonging to the first group MG1 are displayed in a first group display region MA1 indicated by a broken line in FIGS. 13 and 14.

Meanwhile, the buttons (the affinity diagnosis button MB4, the template print button MB5, the collage print button MB6, and the combined photograph button MB7) belonging to the second group MG2 are displayed in a second group display region MA2 indicated by a broken line in FIGS. 13 and 14.

The first group display region MA1 is set along the horizontal direction (X direction) at a lower part of the screen. Meanwhile, the second group display region MA2 is set along the vertical direction (Y direction) at a right end of the screen.

The sizes of the first group display region MA1 and a button group (the simple print button MB1, the motion picture print button MB2, and the camera button MB3) displayed in the first group display region MA1 are changed on the first top screen 200A and the second top screen 200B. That is, the first group display region MA1 and the button group displayed in the first group display region MA1 are displayed on the first top screen 200A with a small size as shown in FIG. 13, and are displayed on the second top screen 200B with a large size as shown in FIG. 14. More specifically, the entire region of the lower part of the screen in the width direction (X direction) is the first group display region MA1 on the second top screen 200B as shown in FIG. 14, whereas the width thereof is decreased on the first top screen 200A (is decreased in a left direction of the screen) as shown in FIG. 13. Accordingly, the size of each button is also reduced.

The colors of the first group display region MA1 and the button group displayed in the first group display region MA1 are changed on the first top screen 200A and the second top screen 200B. FIGS. 13 and 14 show examples in which colors are displayed in reverse.

Similarly, the sizes of the second group display region MA2 and the button group (the affinity diagnosis button MB4, the template print button MB5, the collage print button MB6, and the combined photograph button MB7) displayed in the second group display region MA2 are changed on the first top screen 200A and the second top screen 200B. That is, the second group display region MA2 and the button group displayed in the second group display region MA2 are displayed on the first top screen 200A with a large size as shown in FIG. 13, and are displayed on the second top screen 200B with a small size as shown in FIG. 14. More specifically, the entire region of the screen right end in the vertical direction (Y direction) is the second group display region MA2 on the first top screen 200A as shown in FIG. 13, whereas a length thereof is decreased on the second top screen 200B (is decreased in an up direction of the screen) as shown in FIG. 13. Accordingly, the size of each button is also reduced.

Similarly to the first group display region MA1, the colors of the second group display region MA2 and the button group displayed in the second group display region MA2 are changed on the first top screen 200A and the second top screen 200B. FIGS. 13 and 14 show examples in which colors are displayed in reverse.

A setting button SEB of the print application is displayed in the second group display region MA2 on the first top screen 200A as shown in FIG. 13. Meanwhile, the setting button SEB is displayed in the first group display region MA1 on the second top screen 200B as shown in FIG. 14.

The status information of the printer is displayed in a status information display region MA3. The status information display region MA3 is set at the same position on the first top screen 200A and the second top screen 200B. As shown in FIGS. 13 and 14, the status information display region MA3 is set at an upper part of the screen.

The last printed image is displayed inside the image display frame FLO. The image display frame FLO is displayed on an upper side of the first group display region MA1 and on a left side of the second group display region MA2. As shown in FIG. 13, the image display frame FLO is tilted and displayed on the first top screen 200A. Meanwhile, the image display frame FLO is displayed straight along the screen the second top screen 200B.

In an unprinted state, the inside of the image display frame FLO is blank. Alternatively, a predetermined image is displayed. In addition, it is possible to set the turned-on and turned-off of the display of the last printed image in the setting of the print application. It is also possible to constantly display the predetermined image (for example, an image selected by the user).

As stated above, operability can be improved by preparing two top screens and switching the display as necessary. That is, in a case where the user wants to print simply, the second top screen 200B on which these function buttons (the simple print button MB1, the motion picture print button MB2, and the camera button MB3) are remarkably displayed with the large size is selected and displayed. Meanwhile, when the user wants to create the collage, the first top screen 200A on which the function buttons (the affinity diagnosis button MB4, the template print button MB5, the collage print button MB6, and the combined photograph button MB7) are remarkably displayed with the large size is selected and displayed. Accordingly, operability can be improved. It is possible to secure favorable operability easy to understand for the user even on a portable terminal with a small screen such as the smartphone. Since the top screens can be switched simply by changing the installation posture of the printer main body 14, the operation thereof can be simply performed. This type of operation is normally performed by setting the application program. According to the system of the present embodiment, it is possible to simply switch between the top screens without performing such a troublesome setting operation.

(A) Printing Using Simple Print Function

Hereinafter, a procedure in a case where the image stored in the smartphone 100 is printed by using the simple print function is described.

The rough processing procedure is (1) selection of the image to be printed and (2) instructing to print. The image is processed and edited as necessary.

Image Selection Screen

In a case where the simple print button MB1 is touched on the top screen (the first top screen 200A or the second top screen 200B), the simple print function is activated.

In a case where the simple print function is activated, the screen of the touch panel 120 is switched to the image selection screen 201. This screen is a screen for selecting the image to be printed.

Figure 15:
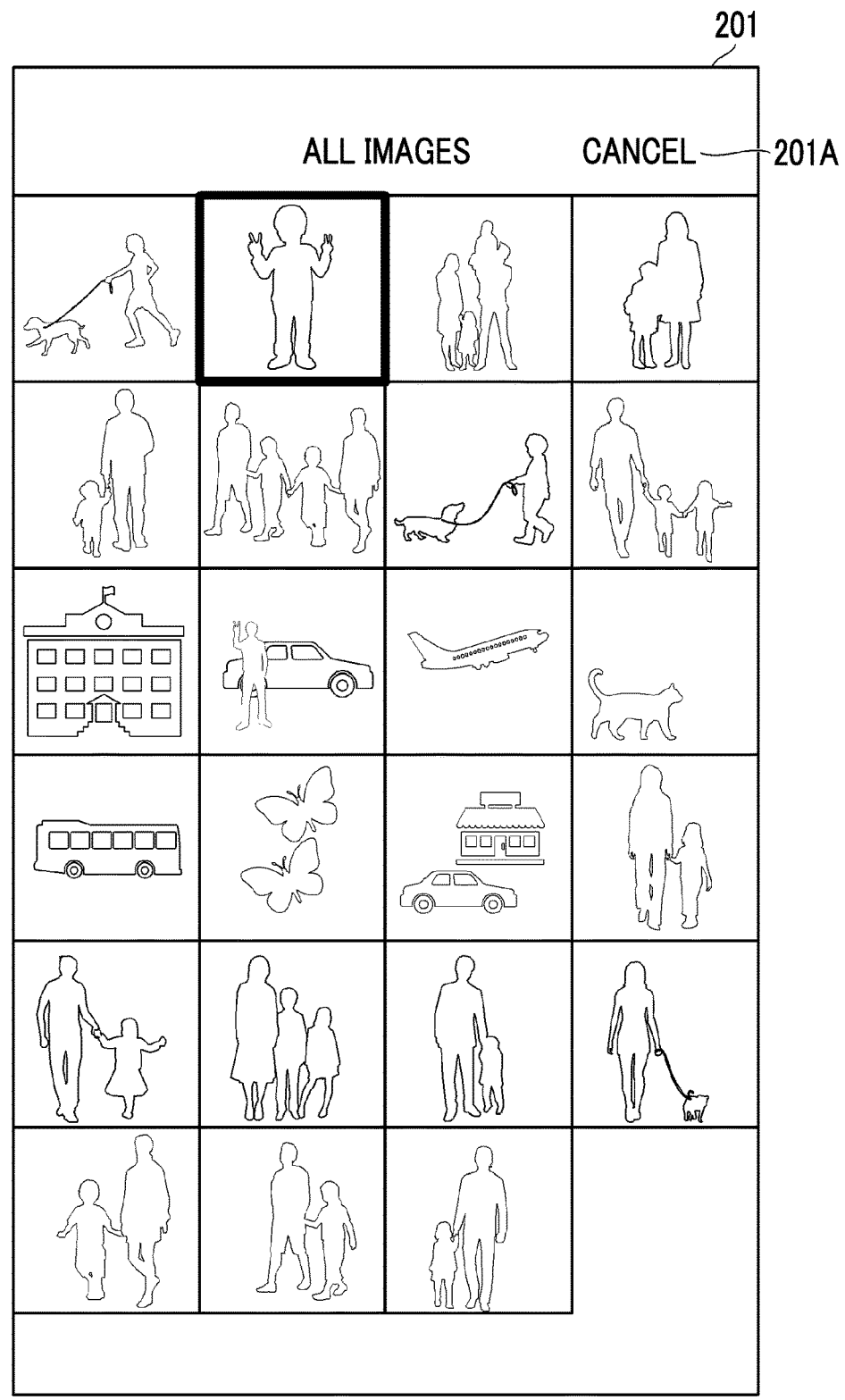
FIG. 15 is a diagram showing an example of an image selection screen.

FIG. 15 is a diagram showing an example of the image selection screen.

As shown in FIG. 15, the images stored in the smartphone 100 is displayed as a list in a thumbnail form on the image selection screen 201. That is, the images are displayed as a list in a reduced form. The user touches the thumbnail image of the image to be printed on the screen, and selects the image to be printed.

FIG. 15 shows an example in which all the images stored in the smartphone 100 are displayed as the list. Only images in a designated folder may be displayed.

A cancel button 201A is displayed on the image selection screen 201 as shown in FIG. 15. The cancel button 201A is a button for instructing to cancel an image selection process. In a case where the cancel button 201A is touched, the simple print function ends. In this case, the display of the screen is switched to the top screen 200.

Print Image Confirmation Screen

In a case where the image to be printed is selected, the screen of the touch panel 120 is switched to a print image confirmation screen 202. This screen is a screen for confirming the image to be printed (print image).

Figure 16:
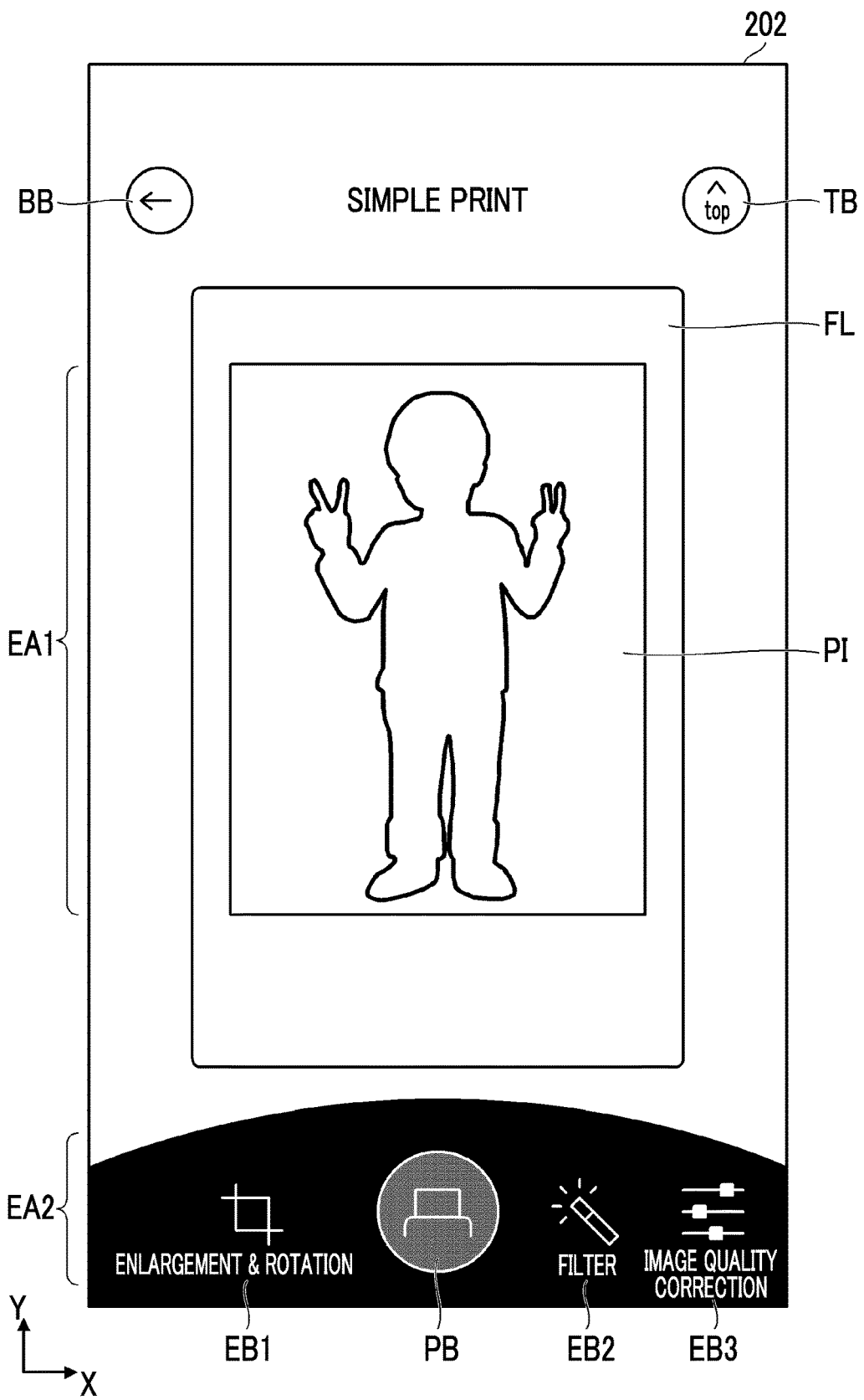
FIG. 16 is a diagram showing an example of a print image confirmation screen.

FIG. 16 is a diagram showing an example of the print image confirmation screen.

As shown in FIG. 16, a print image PI, a print button PB for instructing to print the print image PI, and image editing menu buttons are displayed on the print image confirmation screen 202.

The print image PI is displayed in an image display region EA1 set within the screen. A frame FL surrounding the image (print image PI) displayed in the image display region EA1 is displayed around the image display region EA1. The frame FL is an image imitating the instant film 12. That is, this frame FL is a figure imitating the frame 12i provided around the observation region 12h of the instant film 12 (has the same margin as the printed result (printout)). Accordingly, it is easy to confirm the final printed result on the screen.

The print button PB and the image editing menu buttons (an enlargement & rotation button EB1, a filter button EB2, and an image quality correction button EB3) are displayed in a button display region EA2. The button display region EA2 is set at a lower part of the screen. The print button PB and the image editing menu buttons (the enlargement & rotation button EB1, the filter button EB2, and the image quality correction button EB3) are displayed while being arranged in a line along the width direction (X direction in FIG. 16) of the screen in this button display region EA2. At this time, the print button PB is disposed at the center in the width direction (X direction), and three image editing menu buttons (the enlargement & rotation button EB1, the filter button EB2, and the image quality correction button EB3) are arranged and displayed on both sides thereof.

The print button PB and the image editing menu buttons (the enlargement & rotation button EB1, the filter button EB2, and the image quality correction button EB3) are displayed as icons. The print button PB is formed with a size larger than the other buttons (the enlargement & rotation button EB1, the filter button EB2, and the image quality correction button EB3) (the size of the image portion constituting the button is large). In the present embodiment, the color of the print button PB is formed in a color different from other buttons. Specifically, the other buttons are formed in white, whereas the print button PB is formed in red. Accordingly, it easy to understand a print instruction operation. In a case where another button is selected (touched), the color thereof is changed. Accordingly, the selected function can be clarified.

Menu titles are displayed below the image editing menu buttons (the enlargement & rotation button EB1, the filter button EB2, and the image quality correction button EB3). FIG. 16 shows an example in which an enlargement and rotation function, a filter function, and an image quality correction function are prepared as image editing menus.

The enlargement and rotation function is a function of enlarging and rotating the image. The enlargement and rotation function is assigned to the enlargement & rotation button EB1. In a case where the enlargement & rotation button EB1 is touched on the screen, the enlargement and rotation function is activated, and the image can be enlarged and rotated with respect to the print image PI.

The filter function is a function of performing the filter processing on the image. A button of the filter function is assigned to the filter button EB2. In a case where the filter button EB2 is touched on the screen, the filter function is activated, and the filter processing on the print image PI can be performed.

The image quality correction function is a function of correcting brightness, contrast, and saturation of the image. The image quality correction function is assigned to the image quality correction button EB3. In a case where the image quality correction button EB3 is touched on the screen, the image quality correction function is activated, and the image quality correction (the correction of the brightness, contrast, and saturation of the image) on the print image PI can be performed.

Each function is turned on (activated) in a case where the corresponding button is touched on the screen, and turned off in a case where the button is touched again. In a case where a button of another function is touched while one function is activated, the function is switched to the touched function. For example, in a case where the image quality correction button EB3 is touched while the filter function is activated, the filter function ends, and the image quality correction function is turned on.

As shown in FIG. 16, a back button BB and a top button TB are displayed on the print image confirmation screen 202. The back button BB is a button for instructing to return to the previous screen. The top button TB is a button for instructing to return to the top screen 200. The back button BB and the top button TB are arranged at the upper part of the screen.

In a case where the screen is returned to the top screen, the top screen corresponding to the installation posture of the printer main body 14 is displayed. That is, in a case where the printer main body 14 is vertically placed, the first top screen 200A (see FIG. 13) is displayed, and in a case where the printer main body 14 is horizontally placed, the second top screen 200B (see FIG. 14) is displayed. In this case, first, an installation posture detection command is output from the smartphone 100 to the printer 10. The printer 10 detects the installation posture of the printer main body 14 by receiving this detection command. The control signal corresponding to the detected installation posture is generated and transmitted to the smartphone 100. The smartphone 100 receives the control signal transmitted from the printer 10, and decides the top screen to be displayed.

Enlargement and Rotation Operation Screen

In a case where the enlargement & rotation button EB1 is touched on the screen, the screen is switched to an operation screen for the enlargement and rotation function, that is, an operation screen (enlargement and rotation operation screen) 203 for performing an image enlargement operation and a rotation operation.

Figure 17:
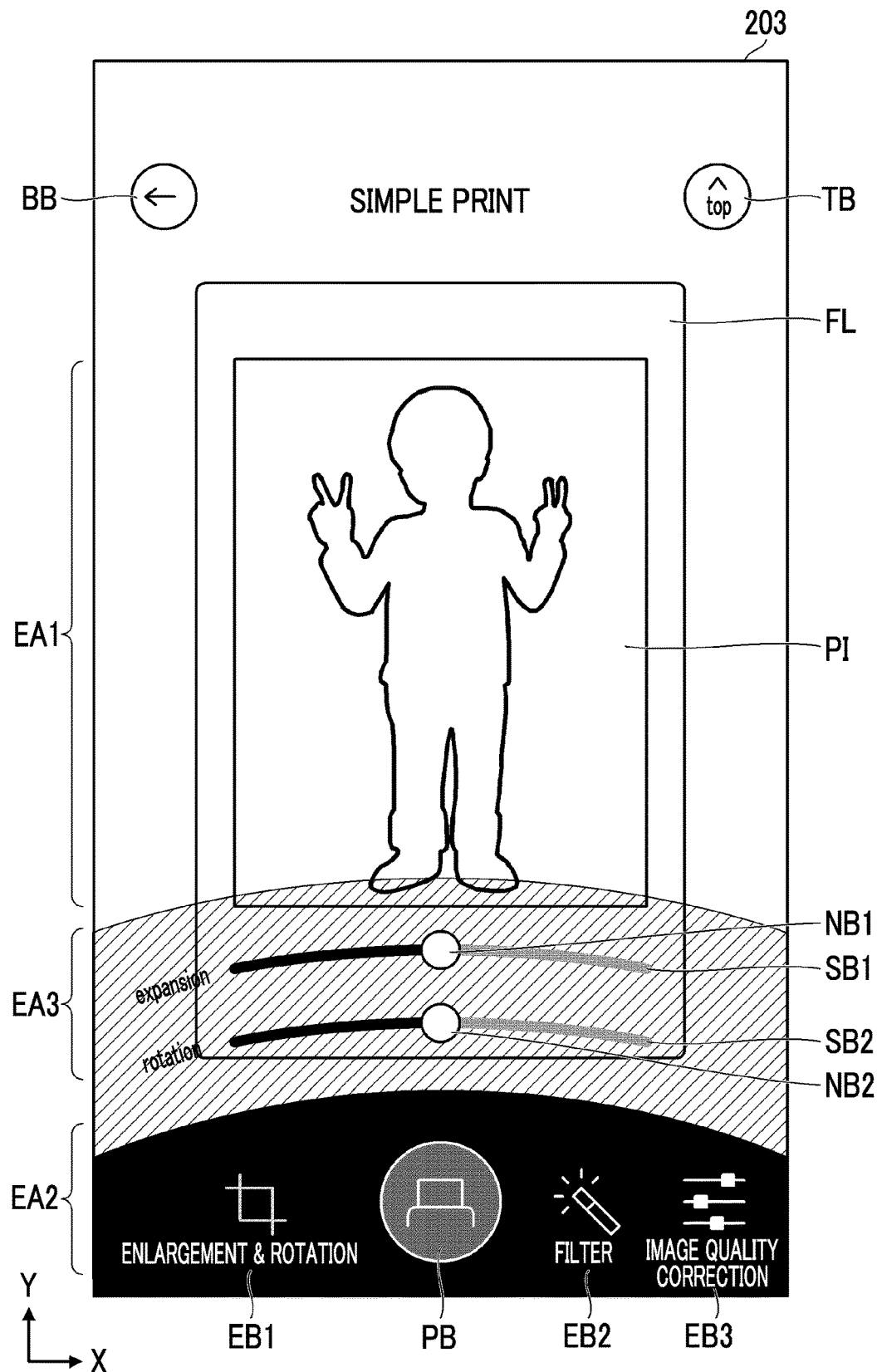
FIG. 17 is a diagram showing an example of an enlargement and rotation operation screen.

FIG. 17 is a diagram showing an example of the enlargement and rotation operation screen.

On the enlargement and rotation operation screen 203, an enlargement slide bar SB1 for an enlargement operation and a rotation slide bar SB2 for a rotation operation are displayed in addition to the display contents on the print image confirmation screen 202.

The enlargement slide bar SB1 is operated by sliding a knob NB1 (touching and sliding the knob NB1). In a case where the enlargement slide bar SB1 is operated, the image is enlarged according to an operation amount. The print image PI is enlarged in a case where the knob NB1 is slid in a right direction of the screen, and is reduced in a case where the knob NB1 is slid in the left direction.

The rotation slide bar SB2 is operated by sliding a knob NB2. In a case where the rotation slide bar SB2 is operated, the image is rotated according to an operation amount. The print image PI is rotated clockwise in a case where the knob NB2 is slid in the right direction of the screen, and is rotated counterclockwise in a case where the knob NB2 is slid in the left direction. In a case where the knob NB2 is slid from a left end to a right end of the bar, the image is rotated once.

The enlargement slide bar SB1 and the rotation slide bar SB2 are displayed in an operation region EA3. The operation region EA3 is set between the image display region EA1 and the button display region EA2 in the vertical direction (Y direction) of the screen. As shown in FIG. 17, the enlargement slide bar SB1 and the rotation slide bar SB2 are vertically arranged in this region. Both the enlargement slide bar SB1 and the rotation slide bar SB2 are displayed in a curved shape. More specifically, the enlargement slide bar and the rotation slide bar are displayed along a circle using a point set on a straight line passing through the center of the screen in the width direction (X direction), and are displayed horizontally symmetric with respect to a straight line passing through the center of the screen in the width direction. As stated above, the entire length can be increased by curving and displaying the image in an arc shape as compared to a case where the image is displayed as a straight line. Accordingly, the resolution of the operation can be improved, and a more precise operation can be performed. This is particularly effective in a case where a display size of the screen is small.

Filter Operation Screen

In a case where the filter button EB2 is touched on the screen, the screen is switched to an operation screen for the filter function, that is, an operation screen (filter operation screen) 204 for performing the filter processing on the image.

Figure 18:
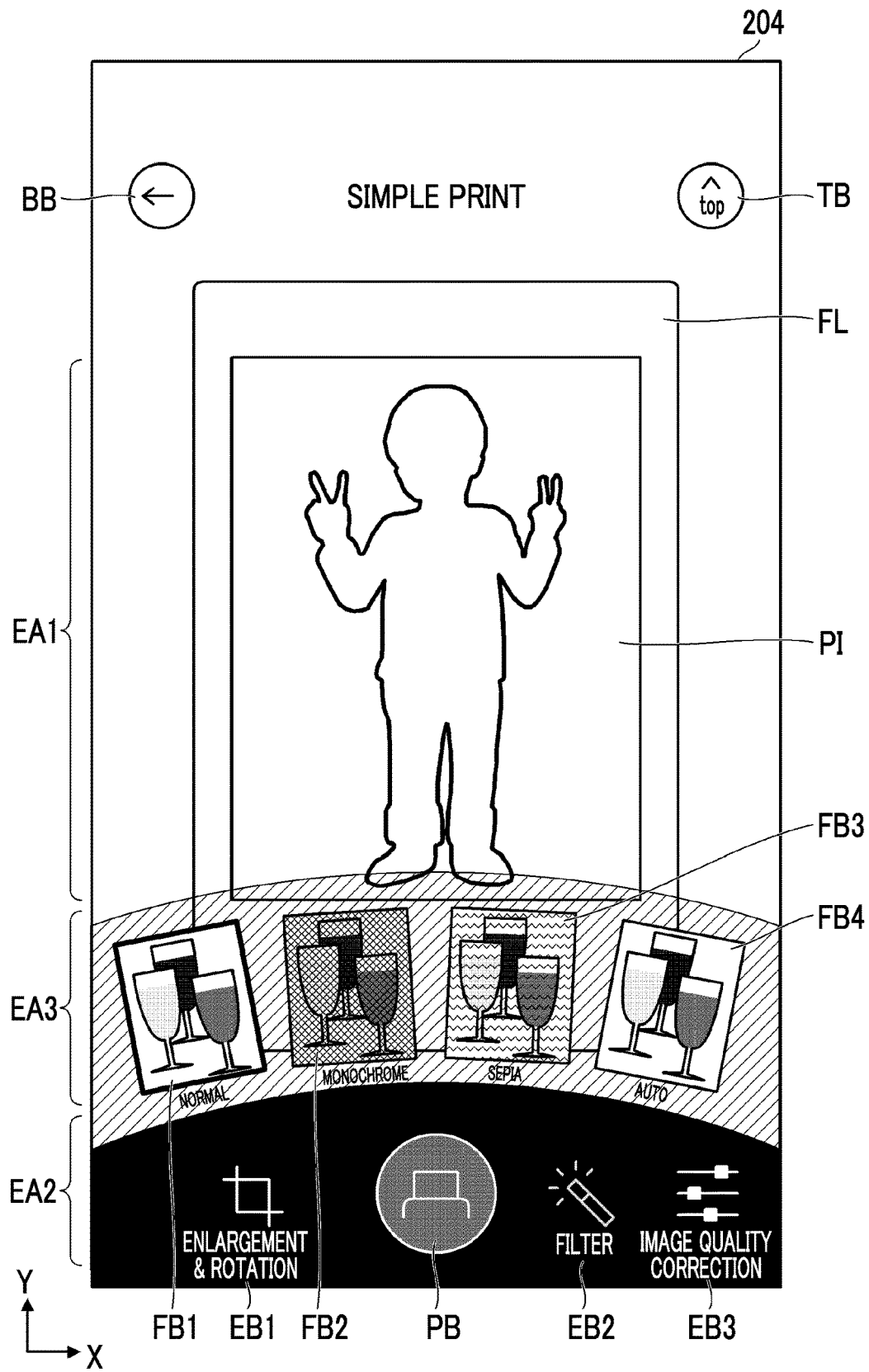
FIG. 18 is a diagram showing an example of a filter operation screen.

FIG. 18 is a diagram showing an example of the filter operation screen.

On the filter operation screen 204, a selection button of a filter to be applied is displayed in addition to the display contents on the print image confirmation screen 202. FIG. 18 shows an example in which four buttons are displayed as selection buttons. Specifically, an example in which a normal button FB1 for returning to a normal state, a monochrome button FB2 for applying a monochrome filter, a sepia button FB3 for applying a sepia filter, and an auto button FB4 for applying an auto filter are displayed is illustrated.

Here, the monochrome filter is a filter that converts an image into black and white. In a case where the monochrome button FB2 is touched on the screen, the print image PI displayed in the image display region EA1 is converted into black and white.

The sepia filter is a filter that changes the color tone of the image to a sepia tone. In a case where the sepia button FB3 is touched on the screen, the color tone of the print image PI displayed in the image display region EA1 is set to the sepia tone.

The auto filter is a filter that automatically optimizes the color tone of the image. In a case where the auto button FB4 is touched on the screen, the color tone of the print image PI displayed in the image display region EA1 is automatically corrected.

In a case where the normal button FB1 is touched on the screen, the applied filter is canceled, and the state is returned to the original state.

The selection buttons (the normal button FB1, the monochrome button FB2, the sepia button FB3, and the auto button FB4) of the filter have a rectangular shape corresponding to the outer shape of the print image PI displayed in the image display region EA1. More specifically, the selection buttons have a shape similar to the outer shape of the print image PI (including a shape recognized to be substantially similar).

A common image on which the same filter processing as the applied filter is performed is displayed in each button. For example, a chrome image even in black and white is displayed as the image constituting the monochrome button FB2.

The buttons are expanded and displayed in the operation region EA3, and are displayed radially around a point set at a straight line passing through the center of the screen in the width direction. As stated above, the buttons are radially displayed, and thus, it is possible to increase the number and size of buttons capable of being displayed as compared to a case where the buttons are displayed in a straight line. Accordingly, operability can be improved. The number of buttons to be displayed on one screen can be adjusted by adjusting the curvature of the arc. That is, in a case where the button sizes are the same, the buttons capable of being displayed at once can be increased as the curvature becomes larger (the curve becomes larger).

Image Quality Correction Operation Screen

In a case where the image quality correction button EB3 is touched on the screen, the screen is switched to an operation screen for an image quality correction function, that is, an operation screen (image quality correction operation screen) 205 for performing the correction operation of the brightness, contrast, and saturation of the image.

Figure 19:
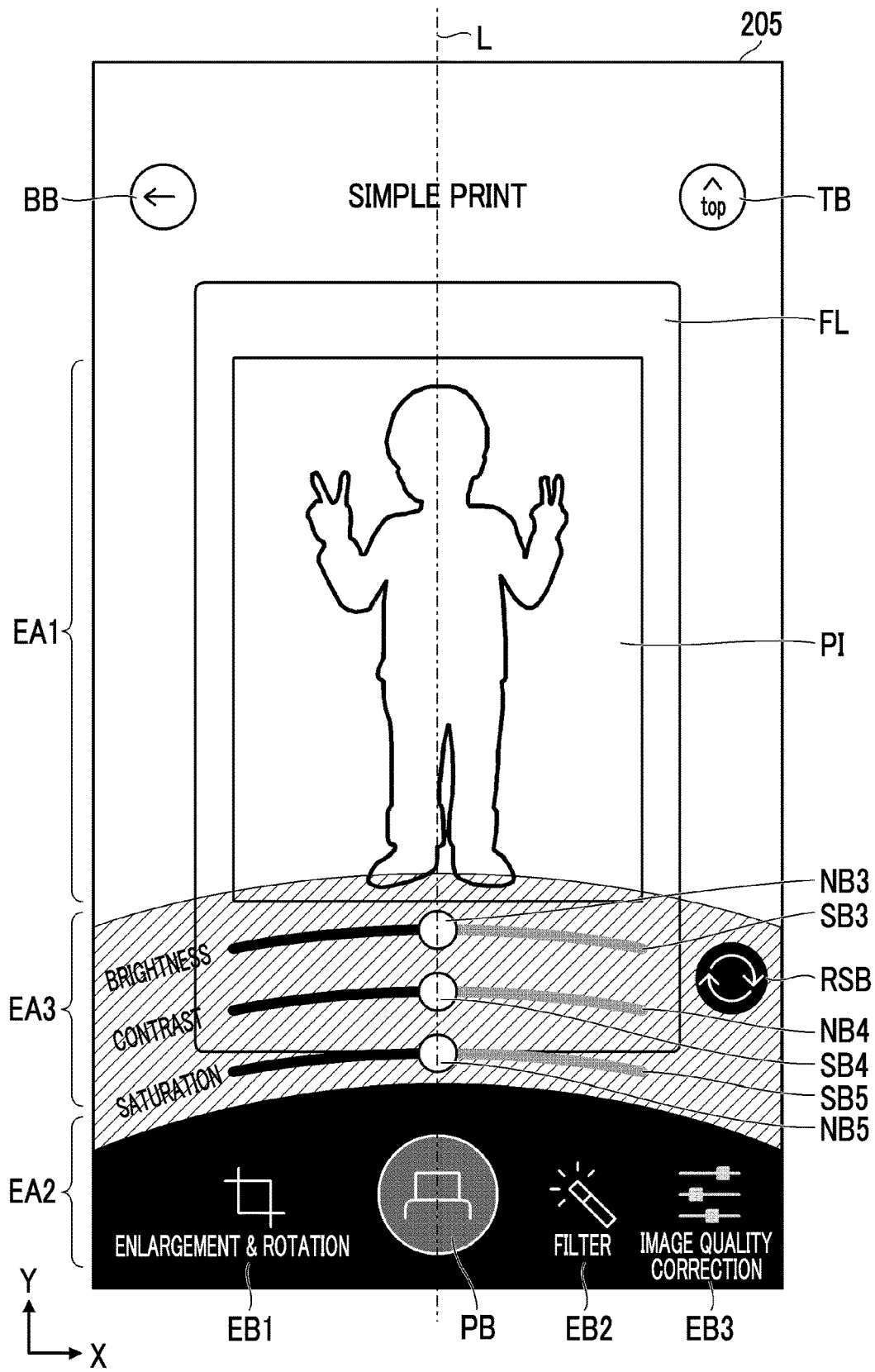
FIG. 19 is a diagram showing an example of an image quality correction operation screen.

FIG. 19 is a diagram showing an example of the image quality correction operation screen.

On the image quality correction operation screen 205, a brightness adjustment slide bar SB3 for adjusting the brightness of the image, a contrast adjustment slide bar SB4 for adjusting the contrast of the image, a saturation adjustment slide bar SB5 for adjusting the saturation of the image, and a reset button RSB are displayed in addition to the display contents on the print image confirmation screen 202.

The brightness adjustment slide bar SB3 is operated by sliding a knob NB3. In a case where the brightness adjustment slide bar SB3 is operated, the brightness of the image is changed according to an operation amount. The knob NB3 is located in the center of the bar by default. The print image PI becomes brighter in a case where the knob NB3 is slid in the right direction of the screen, and becomes darker in a case where the knob NB3 is slid in the left direction.

The contrast adjustment slide bar SB4 is operated by sliding a knob NB4. In a case where the contrast adjustment slide bar SB4 is operated, the contrast of the image is changed according to an operation amount. The knob NB4 is located in the center of the bar by default. The print image PI has a high contrast in a case where the knob NB4 is slid in the right direction of the screen, and has a low contrast in a case where the knob NB4 is slid in the left direction.

The saturation adjustment slide bar SB5 is operated by sliding a knob NB5. In a case where the saturation adjustment slide bar SB5 is operated, the saturation of the image is changed according to an operation amount. The knob NB5 is located in the center of the bar by default. The print image PI has high saturation in a case where the knob NB5 is slid in the right direction of the screen, and has a low saturation in a case where the knob NB5 is slid in the left direction.

The reset button RSB is a button for resetting the operation of each slide bar (the brightness adjustment slide bar SB3, the contrast adjustment slide bar SB4, and the saturation adjustment slide bar SB5). In a case where the reset button RSB is touched, the operation of each slide bar is reset. That is, the knob of each slide bar returns to the default position (center).

Each slide bar (the brightness adjustment slide bar SB3, the contrast adjustment slide bar SB4, and the saturation adjustment slide bar SB5) and the reset button RSB are displayed in the operation region EA3. As shown in FIG. 19, the slide bars are vertically arranged in this region. Each slide bar is displayed in a shape curved in an arc shape. More specifically, the slide bars are displayed along a circle using a point set at a straight line passing through the center in the width direction, and are displayed horizontally symmetric with respect to a straight line passing through the center in the width direction. Accordingly, the resolution of the operation can be improved, and a more precise operation can be performed. The reset button RSB is disposed at a right end of the operation region E3.

Operation Screen in Case Printing is Performed

In a case where the print button PB is touched on the screen, the printing of the print image PI displayed in the image display region EA1 is instructed. In a case where the printing is instructed, the image data of the print image PI is transmitted to the printer 10.

In a case where the transmission of the print image PI is executed, an animation showing the image transmission is displayed. Specifically, the print image PI moves together with the frame FL, and an animation showing that the image disappears from an edge of the screen is displayed.

Figure 20:
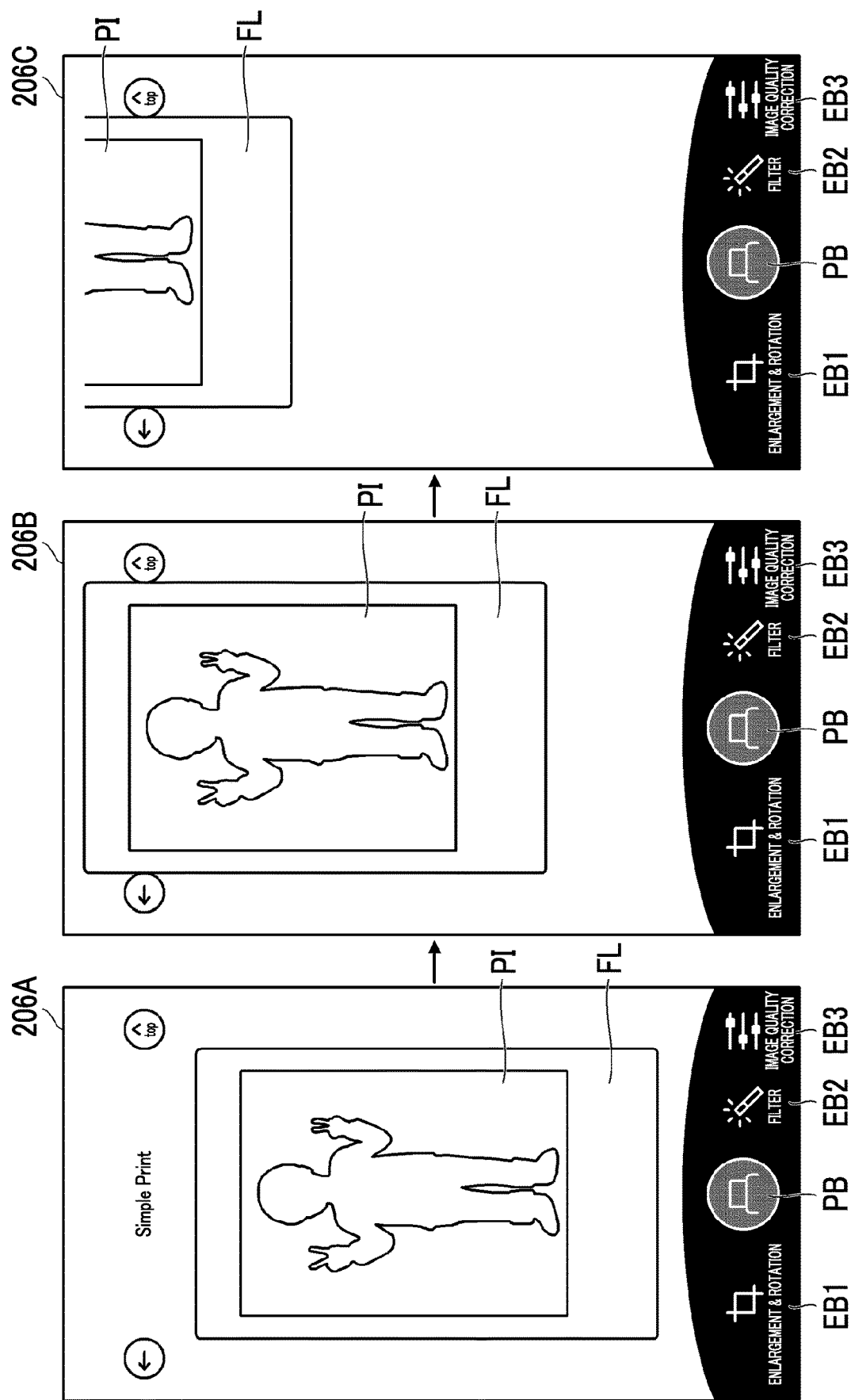
FIG. 20 is a diagram showing an example of animation display in a case where printing is instructed.

FIG. 20 is a diagram showing an example of an animation display in a case where the printing is instructed.

In a case where the printing is instructed, the screen is changed to a screen 206A, a screen 206B, and a screen 206C in a sequence of time. As shown in this diagram, the print image PI moves upward along the longitudinal direction of the screen together with the frame FL, and disappears from an upper edge of the screen (imitating a video on which the instant film is sent). Accordingly, it is possible to easily recognize that the image is transmitted to the printer.

(B) Printing Using Template Print Function

Hereinafter, a procedure in a case where the image stored in the smartphone 100 is printed by using the template print function is described. As described above, in template printing, the template image is combined with the image, and the combined image is printed. The rough processing procedure is (1) selection of the template, (2) selection of the image to be printed, and (3) instructing to print. The image is processed and edited as necessary.

Template Selection Screen

In a case where the template print button MB5 is touched on the top screen (see FIGS. 13 and 14), the template print function is activated. In a case where the template print function is activated, the screen of the touch panel 120 is switched to a template selection screen 210. This screen is a screen for selecting the template image to be combined with the image to be printed.

Figure 21:
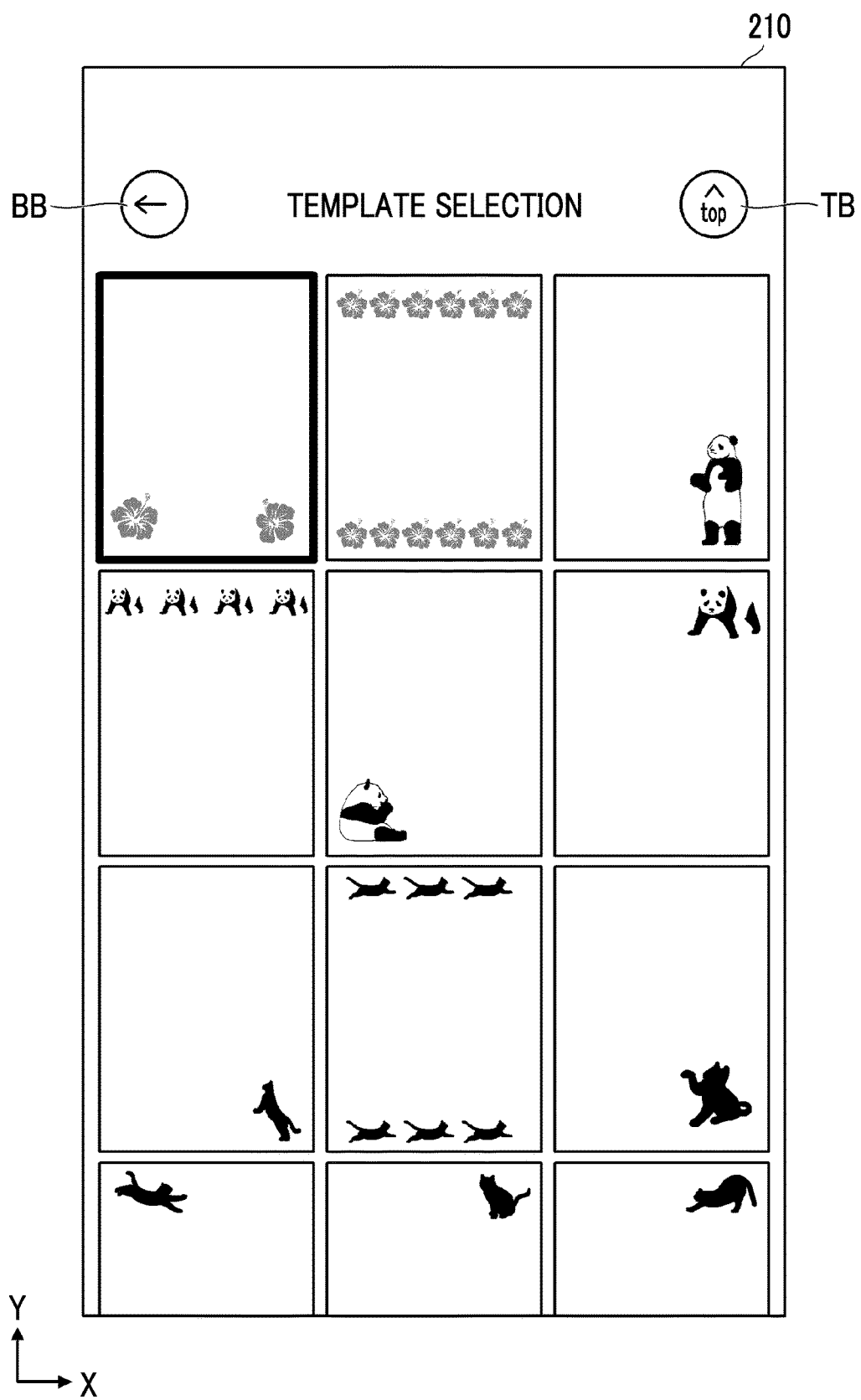
FIG. 21 is a diagram showing an example of a template print selection screen.

FIG. 21 is a diagram showing an example of the template print selection screen.

As shown in this diagram, available template images are displayed as a list in a thumbnail form on the template selection screen 210. The user touches and selects a template image having a desired pattern on the screen.

Image Selection Screen

In a case where the template image to be used is selected on the template selection screen 210, the screen of the touch panel 120 is switched to an image selection screen 201 (see FIG. 15). The user selects the image to be printed on this screen.

Print Image Confirmation Screen

In a case where the image to be printed is selected, the screen of the touch panel 120 is switched to the print image confirmation screen 202. This screen is a screen for confirming the image to be printed (print image).

Figure 22:
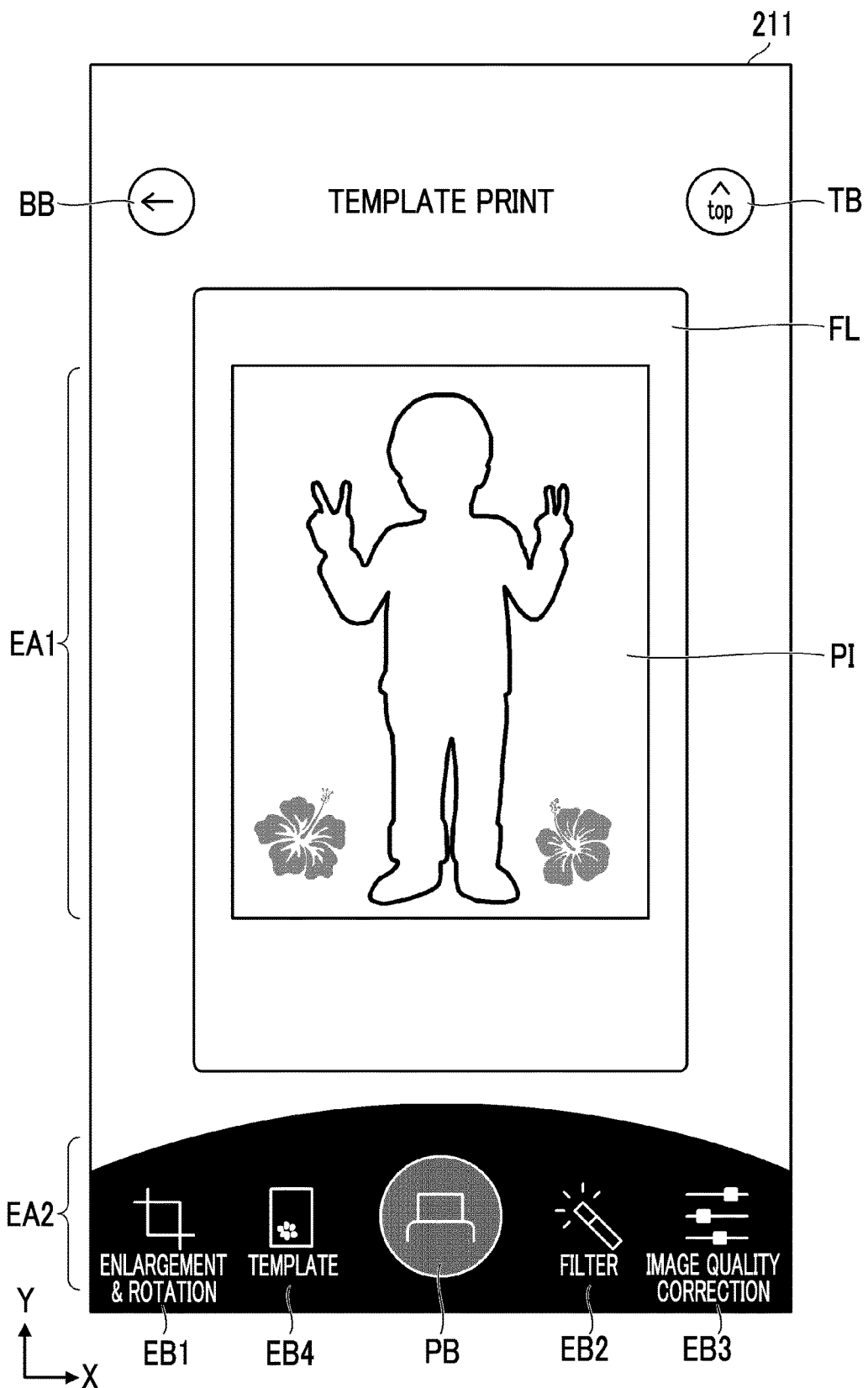
FIG. 22 is a diagram showing an example of a print image confirmation screen in template printing.

FIG. 22 is a diagram showing an example of a print image confirmation screen in the template printing.

The print image confirmation screen 202 in the template printing has the screen configuration of the print image confirmation screen 202 of the simple printing except that a template button EB4 is added as the image editing menu button. The template button EB4 is a button for calling a function for switching between the template images.

Template Switching Operation Screen

Since the enlargement and rotation function, the filter function, and the image quality correction function are the same as those in the simple printing, a template image switching function will be described here.

In a case where the template button EB4 is touched, the screen is switched to an operation screen (template switching operation screen) 212 for performing a template image switching operation.

Figure 23:
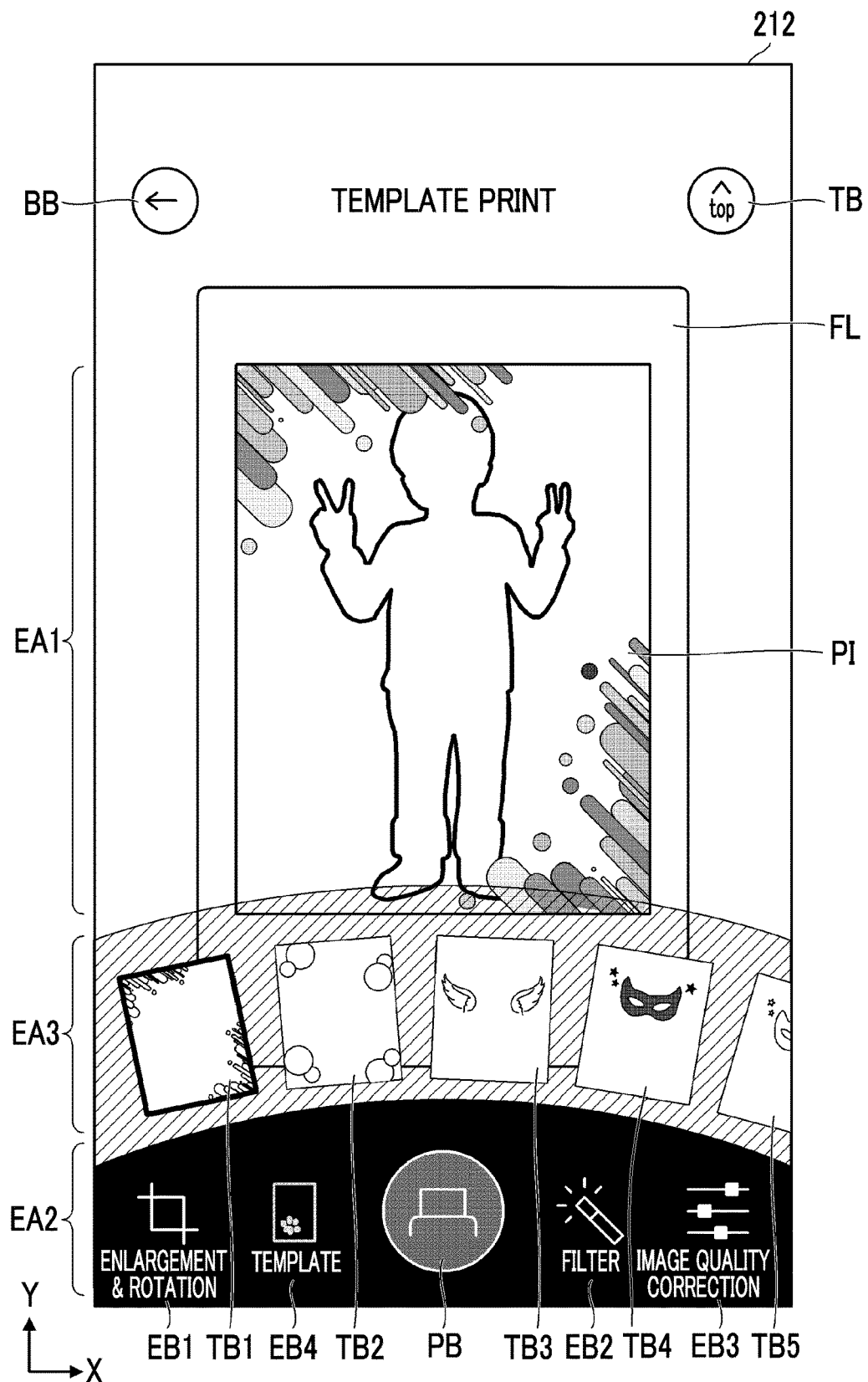
FIG. 23 shows an example of a template switching operation screen.

FIG. 23 is a diagram showing an example of the template switching operation screen.

On the template switching operation screen 212, template image selection buttons TB1, TB2, . . . of switchable templates are displayed in addition to the display contents on the print image confirmation screen 202. The user touches and selects the selection button of the template image desired to be switched on the screen.

Each button is an image obtained by reducing the template image selected by the button. Therefore, the outer shape has a shape similar to the outer shape of the print image PI (including a shape recognized to be substantially similar).

Similar to the filter selection buttons, the template image selection buttons TB1, TB2, . . . are expanded and displayed in the operation region EA3, and are displayed radially around a point set at a straight line passing through the center of the screen in the width direction.

A predetermined number of selection buttons TB1, TB2, . . . are displayed in the operation region EA3. FIG. 23 shows an example in which four selection buttons are displayed at once (the number of entire buttons capable of being displayed is four). Other selection buttons are scrolled and displayed. The scrolling is performed by performing a swipe operation or a flick operation on the selection button displayed in the operation region EA3. Here, the swipe operation is an operation of sliding a finger while touching the screen. The flick operation is an operation of more vigorously swiping, flipping the screen, and sliding the finger away from the screen.

Figure 24:
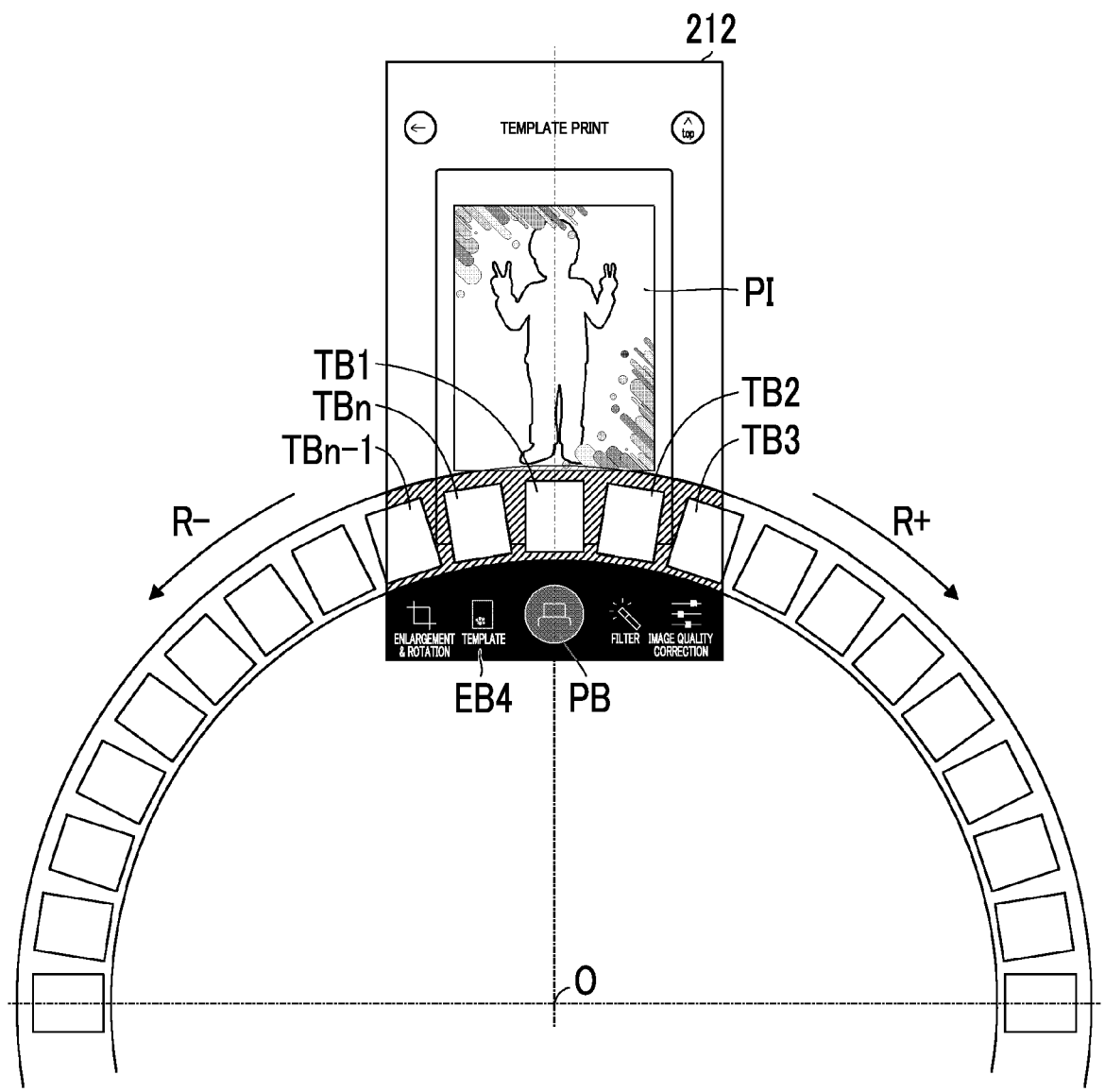
FIG. 24 is a conceptual diagram of scrolling of selection buttons displayed in an operation region.

FIG. 24 is a conceptual diagram of the scrolling of the selection buttons displayed in the operation region.

As shown in this diagram, the selection buttons TB1, TB2, . . . displayed in the operation region EA3 are scrolled in the right direction (arrow R+ direction) along the arc (scrolled clockwise) by performing the swipe operation or the flick operation on the screen in the right direction. The screen is scrolled in the left direction (arrow R− direction)

along the arc (scrolled counterclockwise) by performing the swipe operation or the flick operation on the screen in the left direction.

Operation Screen in Case Printing is Performed

The execution of the printing is the same as that in a case where the simple printing is performed. That is, the printing is instructed by touching the print button PB on the screen. In a case where the printing is instructed, the image data of the print image PI is transmitted to the printer 10. An animation showing the image transmission is displayed as in the simple printing (see FIG. 20).

(C) Printing Using Collage Print Function

Hereinafter, a procedure in a case where the image stored in the smartphone 100 is printed by using the collage print function is described. As described above, in collage printing, the printing is performed by applying images to regions of a divided frame. The rough processing procedure is (1) selection of the divided frame, (2) selection of the images to be combined, and (3) instructing to print. The images to be combined are processed and edited as necessary.

Divided Frame Selection Screen

In a case where the collage print button MB6 is touched on the top screen (see FIGS. 13 and 14), the collage print function is activated. In a case where the collage print function is activated, the screen of the touch panel 120 is switched to a divided frame selection screen 220. This screen is a screen for selecting the divided frame.

Figure 25:
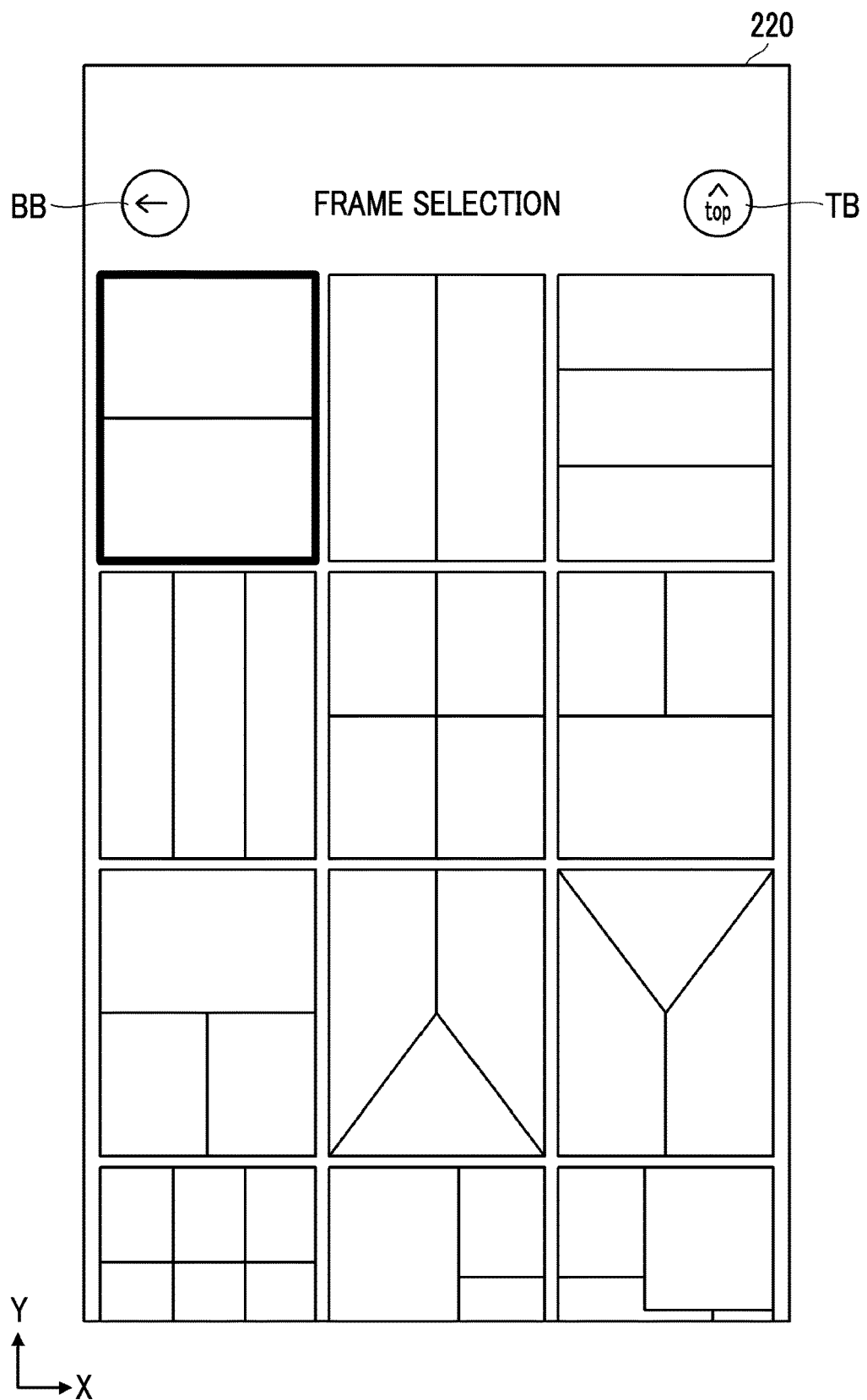
FIG. 25 is a diagram showing an example of a divided frame selection screen.

FIG. 25 is a diagram showing an example of the divided frame selection screen.

As shown in this diagram, on the divided frame selection screen 220, images of selectable divided frames (images showing division modes within the frame) are displayed as a list in a thumbnail form. The user touches and selects the image of the desired divided frame on the screen.

Collage Image Creation Screen

In a case where the divided frame to be used is selected on the divided frame selection screen 220, the screen of the touch panel 120 is switched to a collage image creation screen 221. This screen is a screen for creating the collage image.

Figure 26:
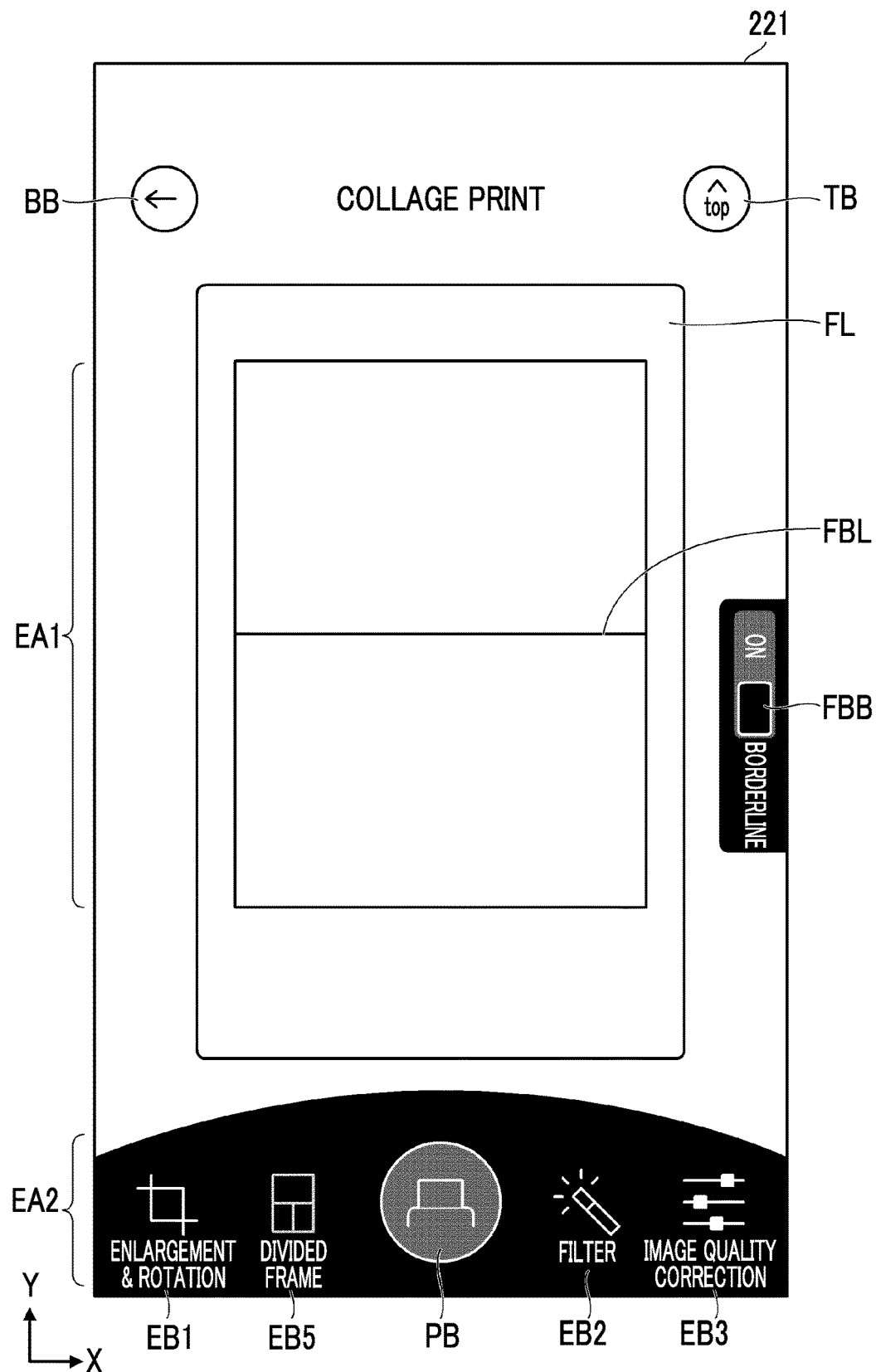
FIG. 26 shows an example of a collage image creation screen.

FIG. 26 is a diagram showing an example of the collage image creation screen.

The screen configuration is the same as the screen configuration of the print image confirmation screen 202 of the simple printing except that the inside of the image display region EA1 is divided according to the selected divided frame, a borderline button FBB for turning on and off the display of a divided borderline is displayed, and a divided frame button EB5 is added as the image editing menu button.

The internal region of the image display region EA1 is divided according to the selected divided frame. The borderline button FBB turns on and off the display of a divided borderline FBL. Whenever the user touches the borderline button FBB on the screen, the display of the divided borderline is turned on and off. In a case where the borderline button FBB is turned on, the borderline FBL is displayed in the image display region EA1. FIG. 26 shows a case where the display of the borderline FBL is turned on.

In a case where the display of the borderline is turned on, the borderline is also displayed on the image to be printed.

In a case where a region in which the images are to be combined is touched in the image display region EA1, the screen of the touch panel 120 is switched to the image selection screen (see FIG. 15). The user selects the image to be combined on this screen. In a case where the image is selected, the screen returns to the collage image creation screen 221 again. At this time, the selected image is displayed by being applied to the selected region.

Figure 27:
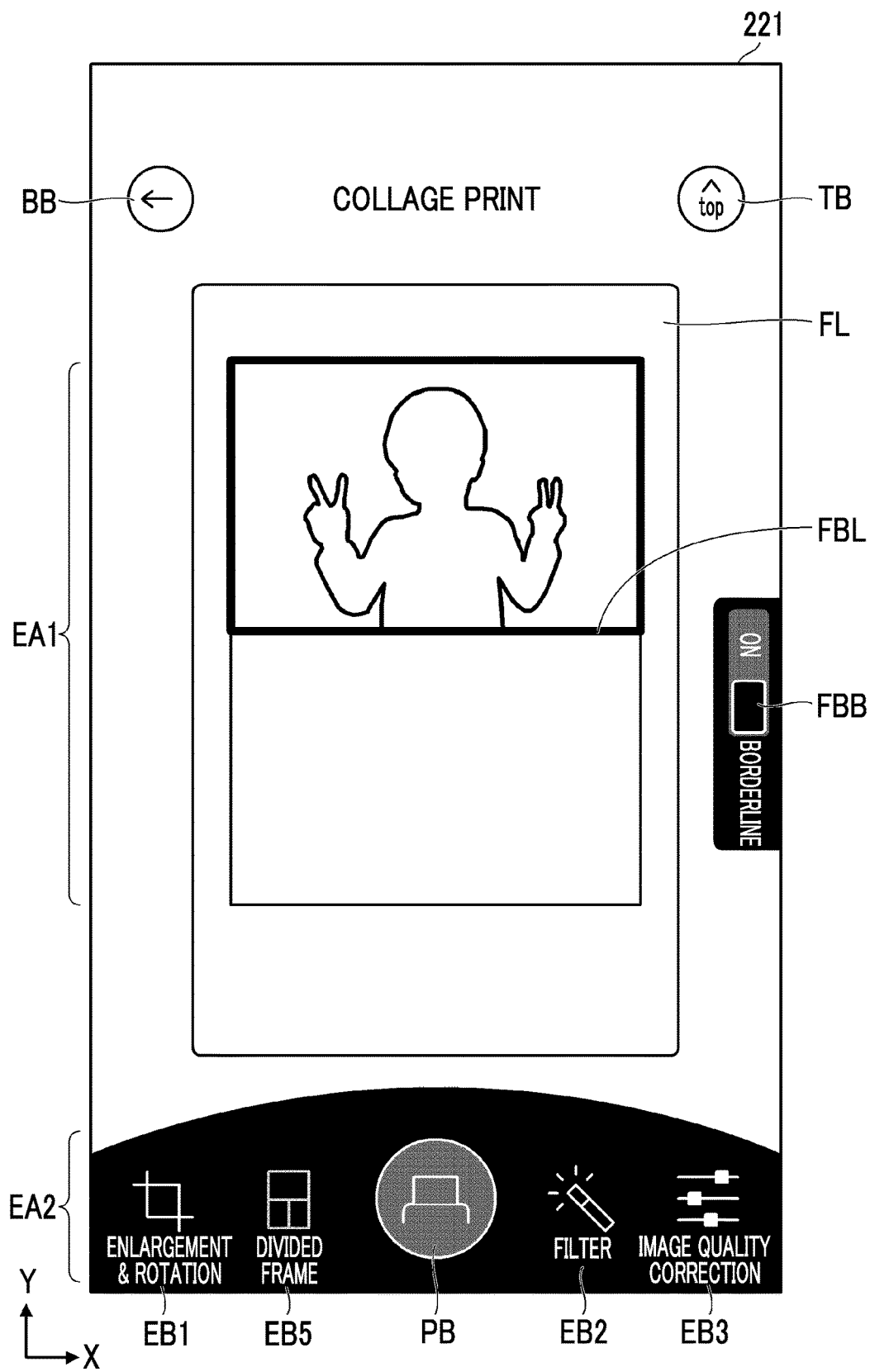
FIG. 27 is a diagram showing an example of the collage image creation screen after the image is selected.

FIG. 27 is a diagram showing an example of the collage image creation screen after the image is selected.

This diagram shows an example of the display of the screen in a case where a region on the upper side of the screen in the divided frame of which the inside is divided into two equal upper and lower regions and the image to be combined is selected. As shown in this diagram, the selected image is displayed by being applied to the selected region.

In a case where the user moves the finger while touching the image in the selected region, the position of the image is adjusted. In a case where the selected image is changed, a region in which the image is to be changed is touched and selected, and the back button BB is touched. Due to the present operation, the image can be selected by switching the screen to the image selection screen (see FIG. 15). The images may be switched in order by performing the flick operation on the screen within the region.

The images are selected for all the regions of the divided frame, and the collage image is completed.

The selected images of the regions can be individually processed and edited by using the enlargement and rotation function, the filter function, and the image quality correction function. The enlargement and rotation function, the filter function, and the image quality correction function are the same as those in the simple printing.

Divided Frame Switching Operation Screen

The divided frame button EB5 displayed in the button display region EA2 is a button for calling a function for switching the divided frames. In a case where the divided frame button EB5 is touched, the screen is switched to an operation screen (divided frame switching operation screen) 222 for performing a switching operation of the divided frames.

Figure 28:
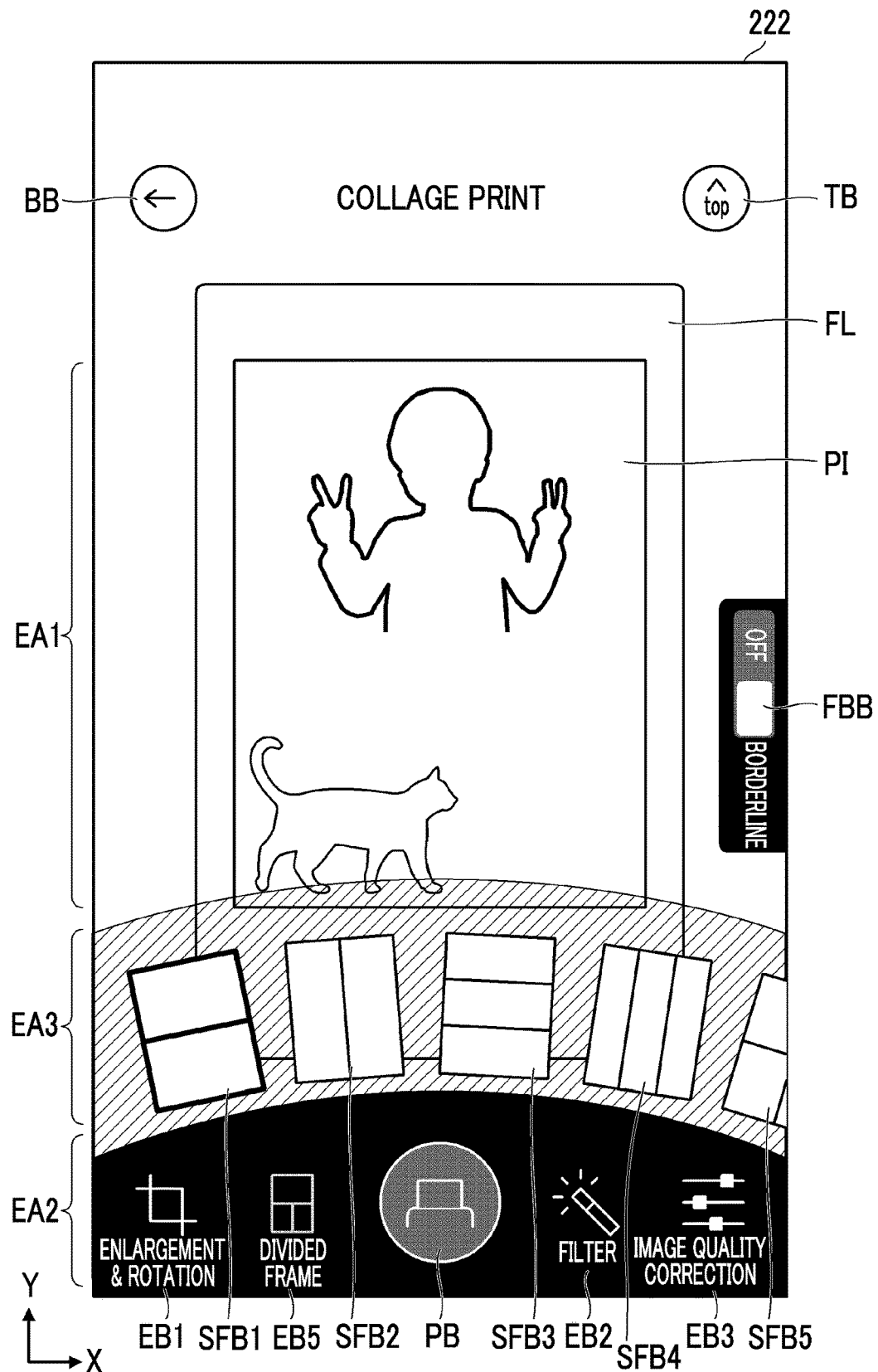
FIG. 28 is a diagram showing an example of a divided frame switching operation screen.

FIG. 28 is a diagram showing an example of the divided frame switching operation screen.

On the divided frame switching operation screen 222, divided frame selection buttons SFB1, SFB2, . . . for selecting switchable divided frames are displayed in addition to the display contents on the collage image creation screen 221. The user touches and selects the selection button of the divided frame desired to be switched on the screen.

Each button includes an image obtained by reducing the image of the divided frame selected by the button. Therefore, the outer shape has a shape similar to the outer shape of the print image (including a shape recognized as being substantially similar).

Similar to the template image selection buttons, the divided frame selection buttons SFB1, SFB2, . . . are displayed in the operation region EA3, and are displayed radially around a point set at a straight line passing through the center of the screen in the width direction. A predetermined number of divided frame selection buttons SFB1, SFB2, . . . are displayed in the operation region EA3. Similar to the template image selection buttons, the other divided frame selection buttons are scrolled and displayed (see FIG. 24).

In a case where the divided frames are switched, the image of each region is selected again.

Operation Screen in Case Printing is Performed

In a case where the collage image is completed, the printing can be performed. The execution of the printing is the same as that in a case where the simple printing is performed. That is, the printing is instructed by touching the print button PB on the screen. In a case where the printing is instructed, the image data of the print image PI (the generated collage image) is transmitted to the printer 10. An animation showing the image transmission is displayed as in the simple printing (see FIG. 20).

(D) Printing Using Combined Photograph Function

Hereinafter, a procedure in a case where the image stored in the smartphone 100 is printed by using the combined photograph function is described. As described above, in the combined photograph, one image is divided into a plurality of images, and the images are printed. The rough processing procedure is (1) selection of the layout, (2) selection of the image, and (3) instructing to print. The image is processed and edited as necessary.

Layout Selection Screen

In a case where the combined photograph button MB7 is touched on the top screen (see FIGS. 13 and 14), the combined photograph function is activated. In a case where the combined photograph function is activated, the screen of the touch panel 120 is switched to a layout selection screen 230. This screen is a screen for selecting a divided layout.

Figure 29:
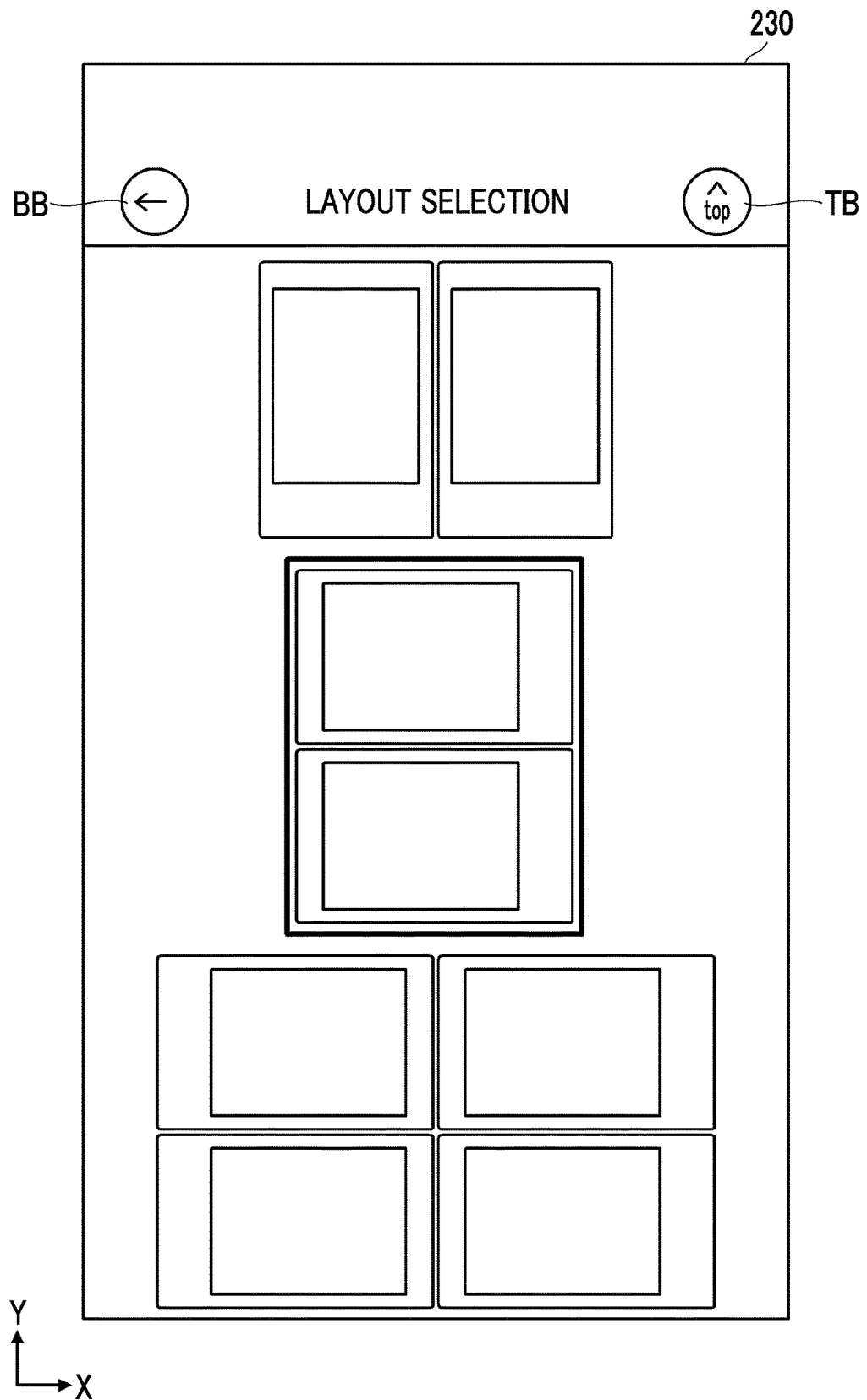
FIG. 29 is a diagram showing an example of a layout selection screen.

FIG. 29 is a diagram showing an example of the layout selection screen.

As shown in this diagram, images of selectable layouts are displayed as a list on the layout selection screen 230. Images having selectable layouts are images in which images imitating the instant films are arranged according to division modes. The user touches and selects the image of the desired layout on the screen.

Image Selection Screen

In a case where the layout is selected on the layout selection screen 230, the screen of the touch panel 120 is switched to the image selection screen 201 (see FIG. 15). The user selects the image to be printed on this screen.

Print Image Confirmation Screen

In a case where the image to be printed is selected, the screen of the touch panel 120 is switched to a print image confirmation screen 231. This screen is a screen for confirming the image to be printed (print image).

Figure 30:
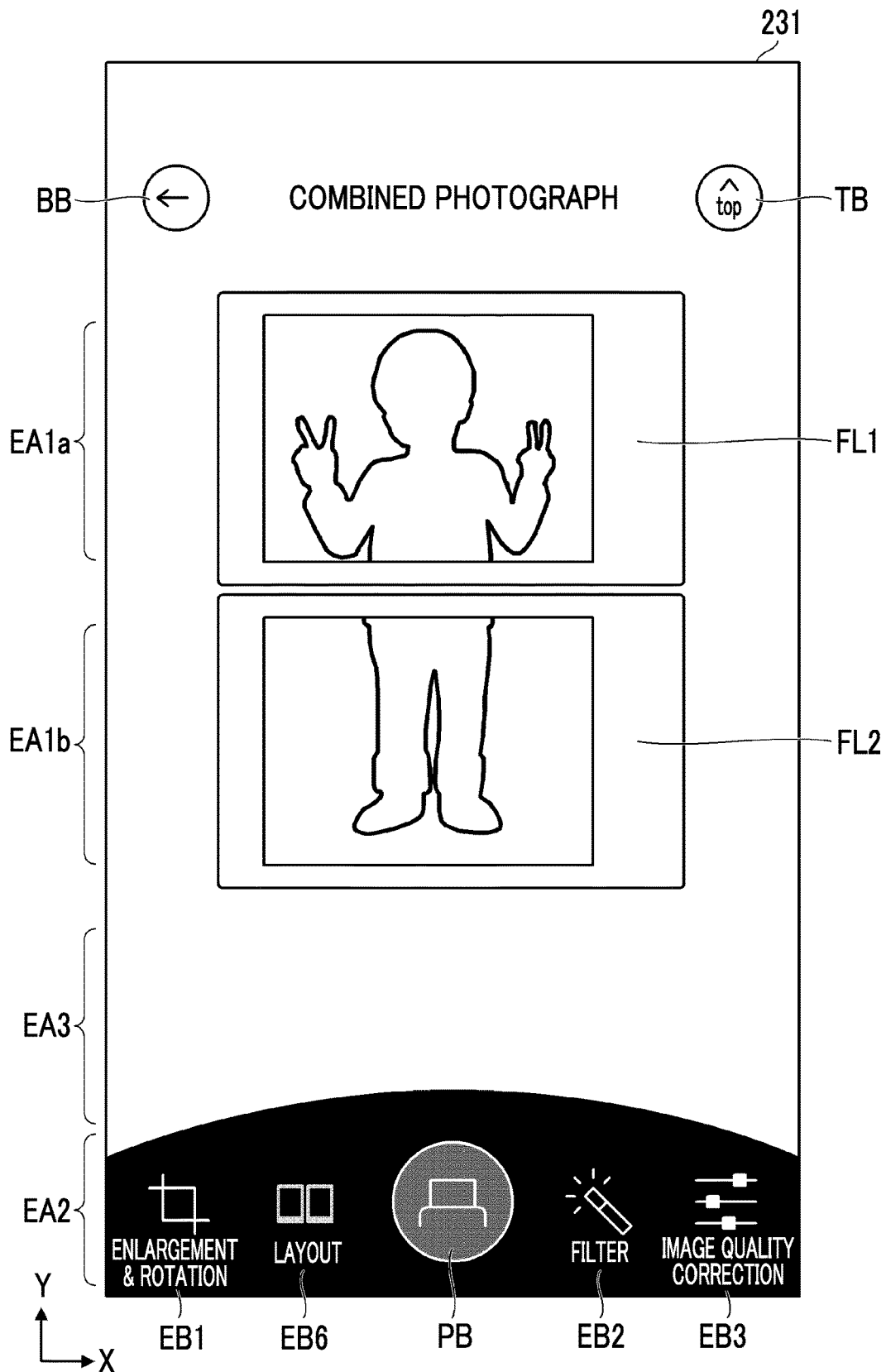
FIG. 30 is a diagram showing an example of a print image confirmation screen of a combined photograph.

FIG. 30 is a diagram showing an example of the print image confirmation screen of the combined photograph.

On the print image confirmation screen 231 of the combined photograph, the image display region is set according to the selected layout. FIG. 30 shows a display example in a case where the combined photograph divided into two upper and lower images is generated. In this case, two image display regions (a first image display region EA1a and a second image display region EA1b) are set. Frames FL1 and FL2 are displayed around the image display regions.

On the print image confirmation screen 231 of the combined photograph, the layout button EB6 is additionally displayed as the image editing menu button. The layout button EB6 is a button for calling a function for changing the layout.

Layout Operation Screen

In a case where the layout button EB6 is touched, the screen is switched to an operation screen (layout change operation screen) 232 for performing a layout change operation.

Figure 31:
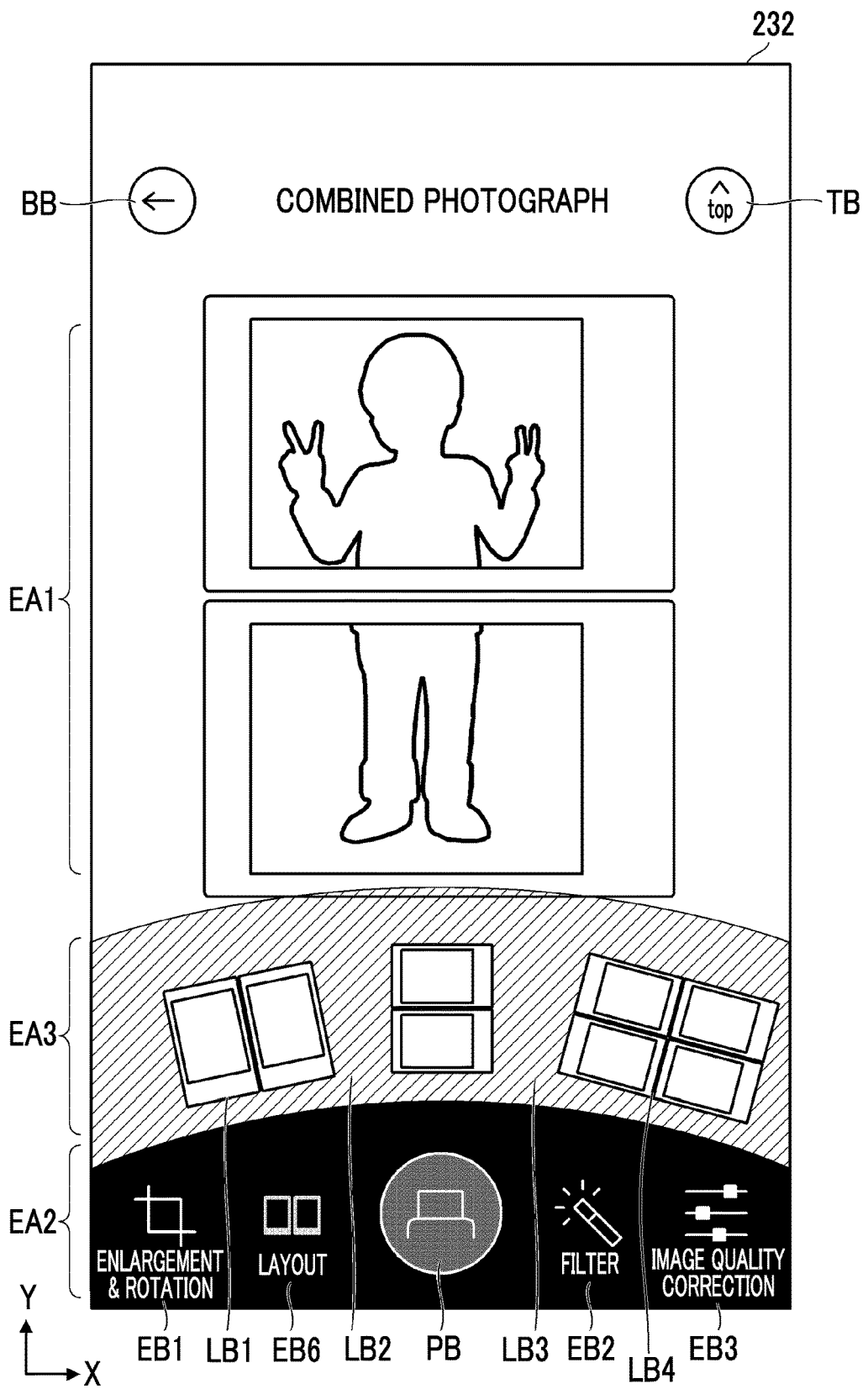
FIG. 31 is a diagram showing an example of the template switching operation screen.

FIG. 31 is a diagram showing an example of a template switching operation screen.

On the layout change operation screen 232, changeable layout selection buttons LB1, LB2, . . . are displayed in addition to the display contents on the print image confirmation screen 231. The user touches and selects the selection button of the layout desired to be changed on the screen. Each button is an image obtained by reducing an image of the layout selected by the button.

Similar to the filter selection buttons, the layout selection buttons LB1, LB2, . . . are expanded and displayed in the operation region EA3, and are displayed radially around a point set at a straight line passing through the center of the screen in the width direction. The display is scrolled by the swipe operation.

Operation Screen in Case Printing is Performed

The execution of the printing is the same as that in a case where the simple printing is performed. That is, the printing is instructed by touching the print button PB on the screen. In a case where the printing is instructed, the image data of the print image is transmitted to the printer 10. An animation showing the image transmission is displayed on the screen.

In the case of the combined photograph, a plurality of images is printed according to the selected layout. Therefore, an animation showing that the images are transmitted one by one is also displayed.

(D) Printing Using Camera Function

Hereinafter, a procedure in a case where the image is printed by using the camera function will be described. The rough processing procedure is (1) imaging and (2) instructing to print. The image is processed and edited as necessary.

Imaging Operation Screen

In a case where the camera button MB3 is touched on the top screen (see FIGS. 13 and 14), the camera function is activated. In a case where the camera function is activated, the screen of the touch panel 120 is switched to an imaging operation screen 240.

Figure 32:
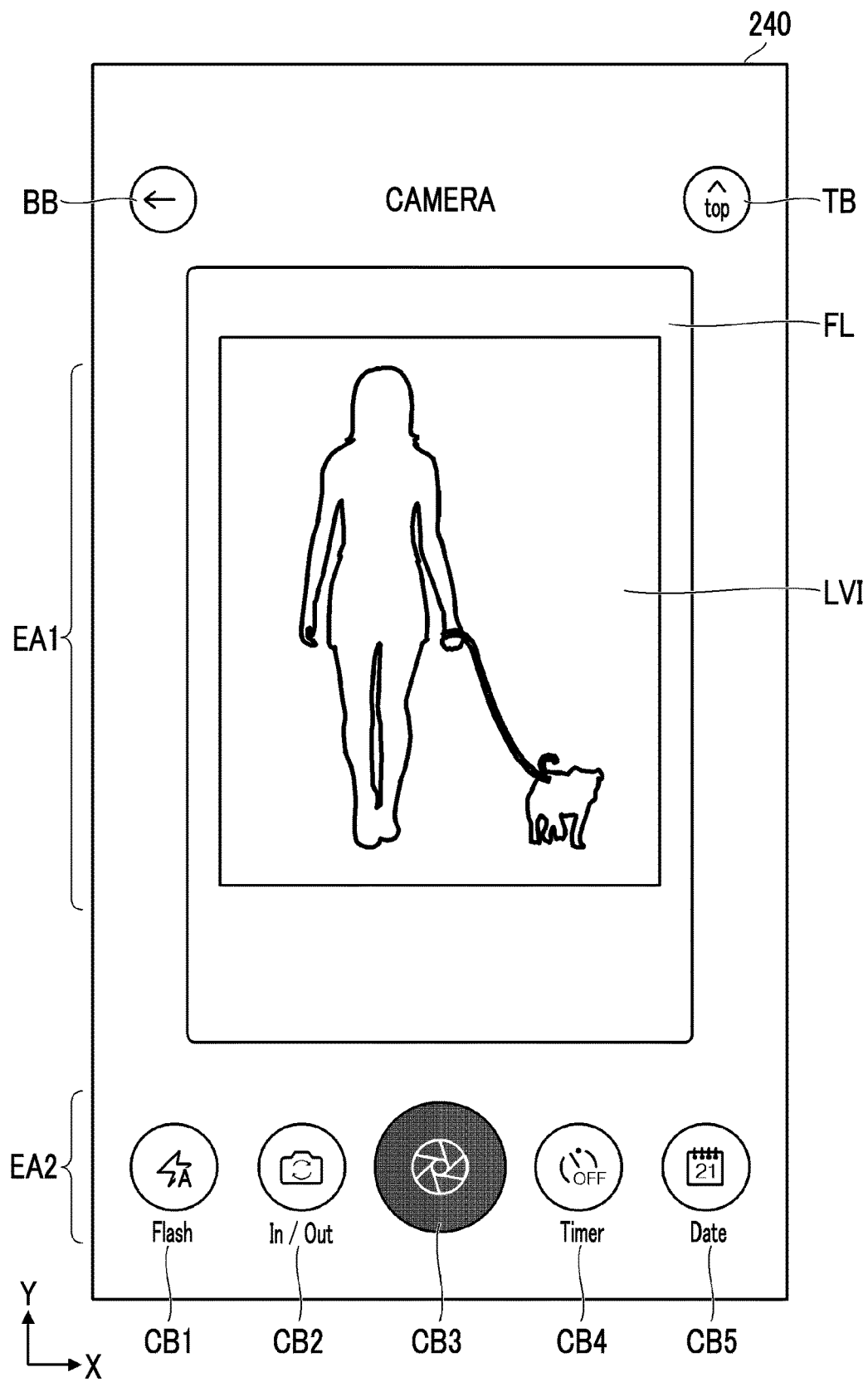
FIG. 32 is a diagram showing an example of an imaging operation screen.

FIG. 32 is a diagram showing an example of the imaging operation screen.

On the imaging operation screen 240, a live view image LVI is displayed in the image display region EA1. Live viewing is a function of displaying a video captured by an image sensor in real time.

On the imaging operation screen 240, camera operation buttons are displayed in the button display region EA2. Specifically, a flash button CB1, an in and out switching button CB2, a shutter button CB3, a timer button CB4, and a date button CB5 are displayed. The flash button CB1 is a button for switching between flash modes. The in and out switching button CB2 is a button for switching between the in-camera and the out-camera. The shutter button CB3 is a button for instructing a release. The timer button CB4 is a button for turning on and off a timer function. The date button CB5 is a button for turning on and off a date function. The date function is a function of imprinting a date on a predetermined position of the print image.

The user performs imaging by touching the shutter button CB3 while viewing the live view image LVI displayed in the image display region EA1.

Print Image Confirmation Screen

In a case where the imaging is executed, the screen of the touch panel 120 is switched to the print image confirmation screen. This screen is the same as the print image confirmation screen 202 in the simple printing. The user processes and edits the image to be printed on this screen as necessary. That is, in a case where the image is not processed and edited, the printing is instructed by touching the print button PB on the screen. In a case where the printing is instructed, the image data of the print image is transmitted to the printer 10. In a case where the image is transmitted, an animation of the image transmission is displayed as in the simple printing (see FIG. 20).

Display of Status Information

In a case where the printer main body 14 is lifted in a state in which the connection between the printer 10 and the smartphone 100 is established, the status information of the printer 10 is displayed on the screen of the smartphone 100.

In a case where the printer main body 14 is lifted, the movement of the printer 10 is detected by the movement detection unit 66. In a case where the movement (third movement) of lifting the printer main body 14 is detected by the movement detection unit 66, the printer 10 collects and acquires the status information. Specifically, the printer acquires the information of the number of printable sheets and the information of the state of charge of the battery. The acquired information is transmitted, as the status information, to the smartphone 100.

In a case where the smartphone 100 receives the status information, the smartphone displays the status information of the printer 10 on the touch panel 120.

Figure 33:
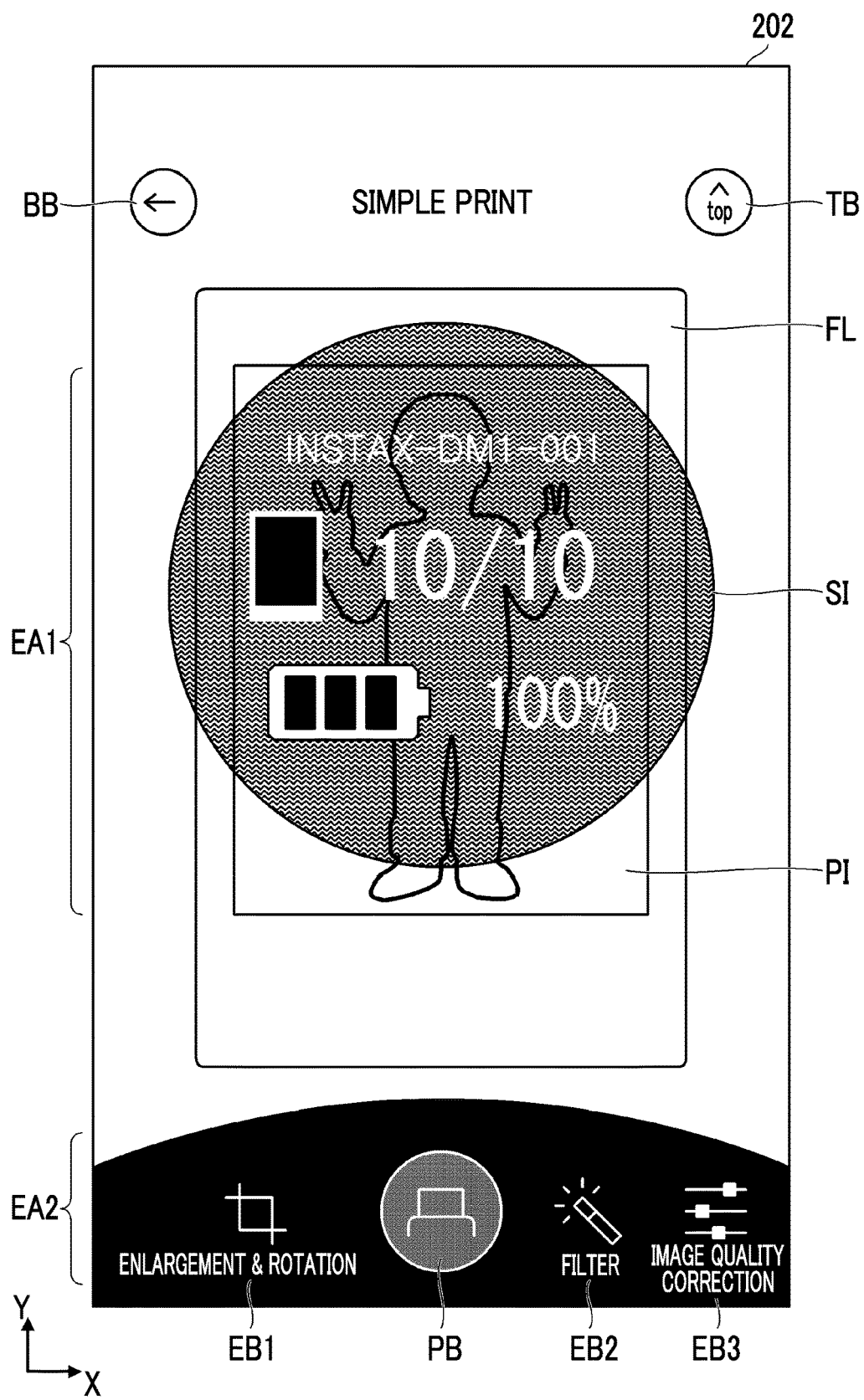
FIG. 33 is a diagram showing an example of display of status information.

FIG. 33 is a diagram showing an example of the display of the status information.

As shown in this diagram, status information SI is displayed so as to be superimposed on the current display. FIG. 33 shows an example in which the printer main body 14 is lifted during the display on the print image confirmation screen 202 in the simple printing.

In the example shown in FIG. 33, an example in which a circle is displayed, and information SI1 of the number of printable sheets (the number of remaining films) and information SI2 of the state of charge of the battery are displayed as the status information in the circle is illustrated. In the example shown in FIG. 32, the name (for example, model name) of the connected printer 10 is also displayed.

As stated above, for example, the status information of the printer 10 is displayed, and thus, the state thereof can be grasped even in a case where a printer having no display such as the printer 10 of the present embodiment is used. Accordingly, the convenience as the system can be improved.

Although the status information is also displayed on the top screen (see FIGS. 13 and 14), the status information SI is displayed similar to a case where the printer main body 14 is lifted during the display on the top screen.

It is preferable that the user can optionally turn on and off the display on the status information SI. That is, it is preferable that a setting performed such that the status information SI is not displayed can be selected even though the printer main body 14 is lifted. It is more preferable that the display can be individually set to be turned on and off in each scene. For example, it is more preferable that the display can be set to constantly be turned off on the top screen. The turning-on or turning-off of the display is set on a setting screen of the print application. The setting screen is called by touching the setting button SEB on the top screen.

Figure 34:
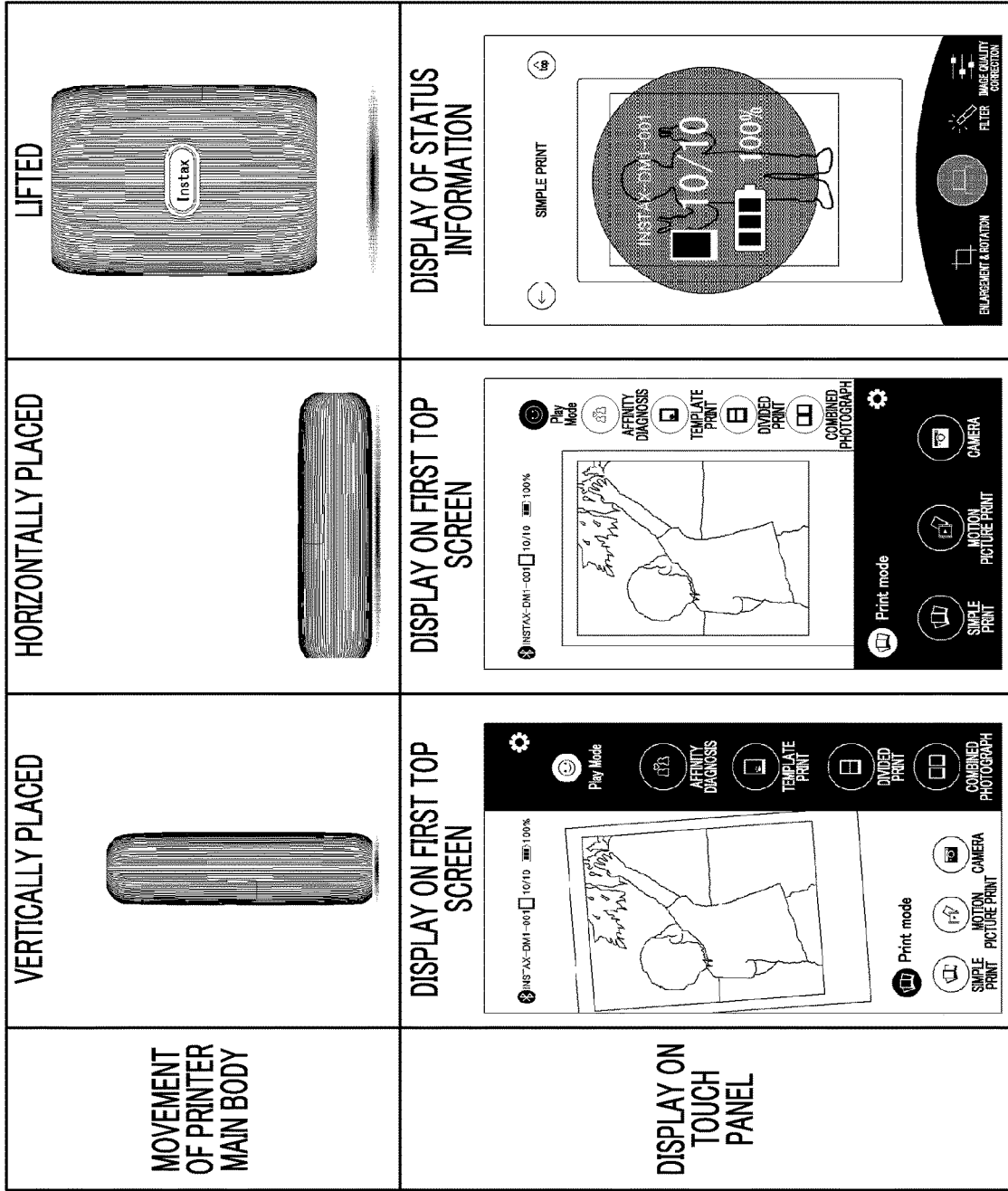
FIG. 34 is a table representing a relationship between a movement of a printer main body and display on a touch panel of the smartphone.

Relationship Between Movement of Printer Main Body and Display on Touch Panel of Smartphone FIG. 34 is a table representing a relationship between the movement of the printer main body and the display on the touch panel of the smartphone.

As represented in this table, in a case where the top screen is displayed on the touch panel 120 of the smartphone 100 and the printer main body 14 is vertically placed, the first top screen 200A is displayed as the top screen. Meanwhile, in a case where the printer main body 14 is horizontally placed, the second top screen 200B is displayed as the top screen.

On the first top screen 200A, the function buttons including the play element and the creation element (the affinity diagnosis button MB4, the template print button MB5, the collage print button MB6, and the combined photograph button MB7) are remarkably displayed with a large size. Therefore, in a case where the user wants to create, the user vertically places the printer main body 14 at the time of displaying the top screen. Accordingly, it is possible to simply activate a target function.

Meanwhile, on the second top screen 200B, the function buttons (the simple print button MB1, the motion picture print button MB2, and the camera button MB3) capable of being simply printed are remarkably displayed with a large size. Therefore, in a case where the user wants to simply print, the user horizontally places the printer main body 14 at the time of displaying the top screen. Accordingly, it is possible to simply activate a target function.

As shown in FIG. 34, in a case where the printer main body 14 is lifted in a state in which the connection between the printer 10 and the smartphone 100 is established, the status information SI is displayed on the screen of the touch panel 120 of the smartphone 100. Accordingly, it is possible to instantaneously grasp the state of the printer 10.

Modification Examples

In a case where the connection of the communication with the printer 10 cannot be established at the time of activating the print application, it is preferable that any one of the first top screen and the second top screen is displayed as the default top screen. For example, in a case where the connection of the communication with the printer 10 cannot be established within a predetermined time after the print application is activated, the first top screen is displayed as the default top screen. The user can select and set the top screen to be displayed in a case where the connection of the communication with the printer 10 cannot be established. Alternatively, the top screen previously displayed may be displayed.

The top screen may be switched in the relationship with the printer 10 only in a case where the print application is activated. That is, in a case where the top screen is displayed again after the print application is activated (for example, in a case where the top screen is displayed by touching the top button TB), the top screen at the time of activation is displayed. For example, in a case where the first top screen is displayed at the time of activation, the first top screen is displayed as the top screen until the print application is ended.

In a case where the installation posture of the printer main body 14 is changed during the display of the top screen, the top screen may be changed according to the change of the installation posture. Accordingly, it is possible to simply perform the switching of the top screen.

Although it has been described in the present embodiment that two types of top screens are prepared, the type of the top screen is not limited thereto. A plurality of types of top screens can be prepared according to the movement of the printer main body 14 to be detected. In a case where the printer main body is horizontally placed, the top screens may be prepared so as to be distinguished between a case where the printer main body is turned upward and a case where the printer main body is turned downward. Movements of the printer main body in a case where a right side surface or a left side surface of the printer main body is turned downward may be detected, and the top screens may be prepared for these cases.

The configuration of the top screen is not limited to that of the aforementioned embodiment, and may be provided according to the functions of the print application.

Although it has been described in the aforementioned embodiment the last printed image is displayed on each top screen, this image may also be omitted. In a case where the last printed image is displayed on the top screen as in the aforementioned embodiment, the image may be functioned as a reprint instruction button. That is, in a case where the user touches the portion of the image, the image is set as the print image, and a simple print screen is activated. Accordingly, a reprint operation can be simply performed on the smartphone side. This image may function as a print history confirmation button. That is, in a case where the user touches the portion of the image, the screen is switched to a screen for reproducing the image printed so far. On the print history reproduction screen, for example, the images printed so far are reproduced in order frame by frame (the images are reproduced from the newest printed image to the oldest printed image frame by frame) according to a frame-frame advance instruction from the user (for example, the swipe operation in the horizontal direction). In order to operate the function, it is necessary to separately retain print history information.

Although it has been described in the aforementioned embodiment that the information of the number of printable sheets and the information of the state of charge of the battery are displayed as the status information of the printer 10, the information displayed as the status information of the printer 10 is not limited thereto. For example, in a case where the printer 10 comprises an image storage unit, information on the number of storable sheets and information on free space may be acquired and displayed.

Although it has been described in the aforementioned embodiment that the status information SI is displayed according to the movement lifting the printer main body 14, the movement assigned to the display of the status information SI is not limited thereto.

In a case where the printer main body comprises a light emitting unit, it is preferable that the light emitting unit emits light in line with the detection of the specific movement. In particular, in a case where the light emitting unit (power button 16) capable of performing color light emission is provided as in the printer 10 of the present embodiment, it is preferable that the light emission controller 80E causes the light emitting unit to emit light in a light emission color and/or a light emission pattern corresponding to the movement detected by the movement detection unit 66. For example, in a case where it is detected that the printer main body 14 is vertically placed, the power button 16 which is the light emitting unit emits red light. Meanwhile, in a case where it is detected that the printer main body is horizontally placed, the power button emits blue light. Accordingly, it is possible to visually recognize that the posture is normally detected.

Second Embodiment

In the printing system of the aforementioned embodiment, the display on the smartphone 100 is controlled according to the movement of the printer main body 14. In the present embodiment, the printing system further controls the operation of the printer itself according to the movement of the printer main body 14. Specifically, the image is reprinted according to a specific movement. The power of the printer 10 is turned off according to a specific movement.

Figure 35:
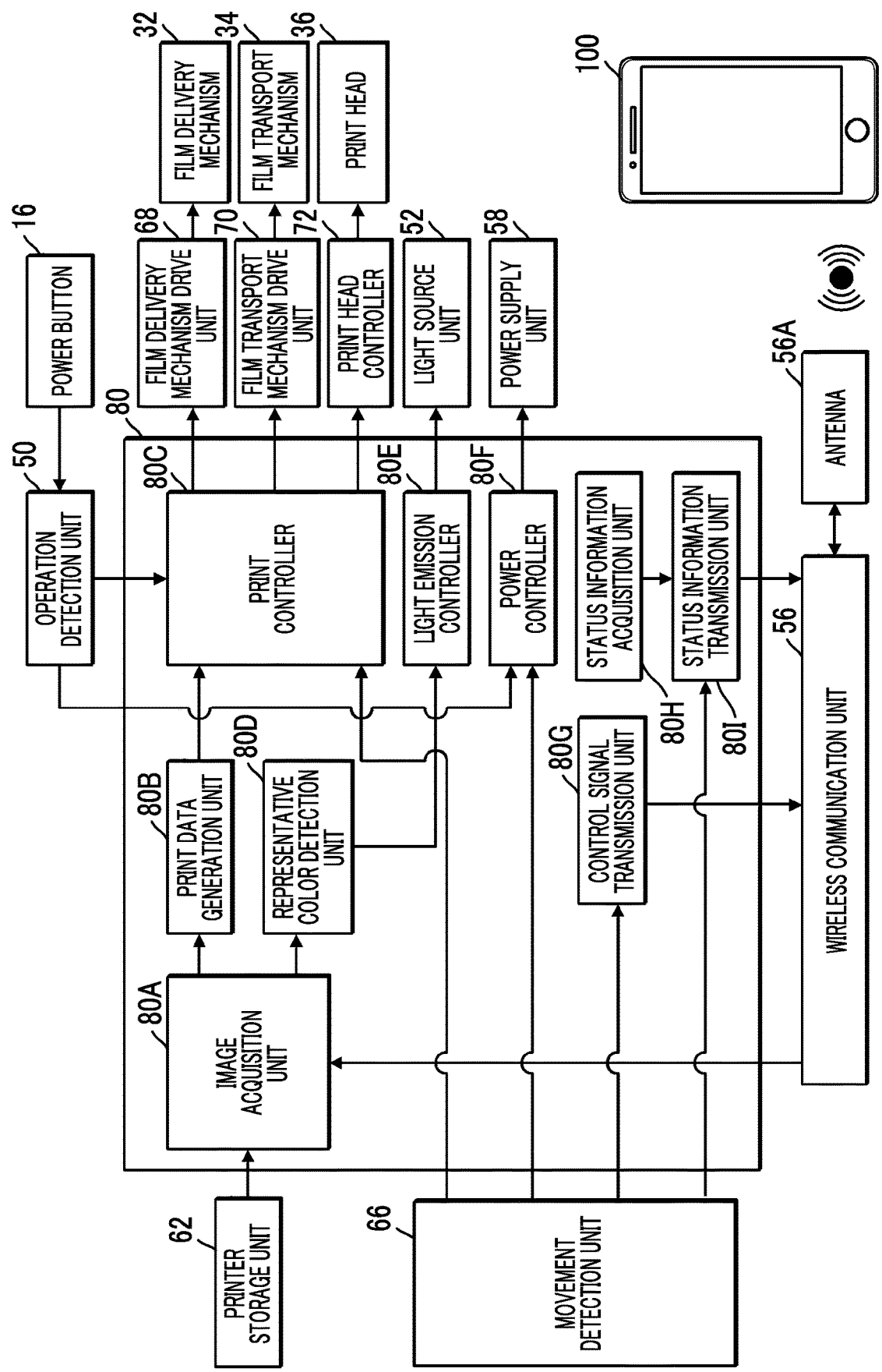
FIG. 35 is a block diagram of main functions realized by a printer microcomputer of the printer.

FIG. 35 is a block diagram of main functions realized by the printer microcomputer of the present embodiment.

The printer of the present embodiment is different from the printer 10 of the aforementioned embodiment in that the print controller 80C reprints the previously printed image based on the detection result of the movement detection unit 66 and the power controller 80F turns off the printer 10 based on the detection result of the movement detection unit 66. Therefore, only this difference will be described below.

In a case where a state in which the printer main body 14 is lifted upside down is continued for a predetermined time, the print controller 80C executes a reprinting process. The movement of lifting the printer main body 14 upside down is a movement (fourth movement) in which the printer main body 14 is lifted and the discharge port 18 is turned downward. The predetermined time is, for example, 5 seconds. The term "turned downward" mentioned herein includes a range recognized to be substantially turned vertically downward. That is, a range recognized to be substantially turned downward is included.

In a case where the movement detection unit 66 detects the movement of lifting the printer main body 14 upside down and this state is maintained for the predetermined time, the image data of the previously printed image is read out from the printer storage unit 62, and is acquired by the image acquisition unit 80A. The acquired image data is provided to the print data generation unit 80B, and is converted into a data format capable of being printed in the printing unit. The print controller 80C acquires the print data from the print data generation unit 80B, and prints the acquired print data on the instant film 12. Accordingly, the previously printed image is reprinted.

In a case where a movement (fifth movement) of directing the power button 16 downward (downward in the vertical direction) by horizontally directing the printer main body 14 is detected by the movement detection unit 66 and this state is maintained for a predetermined time, the power controller 80F turns off the printer 10. The predetermined time is, for example, 10 seconds. Accordingly, for example, in a case where the printer main body is horizontally placed in a state in which the power button 16 is turned downward, the printer is automatically turned off after a predetermined time elapses after the printer is horizontally placed.

Figure 36:
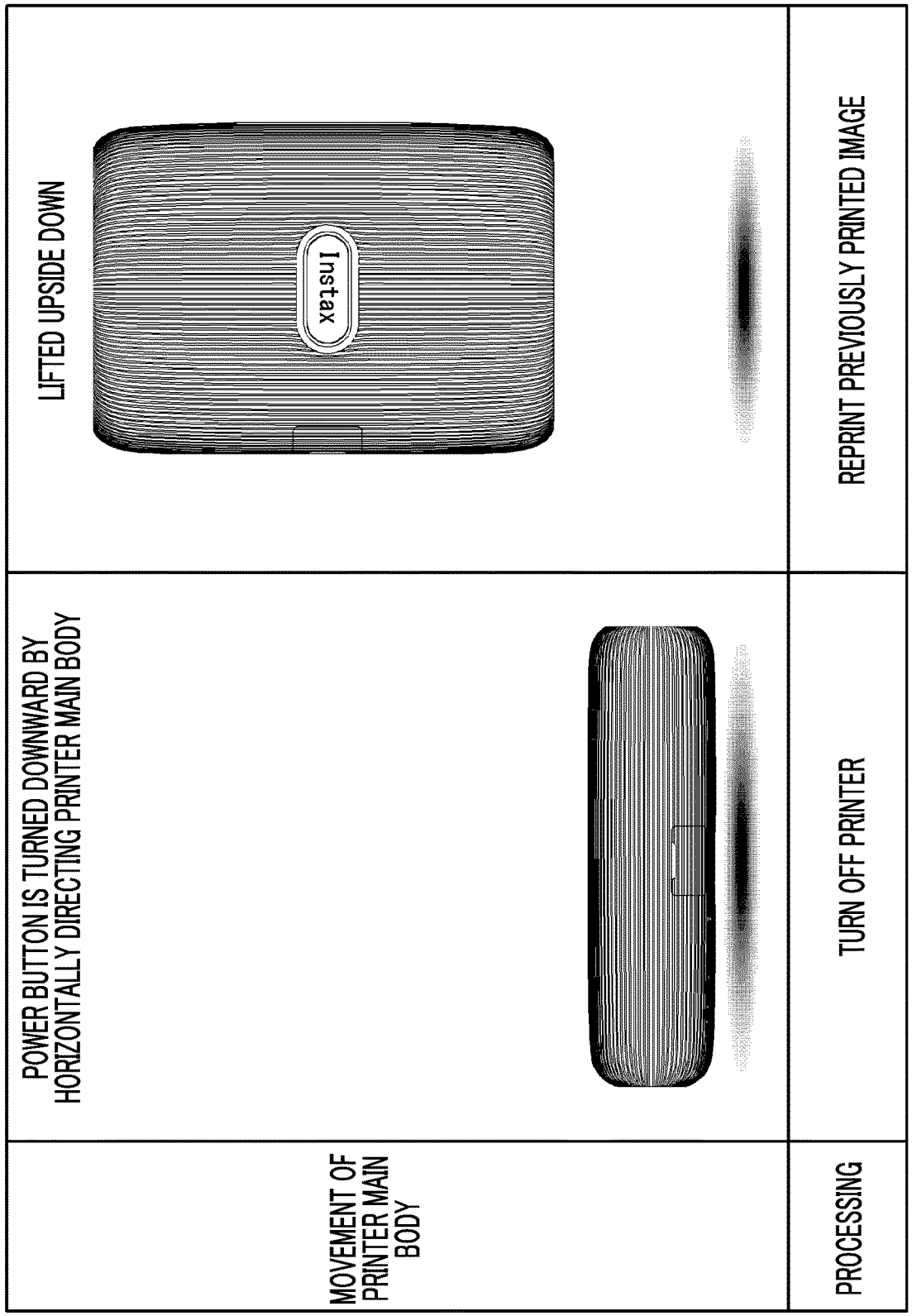
FIG. 36 is a table representing a relationship between the movement of the printer main body and an operation of the printer.

FIG. 36 is a table representing a relationship between the movement of the printer main body and the operation of the printer.

As represented in this table, in a case where the printer main body 14 is lifted upside down and a predetermined time elapses, the previously printed image is reprinted. Accordingly, it is possible to simply perform the reprinting.

As shown in this diagram, in a case where the power button 16 is turned downward by horizontally directing the printer main body 14, the printer 10 is turned off after a predetermined time elapses. For example, in a case where the printer main body 14 is horizontally placed by directing the power button 16 downward, the printer 10 is turned off after a predetermined time elapses. Accordingly, the printer can be simply turned off.

In a case where the printer is turned off by directing the power button 16 downward as in the printer 10 of the present embodiment and the top screen of the print application is changed to the second top screen, the printer main body is horizontally placed by directing the power button 16 upward. The term "turned downward" mentioned herein includes a range recognized to be substantially turned vertically downward. That is, a range recognized to be substantially turned downward is included.

Modification Examples

Although it has been described in the aforementioned embodiment that in a case where the printer main body 14 is set upside down for a predetermined time or more, the previously printed image is reprinted, the operation of the printer main body 14 assigned to the reprinting process is not limited thereto. For example, in a case where the printer main body 14 is tilted upside down for a predetermined time or more, the previously printed image can be reprinted. Preferably, in a case where the printer main body 14 is tilted by directing the discharge port 18 downward within a range of a predetermined angle, the reprinting is performed. For example, the reprinting is performed in a case where the printer main body 14 is tilted by directing the discharge port 18 downward within a range of 30° to 60°. Here, the term "tilted upside down" mentioned herein means a movement of tilting the printer main body 14 by directing the discharge port 18 downward.

The reprinting may be performed by a combination of the movement of directing the printer main body 14 upside down, the movement of tilting the printer main body upside down, and the other movements. For example, the reprinting may be performed by shaking the printer main body 14 up and down after being set upside down for a predetermined time or more. In this case, the number of printed sheets may be set according to the number of times of shaking. For example, in a case where the printer main body 14 is shaken up and down two times after being set upside down for a predetermined time or more, two sheets may be reprinted.

The reprinting may be performed by a combination of the movement and the operation button. For example, in a case where the power button 16 is pressed while the printer main body 14 is set upside down or the printer main body 14 is tilted upside down, the reprinting may be performed.

The same is true of a case where the printer 10 is turned off, and a movement other than the movement of directing the power button 16 downward may be assigned. For example, the movement of tilting the power button 16 downward may be assigned. A combination with other movements may be assigned. The power may be turned off by a combination of the movement and the operation button. For example, in a case where the power button 16 is pressed (short press) by directing the power button 16 downward, the printer can be turned off (the printer is normally turned off by a long press of the power button 16).

The operation content of the printer 10 controlled by the movement of the printer main body 14 is not limited to that of the aforementioned embodiment. It is possible to perform an appropriate setting according to the function of the printer 10.

As in the present embodiment, even in a case where the operation of the printer itself is controlled according to the movement of the printer main body 14, it is preferable that the light emitting unit (power button 16) can emit light according to the detected movement.

Third Embodiment

In the printing system according to the present embodiment, the smartphone 100 is remotely controlled by using the printer 10 as a remote controller of the smartphone 100.

Hereinafter, an example in which the camera function of the smartphone 100 is remotely controlled by the printer 10 will be described.

Figure 37:
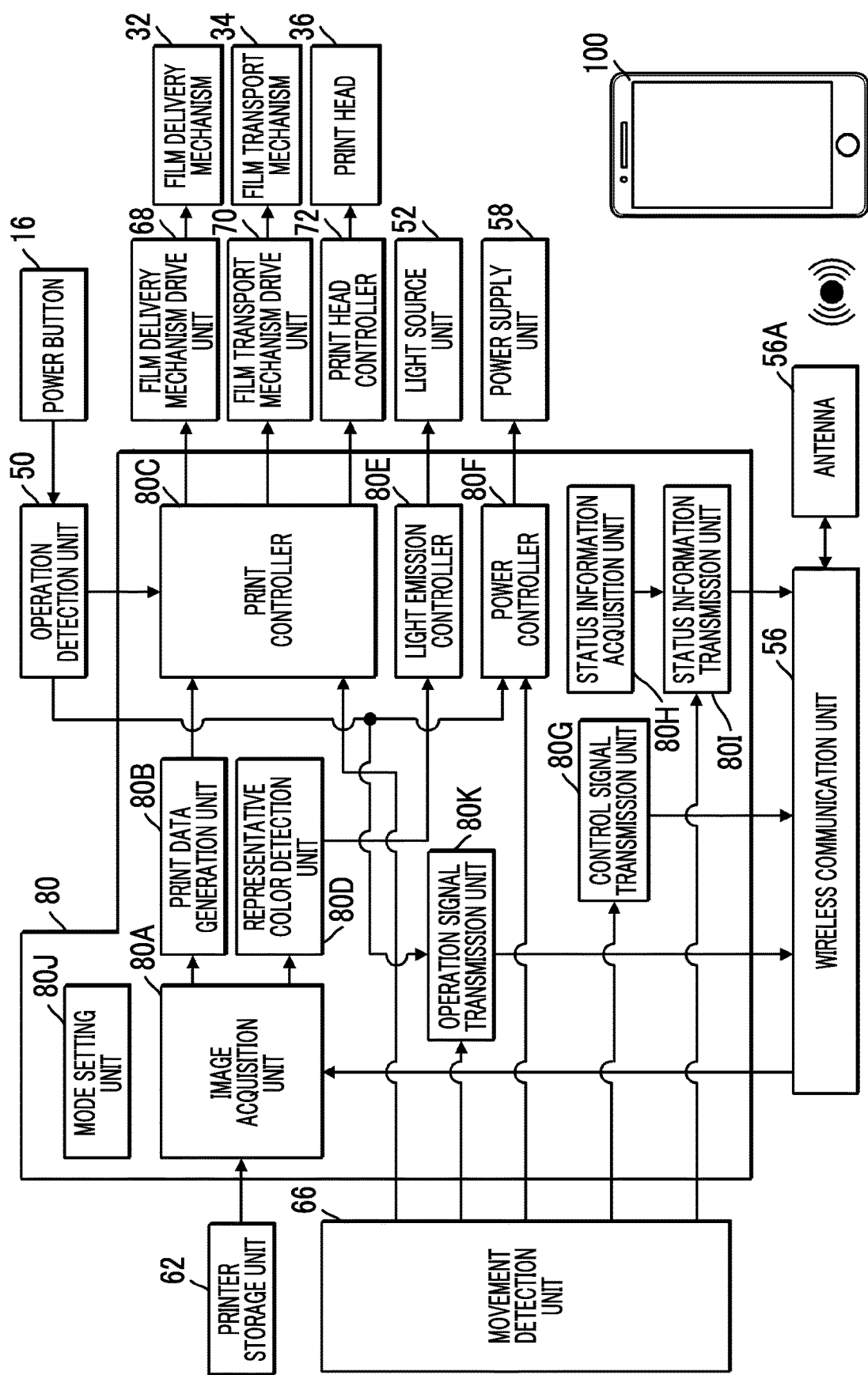
FIG. 37 is a block diagram of main functions realized by the printer microcomputer of the priter.

FIG. 37 is a block diagram of main functions realized by the printer microcomputer of the present embodiment.

As shown in this diagram, the printer microcomputer 80 of the printer 10 of the present embodiment further has functions of a mode setting unit 80J and an operation signal transmission unit 80K.

The mode setting unit 80J sets an operation mode of the printer 10. The printer 10 of the present embodiment has, as the operation mode, a printer mode and a remote control mode. The printer mode is a mode in which the printer 10 is used as a normal printer. The remote control mode is a mode in which the printer 10 is used as the remote controller of the smartphone 100 in a relationship with the smartphone 100.

The mode setting unit 80J sets the operation mode of the printer 10 according to a mode switching command transmitted from the smartphone 100. The printer 10 is activated in the printer mode at the time of turning on the printer. Therefore, the remote control mode is set when a command to switch the remote control mode is received from the smartphone 100. A mode switching operation is performed on the operation screen of the print application. Therefore, the print application has a printer mode setting function as one of menu items.

In a case where the operation mode of the printer 10 is set to the remote control mode, the operation signal transmission unit 80K transmits a signal (operation signal) for operating the smartphone 100 according to the movement of the printer main body 14 detected by the movement detection unit 66 and a button operation of the power button 16. Specifically, an operation signal for operating a zoom of the camera unit (the in-camera unit 108A and the out-camera unit 108B) and an operation signal for operating the release are transmitted.

The zoom is operated by the movement of the printer main body 14. Specifically, the zoom is operated by an operation (seventh movement) of tilting the printer main body back and forth from a standing posture (vertical posture). In the present embodiment, in a case where the printer main body is tilted forward (front side), the zoom is performed to a telephoto side (zoom-in), and in a case where the printer main body is tilted rearward (rear side), the zoom is performed to a wide side (zoom-out). The zoom is step zoom, and the zoom-in and zoom-out is performed at a predetermined zoom magnification whenever the printer main body 14 is tilted. The zoom operation signal is transmitted in a case where the printer main body 14 is tilted within a predetermined angle range. In the present embodiment, the zoom-in is performed in a case where the printer main body is tilted forward in a range of 30° to 60° (range of 45°±15°), and the zoom-in is performed in a case where the printer main body is tilted rearward in a range of 30° to 60° (range of 45°±15°). The zoom method is not particularly limited. In a case where the smartphone 100 to be operated has an optical zoom function, the zoom-in and the zoom-out are performed by an optical zoom. In a case where the smartphone 100 to be operated has only an electronic zoom function, the zoom-in and the zoom-out are performed by an electronic zoom. In a case where the smartphone 100 to be operated has both the optical zoom and electronic zoom functions, both the zoom functions may be used. For example, after the zoom-in is performed to a telephoto end by the optical zoom, in a case where the zoom-in is further performed, the zoom function is switched to the electronic zoom. Only one of these zooms may function by the setting of the user.

In a case where the movement detection unit 66 detects that the printer main body 14 is tilted forward, the operation signal transmission unit 80K transmits a zoom-in operation signal to the smartphone 100 via the wireless communication unit 56. In a case where the movement detection unit 66 detects that the printer main body 14 is tilted rearward, the operation signal transmission unit 80K transmits a zoom-out operation signal to the smartphone 100 via the wireless communication unit 56.

In a case where the operation detection unit 50 detects that the button operation of the power button 16 is a short press, the operation signal transmission unit 80K transmits a release operation signal to the smartphone 100 via the wireless communication unit 56.

In a case where the operation mode of the printer 10 is set to the printer mode and the smartphone 100 receives the zoom operation signal from the printer 10, the smartphone operates the zoom of the camera unit (the in-camera unit 108A or the out-camera unit 108B) via the imaging controller 100C. In a case where the release operation signal is received, the smartphone performs a recording imaging process via the imaging controller 100C.

The imaging controller 100C of the smartphone 100 is an example of a terminal controller. The communication controller 100F is an example of an operation signal reception unit.

Figure 38:
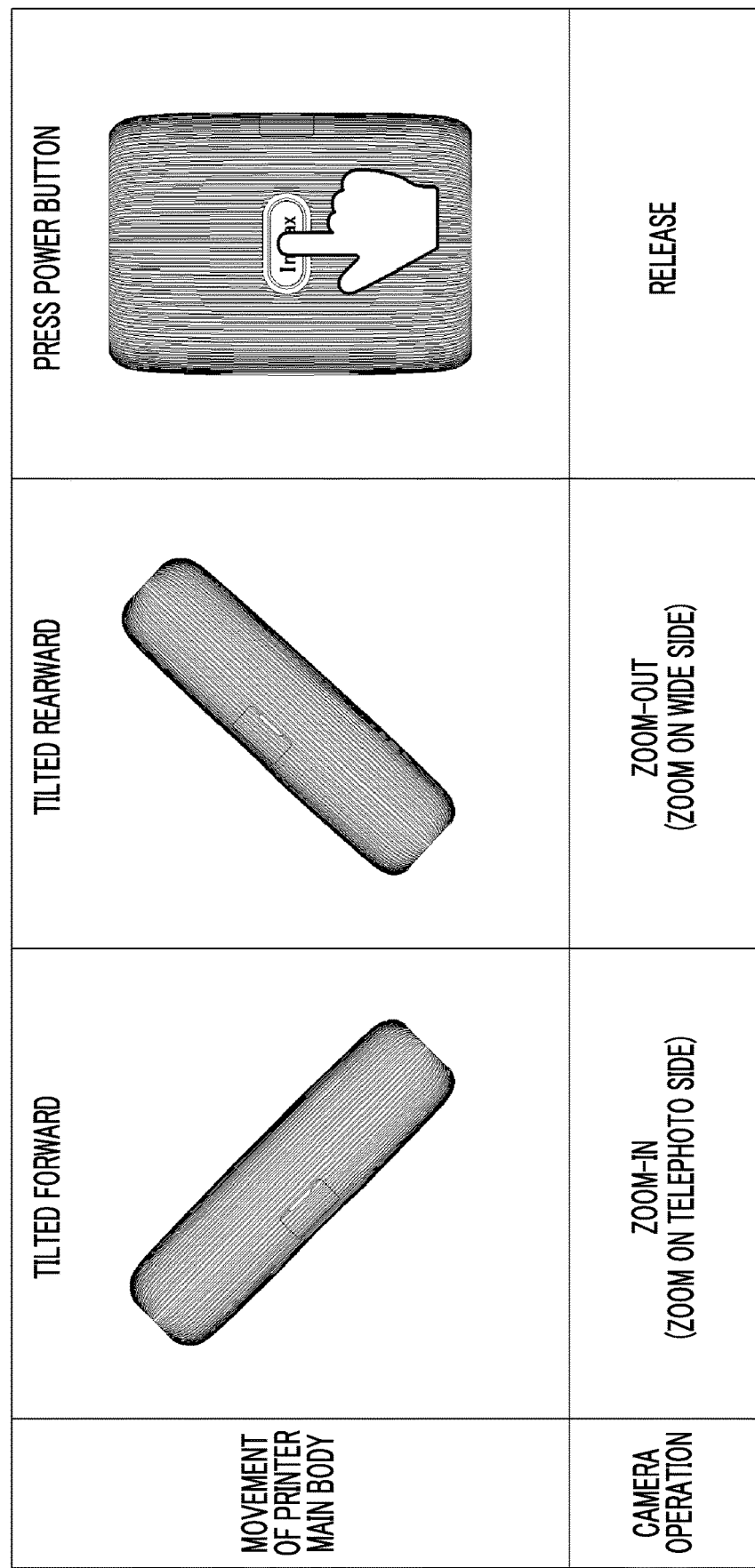
FIG. 38 is a table representing a relationship between the movement of the printer main body and a camera operation of the smartphone in a remote control mode.

FIG. 38 is a table representing a relationship between the movement of the printer main body and the camera operation of the smartphone in the remote control mode.

As shown in this diagram, in a case where the operation mode of the printer 10 is set to the remote control mode and the printer main body 14 is tilted forward, the zoom-in operation signal is transmitted from the printer 10 to the smartphone 100. The smartphone 100 receives the zoom-in operation signal, and operates the zoom of the camera unit (the in-camera unit 108A or the out-camera unit 108B) to the telephoto side.

In a case where the printer main body 14 is tilted rearward, the zoom-out operation signal is transmitted from the printer 10 to the smartphone 100. The smartphone 100 receives the zoom-out operation signal, and operates the zoom of the camera unit to the wide side.

In a case where the power button 16 is operated (short press), the release operation signal is transmitted from the printer 10 to the smartphone 100. The smartphone 100 receives the release operation signal, and executes the recording imaging process.

As stated above, according to the printing system of the present embodiment, the printer 10 can be used as the remote controller of the smartphone 100. Accordingly, the convenience at the time of imaging can further be improved.

Modification Examples

Although it has been described in the aforementioned embodiment that the zoom of the camera unit of the smartphone 100 is operated by the operation of tilting the printer main body 14 back and forth, the operation assigned to the operation of the zoom is not limited thereto. For example, the operation of the zoom of tilting the printer main body left and right can be performed. The zoom may be operated by operating the operation member provided at the printer main body. The zoom can be operated by a combination of the operation member provided at the printer main body and the movement.

Although it has been described in the aforementioned embodiment that the zoom-in and the zoom-out are performed at a predetermined zoom magnification whenever the printer main body 14 is tilted, the zoom operation mode is not limited thereto. For example, it is possible to perform continuously zoom while tilting.

Although it has been described in the aforementioned embodiment that the release is operated by operating the power button 16, the operation assigned to the release operation is not limited thereto. For example, the release operation may be assigned to the specific movement (sixth movement) of the printer main body 14. For example, the release can be operated by shaking the printer main body 14 up and down. The release may be operated by a combination of the specific movement of the printer main body 14 and the operation of the operation member.

Although it has been described in the aforementioned embodiment that the camera unit of the smartphone 100 is remotely operated by the printer 10, the target to be operated is not limited thereto. For example, in image reproduction, the frame-frame advance and/or frame-frame return can be operated by tilting the printer main body 14 back and forth.

In a case where the camera unit is remotely operated, the operation to be remotely controlled is not limited to the zoom and the release. Other operations can also be used as the target. For example, switching of imaging modes (a shutter speed priority mode, a stop priority mode, and an auto mode), switching of shutter speeds, switching of F numbers, and switching of sensitivity may be remotely operated by the movement of the printer main body 14 and/or the operation of the operation member provided at the printer main body 14.

The user can optionally set the operation of the smartphone 100 and the movement of the printer main body 14 assigned to this operation (a so-called customization function). For example, in addition to the operation of tilting the printer main body 14 as described above, an operation of shaking the printer main body up and down, an operation of shaking the printer main body back and forth, an operation of shaking the printer main body left and right, an operation of diagonally shaking the printer main body, an operation of directing the printer main body upside down, and an operation of directing the printer main body inside out can be employed as the operation to be assigned. These operations may be combined with the operation of the operation member provided at the printer main body 14. In a case where the assignment is performed, the movement to be assigned may be actually performed and detected by the movement detection unit 66, and the detected movement may be assigned to a specific operation. For example, in a case where the operation of tilting the printer main body 14 back and forth is assigned to the operation of the zoom of the camera unit, the operation of actually tilting the printer main body 14 back and forth is performed, this movement is detected by the movement detection unit 66, and is assigned to the operation of the zoom. Accordingly, movement habits of each user can be reflected, and usability can be further improved.

In the present embodiment, it is also preferable that the light emitting unit (power button 16) emits light according to the detected movement of the printer main body 14.

Although it has been described in the aforementioned embodiment that the terminal (smartphone 100) is remotely operated by the printer 10, the same operation system (system for remotely operating the terminal) can be constituted by using a device having a function of detecting the movement of the main body (a device comprising the movement detection unit). For example, the operation system that operates the terminal can be constituted by a portable electronic device comprising the movement detection unit that detects the movement of the main body. In particular, it is possible to constitute the operation system that operates the terminal comprising the camera unit by the movement of the portable electronic device or the operation of the operation member provided at the portable electronic device.

Other Embodiments

Animation Display for Switching Screen

In a case where the installation posture of the printer main body 14 is changed during the display of the top screen, it is preferable that the switching of the screen is displayed by animation. For example, in a case where the installation posture of the printer main body 14 is switched from the vertical placement to the horizontal placement during the display of the first top screen 200A, the top screen is switched from the first top screen 200A to the second top screen 200B, but it is preferable that the switching is displayed by animation. Similarly, in a case where the installation posture of the printer main body 14 is switched from the horizontal placement to the vertical placement during the display of the second top screen 200B, the top screen is switched from the second top screen 200B to the first top screen 200A, but it is preferable that the switching is displayed by animation.

Figure 39:
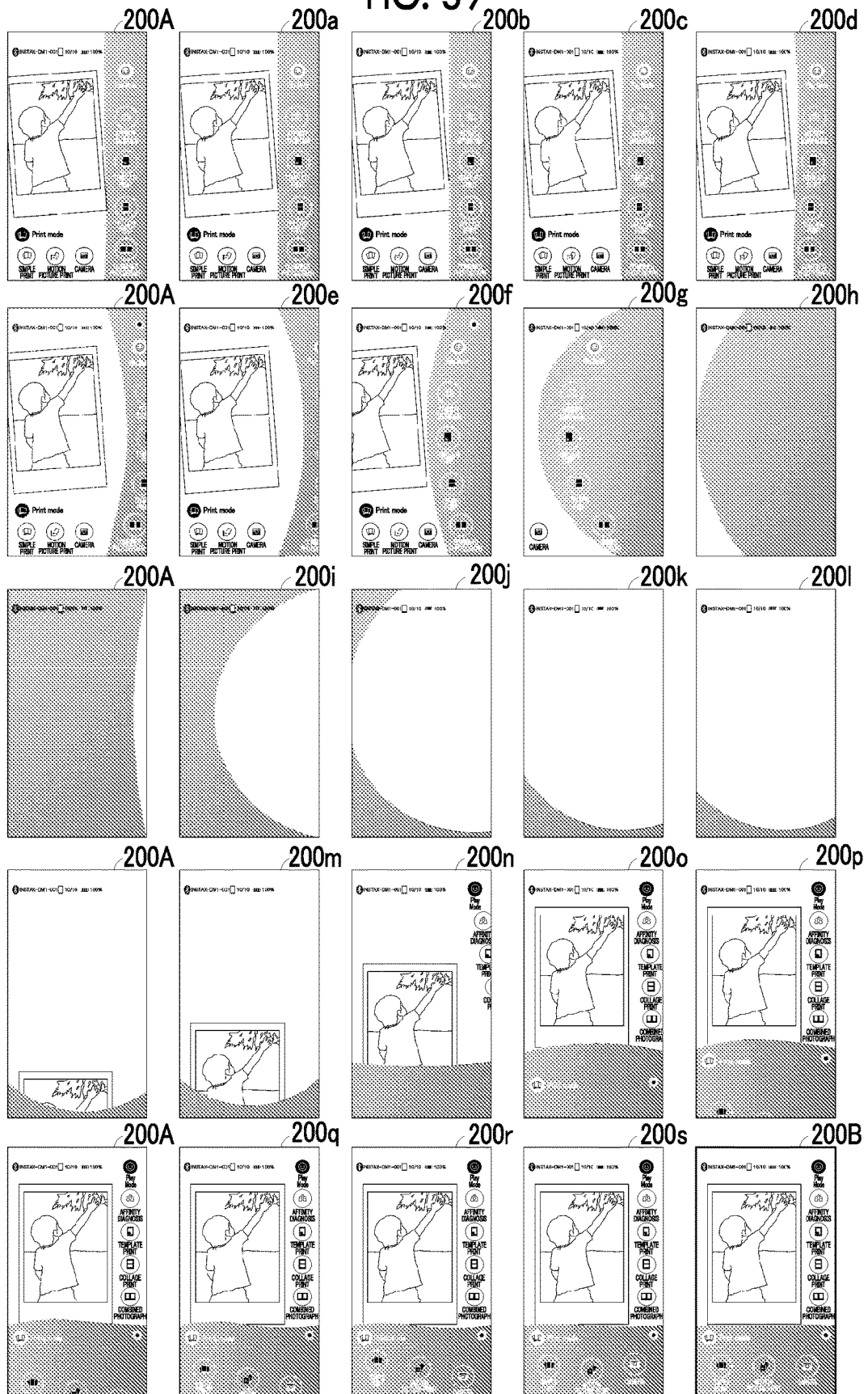
FIG. 39 is a diagram showing an example of animation display for switching the top screen.

FIG. 39 is a diagram showing an example of animation display for switching the top screen. This diagram shows scenes in which animations are switched are displayed in a sequence of time (are displayed frame by frame predetermined intervals).

In a case where the switching is performed from the first top screen 200A to the second top screen 200B, the screen is changed in the order of a screen 200a, a screen 200b, . . . , a screen 200r, and a screen 200s, and is switched to the second top screen 200B. Meanwhile, in a case where the switching is performed from the second top screen 200B to the first top screen 200A, the screen is changed in the order of the screen 200s, the screen 200r, . . . , the screen 200b, and the screen 200a, and is switched to the first top screen 200A.

As stated above, the switching of the screen is displayed by animation, and thus, the switching can be clearly grasped. Accordingly, operability can be further improved. The user can easily recognize that the screen is switched depending on the installation posture of the printer main body 14, and an intuitive operation can be performed. The user can enjoy the operation.

Modification Example of Print Instruction Operation

In the aforementioned embodiment, the print button PB displayed in the button display region EA2 is touched, and thus, the printing of the image displayed in the image display region EA1 is instructed. Instead of the method or in addition to the method, the printing may be instructed by the following method. That is, the printing is instructed by swiping or flicking the screen on the print image PI displayed on the image display region EA1 or on the frame FL.

Figure 40:
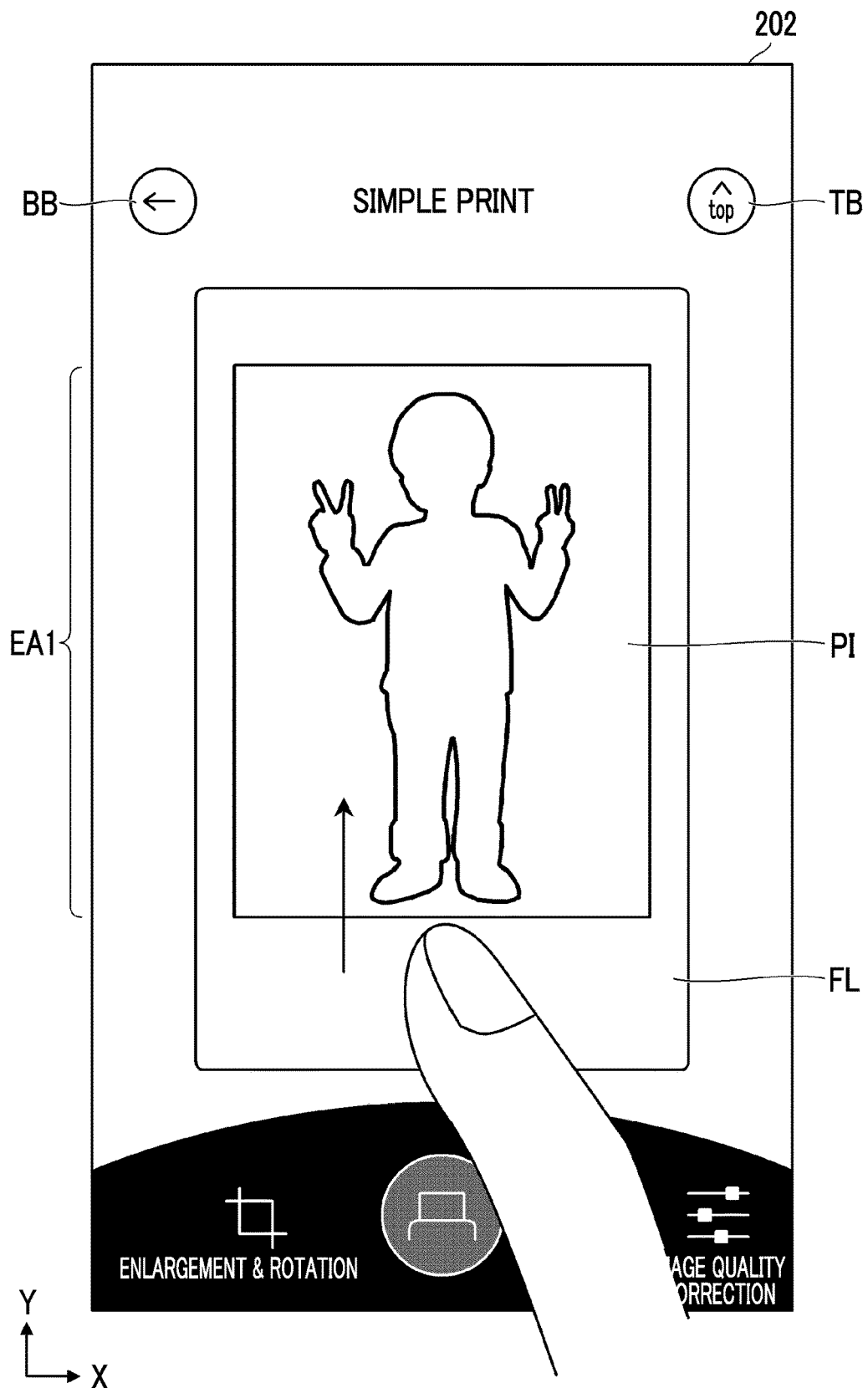
FIG. 40 is a conceptual diagram of an operation in a case where printing is instructed by a flick operation.

FIG. 40 is a conceptual diagram of the operation in a case where the printing is instructed by the flick operation.

As shown in this diagram, the user touches the top of the frame FL displayed on the screen with the finger and slides so as to flip upward, and thus, the printing is instructed.

As described above, in a case where the printing is instructed, an animation of the image transmission is displayed. The movement direction of the print image PI at the time of animation display coincides with the operation direction of the print instruction. Accordingly, it is possible to perform an intuitive operation, and operability can be further improved.

Cancelation of Printing

It is preferable that the printing can be canceled if necessary. In particular, the convenience of the printing system can be further improved by canceling the printing before the printing is started.

A method of displaying a button for instructing to cancel the printing on the screen can be employed as a method of instructing to cancel the printing on the portable terminal side.

Figure 41:
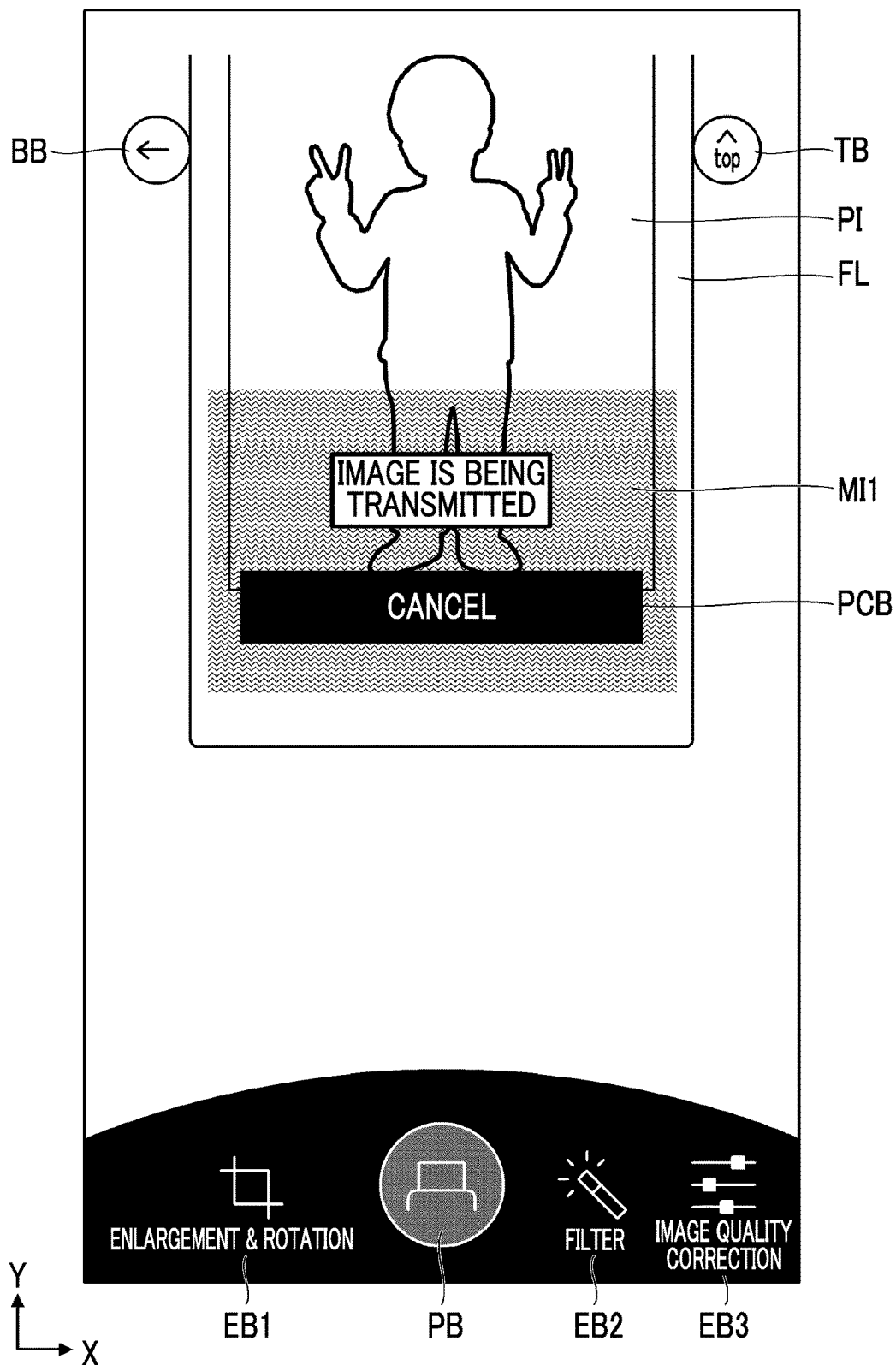
FIG. 41 is a diagram showing an example of a screen for accepting an input instruction to cancel the printing.

FIG. 41 is a diagram showing an example of a screen for accepting an input instruction to cancel the printing. This diagram shows an example of a screen in a case where the cancelation of the printing is accepted during the transmission of the image.

As described above, in a case where the printing is instructed, an animation of the image transmission is displayed. A message MI1 ("image is being transmitted") indicating that the image is being transmitted and a print cancel button PCB are displayed so as to be superimposed on the print image PI at the time of the animation display. The print cancel button PCB is a button for instructing to cancel the printing. The print cancel button PCB is a button with a text of cancel in a rectangular frame.

The message MI1 and the print cancel button PCB move together with the print image PI during the animation display. Therefore, the message and the print cancel button will eventually disappear from the upper edge of the screen. The print cancel button PCB is touched during the display, and thus, the printing is canceled.

In a case where the print cancel button PCB is touched after the printing is instructed and the printing is canceled, the print image PI moves in the reverse direction, and returns to the original position. That is, the print cancel button moves downward and returns to the position before the start of the movement (see screen 206A in FIG. 20).

The print cancel button PCB is displayed as stated above, and thus, it is possible to cancel the printing. Further, it is possible to grasp a time limit, and operability can be further improved.

Modification Example of Operation Method of Image Processing on Screen

Operations such as the enlargement and rotation of the image to be printed may be performed by a predetermined gesture. For example, the image is enlarged and reduced by performing pinch-out and pinch-in operations on the image displayed in the image display region EA1. The swipe operation is performed on the image displayed in the image display region EA1, and thus, the image is moved in the operation direction. The image displayed in the image display region EA1 is rotated (twisted) while touching the image with two fingers (for example, a thumb and an index finger), and thus, the image is rotated. The pinch-in operation refers to an operation of moving the screen so as to pick while touching the screen with two fingers (for example, a thumb and an index finger). The pinch-out operation refers to an operation of moving the screen so as to enlarge while touching the screen with two fingers (for example, a thumb and an index finger).

In a case where operations such as enlargement, movement, and rotation with a gesture on the screen as stated above, it is preferable that the function is turned on and off. For example, the function can be turned on and off by touching the frame FL surrounding the print image PI. In this case, the function is alternately turned on and off whenever the frame FL is touched.

In a case where operations such as enlargement, movement, and rotation with the gesture on the screen, it is preferable that an operation guide screen is displayed.

Figure 42:
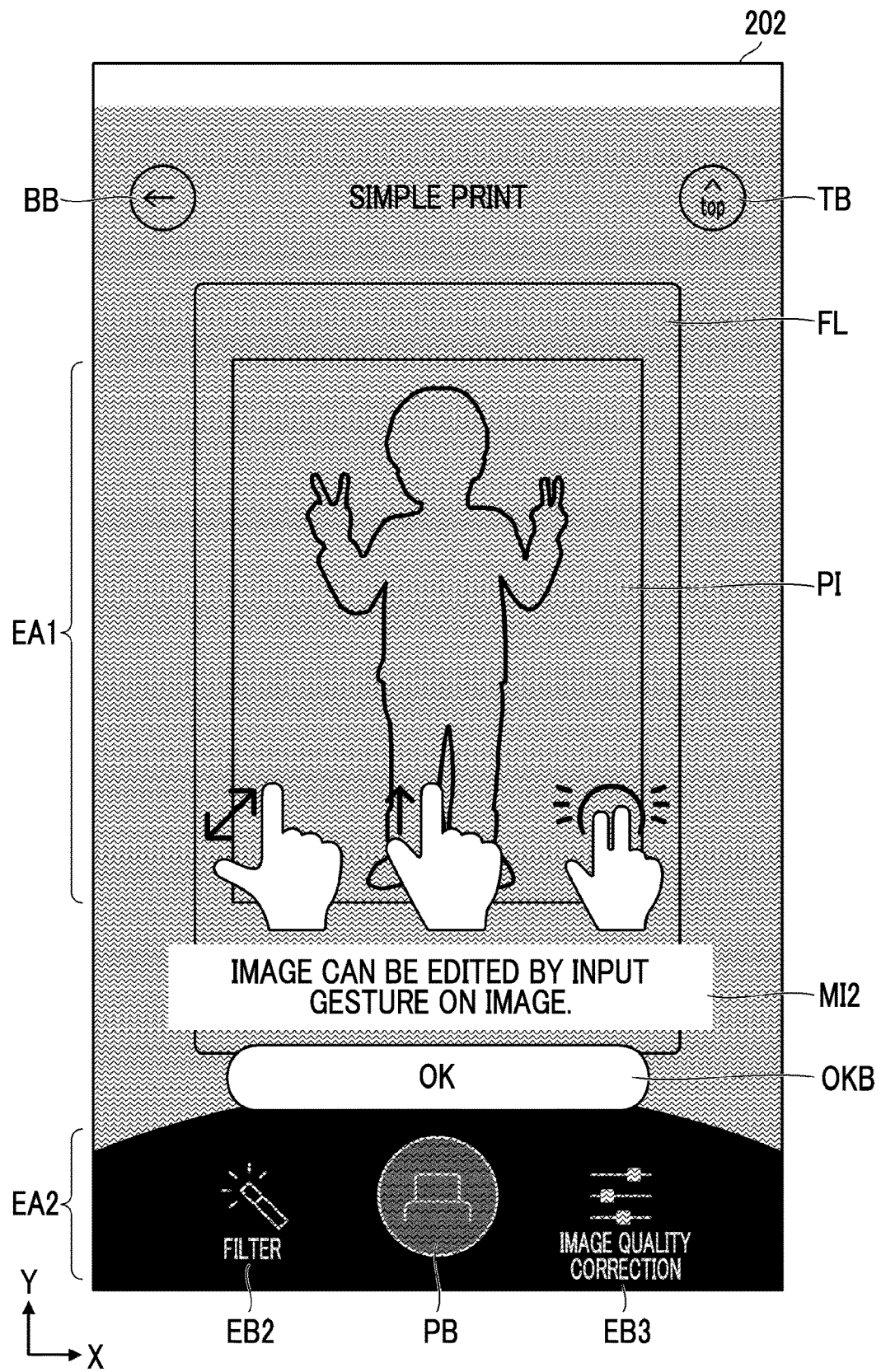
FIG. 42 is a diagram showing an example of an operation guide screen.

FIG. 42 is a diagram showing an example of the operation guide screen.

As shown in this diagram, a message MI2 indicating that the image can be enlarged, moved, and rotated by the gesture on the screen ("the image can be edited by inputting a gesture on the image.") is displayed on the print image confirmation screen 202. For example, this message MI2 is displayed in a case where the print image confirmation screen 202 is first displayed.

In the example shown in FIG. 42, an OK button OKB is displayed to prompt the user to confirm. The message MI2 disappears from the screen in a case where the OK button OKB is touched. It is preferable that the message MI2 can be displayed or cannot be displayed by setting.

As in the present example, in a case where the image is enlarged and rotated by the gesture on the screen, the display of a button (enlargement & rotation button EB1) for calling the enlargement and rotation function can be omitted. FIG. 42 shows an example in which the display of the enlargement & rotation button is omitted.

Modification Example of Button Layout

Although it has been described in the aforementioned embodiment that the print button PB is disposed at a straight line passing through the center in the width direction in the button display region EA2, the type of the button disposed at the straight line passing through the center in the width direction is not limited thereto. Other function buttons may be arranged.

However, the print button PB is disposed at the straight line passing through the center in the width direction and is displayed with a size larger than other buttons on the operation screen for performing the operations related to the printing. Accordingly, it is possible to clearly perform the print instruction operation.

Although it has been described in the aforementioned embodiment that only the print button PB and the image editing menu button are displayed in the button display region EA2, buttons having functions other than these functions may be displayed in the button display region EA2. For example, the setting button SEB may be displayed.

Modification Example of Image Editing Menu

Although it has been described in the aforementioned embodiment that the image editing menu has the enlargement and rotation function, the filter function, and the image quality correction function, the present invention is not limited thereto. Instead of the aforementioned items, or in addition to the aforementioned items, other image editing operations may be performed. For example, noise removal and sharpness change may be performed.

Text may be written on the image, a picture may be drawn, or a stamp may be pressed by using the touch panel (so-called drawing mode). A keyboard may be displayed on the screen, and thus, the input text can be copied. For example, the text may be copied in a margin region.

Operation Screen in Case Printer is Not Connected

In a case where the printer 10 is not connected (in a case where communication with the printer 10 is not established), a communication connection button may be displayed on each operation screen instead of the displayed print button.

Figure 43:
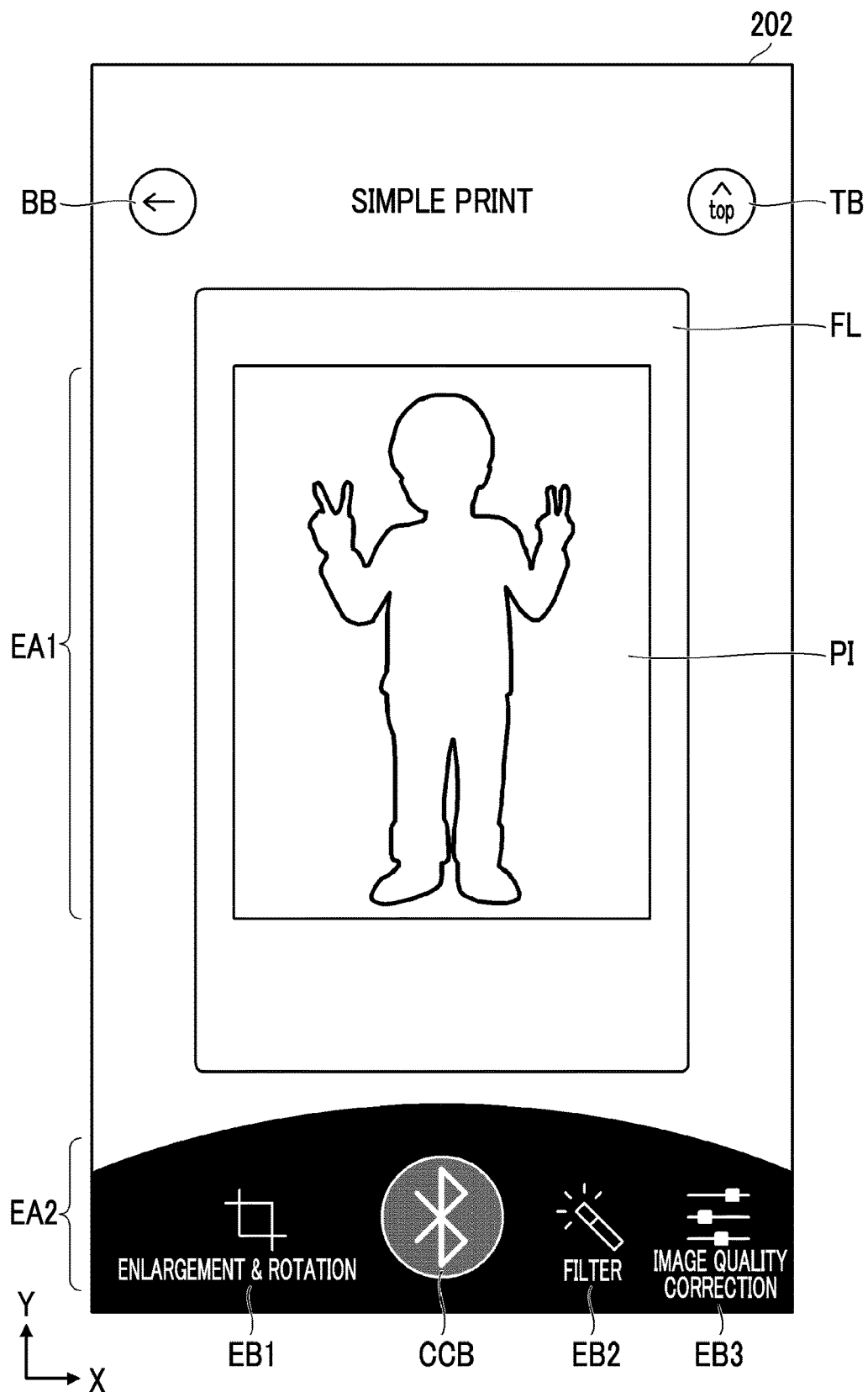
FIG. 43 is a diagram showing an example of display of a communication connection button.

FIG. 43 is a diagram showing an example of display of the communication connection button. This diagram shows an example in a case where the communication connection button is displayed on the operation screen of the simple print function.

As shown in this diagram, a communication connection button CCB is displayed instead of the print button. The communication connection button CCB is a button for performing communication connection with the printer 10. In a case where the communication connection button CCB is touched, a process of detecting the printer 10 capable of performing communication is performed, and a process of establishing communication with the detected printer 10 is performed. At this time, a screen for setting the communication is displayed on the touch panel 120 of the smartphone 100. For example, the printers capable of performing the communication are displayed as a list, and a screen for selecting the printer to be connected is displayed.

Other Examples of Printer

Although it has been described in the aforementioned embodiment that the printer is the instant printer, the configuration of the printer is not limited thereto. For example, the present invention can be applied to various types of printers such as a thermal printer that prints on thermosensitive paper, a thermal transfer printer that prints using an ink ribbon, and an inkjet printer that prints using an inkjet method. The type of a medium to be used is not particularly limited, and the present invention can be applied to a printer that prints on roll paper in addition to sheets of paper. The present invention can be applied to a printer that prints on a label (including a sticker).

Although it has been described in the aforementioned embodiment that the present invention is applied to the mobile printer, the application of the present invention is not limited thereto. The present invention can also be applied to a so-called stationary printer.

Other Examples of Terminal

Although it has been described in the aforementioned embodiments that the terminal is the smartphone, the terminal to which this invention is applied is not limited thereto. The present invention can be similarly applied to any device that is wirelessly connected to the printer and includes the screen for performing the operation. Accordingly, the present invention can be applied to, for example, a tablet type terminal, a personal data assistant (PDA), and a mobile computer such as a laptop personal computer and the like can be used as the terminal in addition to the smartphone. A digital camera having a wireless communication function can be used as the terminal in addition to these mobile computers. In this case, the operation screen is displayed on a monitor (such as a rear monitor) provided at the digital camera, and the printer is operated. Similarly, a portable game machine or a cellular phone having the wireless communication function can be used as the terminal.

Hardware Configurations of Controllers of Printer and Terminal

The functions of the controllers of the printer and the terminal can be realized by various processors. Various processors include a central processing unit (CPU) which is a general purpose processor functioning as various processing units by executing a program, a programmable logic device (PLD) which is a processor capable of changing a circuit configuration after a field programmable gate array (FPGA) is manufactured, and a dedicated electric circuit which is a processor having a circuit configuration designed as a dedicated circuit in order to perform specific processing such as application specific integrated circuit (ASIC). One processing unit constituting an inspection support apparatus may be constituted by one of the various processors described above, or may be constituted by two or more processors of the same type or different types. For example, one processing unit may be constituted by a plurality of FPGAs or a combination of a CPU and an FPGA. Alternatively, the plurality of processing units may be constituted by one processor. Firstly, as the example in which the plurality of processing units is constituted by one processor, there is a form in which one processor is constituted by a combination of one or more CPUs and software and this processor functions as the plurality of processing units as represented by computers such as a client and a server. Second, a processor that realizes the functions of the entire system including the plurality of processing units by using one integrated circuit (IC) chip is used so as to be represented by a System On Chip (SoC). As stated above, various processing units are constituted as hardware structure by using one or more of various processors. More specifically, hardware structures of the various processors are an electric circuitry obtained by combining circuit elements such as semiconductor elements.

Modification Example of Communication Aspect

Although it has been described in the aforementioned embodiment that the printer and the portable terminal communicate with each other through short range wireless communication, the communication method is not particularly limited. A known wireless communication method can be employed.

Movement Detection Unit

Any movement detection unit may be used as long as the movement detection unit 66 detects at least the assigned movement. Therefore, the movement detection unit may be only an acceleration sensor or only a gyro sensor depending on the movement to be detected.

Operation Member Provided at Printer

Although it has been described in the printer of the aforementioned embodiment that the printer main body comprises only the power button as the operation member, the printer may comprise other operation members (so-called mechanical switches). For example, a reprint button for performing the reprinting may be separately provided.

As in the aforementioned embodiment, the configuration can be simplified by using only the power button as the operation member provided at the printer main body.

Modification Example of Light Emitting Unit

Although it has been described in the printer of the aforementioned embodiment that the power button is configured to emit light, the light emitting unit may be separately provided. The light emitting unit may be provided at multiple locations.

EXPLANATION OF REFERENCES

10: printer
12: instant film
12*a*: exposure surface
12*b*: observation surface
12*c*: exposure region
12*d*: pod portion
12*e*: developing solution pod
12*f*: trap portion
12*g*: absorbent
12*h*: observation region
12*i*: frame
14: printer main body
16: power button
18: discharge port
20: film pack lid
22: unlock lever
24: USB cable connection portion cover
30: film pack loading chamber
32: film delivery mechanism
32*a*: claw
34: film transport mechanism
34A: transport roller pair
34B: spreading roller pair
36: print head
40: film pack
42: case
42*a*: exposure opening
42*b*: film discharge port 42c: claw opening portion
50: operation detection unit
52: light source unit
56: wireless communication unit
56A: antenna
58: power supply unit
62: printer storage unit
66: movement detection unit
68: film delivery mechanism drive unit
70: film transport mechanism drive unit
72: print head controller
80: printer microcomputer
80A: image acquisition unit
80B: print data generation unit
80C: print controller
80D: representative color detection unit
80E: light emission controller
80F: power controller
80G: control signal transmission unit
80H: status information acquisition unit
80I: status information transmission unit
80J: mode setting unit
80K: operation signal transmission unit
100: smartphone
100A: display controller
100B: input controller
100C: imaging controller
100D: reproduction controller
100E: image processing unit
100F: communication controller
101: CPU
102: ROM
103: RAM
104: built-in memory
105: display
106: touch pad
107: GPS reception unit
108A: in-camera unit
108B: out-camera unit
109: microphone unit
110: speaker unit
111: wireless communication unit
111A: antenna
112: short range wireless communication unit
112A: antenna
113: sensor unit
114: media drive
115: memory card
120: touch panel
200: top screen
200A: first top screen
200B: second top screen
200a to 200s: screens constituting one frame of animation for switching between top screens
201: image selection screen
201A: cancel button
202: print image confirmation screen
203: rotation operation screen
204: filter operation screen
205: image quality correction operation screen
206A to 206C: screens constituting one frame of animation in case printing is instructed
210: template selection screen
212: template switching operation screen
220: divided frame selection screen
221: collage image creation screen
222: divided frame switching operation screen
230: layout selection screen
231: print image confirmation screen
232: layout change operation screen
240: imaging operation screen
BB: back button
CB1: flash button
CB2: in and out switching button
CB3: shutter button
CB4: timer button
CB5: date button
CCB: communication connection button
E3: operation region
EA1: image display region
EA1a: first image display region
EA1b: second image display region
EA2: button display region
EA3: operation region
EB1: rotation button
EB2: filter button
EB3: image quality correction button
EB4: template button
EB5: divided frame button
EB6: layout button
F: delivery direction of instant film
FB1: normal button
FB2: monochrome button
FB3: sepia button
FB4: auto button
FBB: borderline button
FBL: borderline
FL: frame surrounding print image
FL1: frame surrounding images constituting combined photograph
FL2: frame surrounding images constituting combined photograph
FLO: image display frame
LB1, LB2, . . . : layout selection button
LIM: last printed image
LVI: live view image
MA1: first group display region
MA2: second group display region
MA3: status information display region
MB1: simple print button
MB2: motion picture print button
MB3: camera button
MB4: affinity diagnosis button
MB5: template print button
MB6: collage print button
MB7: combined photograph button
MG1: first group
MG2: second group
MI1: message
MI2: message
NB1: knob of enlargement slide bar
NB2: knob of rotation slide bar
NB3: knob of brightness adjustment slide bar
NB4: knob of contrast adjustment slide bar
NB5: knob of saturation adjustment slide bar
OKB: OK button
PB: print button
PI: print image
R+: scroll direction
R−: scroll direction
RSB: reset button
S1 to S10: processing procedure of display of top screen in case print application is activated
SB1: enlargement slide bar SB2: rotation slide bar
SB3: brightness adjustment slide bar
SB4: contrast adjustment slide bar
SB5: saturation adjustment slide bar
SEB: setting button
SFB1: divided frame selection button
SFB2: divided frame selection button
SI: status information
SI1: information of number of printable sheets (remaining films)
SI2: information of state of charge of battery
TB: top button
TB1, TB2, . . . : template image selection button

What is claimed is:

1. An operation system comprising:
a terminal; and
a portable electronic device capable of wirelessly communicating with the terminal,
wherein the portable electronic device includes:
   a main body;
   a movement detection unit that detects a movement of the main body; and
   a first processor configured to transmit an operation signal corresponding to the movement detected by the movement detection unit to the terminal,
wherein the terminal includes:
   a second processor configured to receive the operation signal from the portable electronic device and control an operation of the terminal according to the received operation signal,
wherein the first processor is further configured to:
   set the operation of the terminal to be controlled by the second processor according to the received operation signal; and
   assign the movement of the main body that is being detected by the movement detection unit to the set operation of the terminal.

2. The operation system according to claim 1, wherein:
the terminal further includes a camera unit; and
the second processor is configured to control an operation of a zoom of the camera unit according to the received operation signal.

3. The operation system according to claim 2, wherein:
the movement detected by the movement detection unit is a movement indicating that the main body is tilted; and
the first processor is configured to transmit the operation signal for the zoom of the camera unit according to the detected movement indicating that the main body is tilted.

4. The operation system according to claim 3, wherein the first processor is configured to transmit the operation signal for the zoom at a predetermined zoom magnification whenever the movement indicating that the main body is tilted is detected.

5. The operation system according to claim 3, wherein the first processor is configured to transmit the operation signal for the zoom while the movement indicating that the main body is tilted is being detected.

6. The operation system according to claim 3, wherein the first processor is configured to transmit the operation signal for the zoom in a case where the movement indicating that the main body is tilted within a predetermined angle range is detected.

7. The operation system according to claim 3, wherein the first processor is configured to:
transmit the operation signal for the zoom to zoom-in in a case where the movement indicating that the main body is tilted toward a first direction is detected; and
transmit the operation signal for the zoom to zoom-out in a case where the movement indicating that the main body is tilted toward a second direction opposite to the first direction is detected.

8. The operation system according to claim 3, wherein:
the portable electronic device further includes an operation member on the main body; and
the first processor is configured to transmit the operation signal for the zoom according to the detected movement indicating that the main body is tilted while the operation member is operated.

9. The operation system according to claim 1, wherein:
the terminal further includes a camera unit; and
the second processor is configured to control an operation of a release of the camera unit according to the received operation signal.

10. The operation system according to claim 9, wherein:
the movement detected by the movement detection unit is a movement indicating that the main body is shaken; and
the first processor is configured to transmit the operation signal for the release of the camera unit according to the detected movement indicating that the main body is shaken.

11. The operation system according to claim 10, wherein:
the portable electronic device further includes an operation member on the main body; and
the first processor is configured to transmit the operation signal for the release according to the detected movement indicating that the main body is shaken while the operation member is operated.

12. The operation system according to claim 1, wherein:
the terminal further includes a display unit; and
the second processor is configured to control an operation of image reproduction of the display unit according to the received operation signal.

13. The operation system according to claim 12, wherein:
the movement detected by the movement detection unit is a movement indicating that the main body is tilted; and
the first processor is configured to transmit the operation signal for frame-frame advance and/or frame-frame return in the image reproduction of the display unit according to the detected movement indicating that the main body is tilted.

14. The operation system according to claim 1, wherein:
the terminal further includes a camera unit; and
the second processor is configured to control an operation of a zoom, a release, a switching of imaging modes, a switching of shutter speeds, a switching of F numbers, or a switching of sensitivity, of the camera unit according to the received operation signal.

15. The operation system according to claim 1, wherein:
the portable electronic device further includes an operation member on the main body; and
the first processor is configured to assign the movement of the main body combined with an operation of the operation member.

16. The operation system according to claim 1, wherein:
the portable electronic device further includes a light emitting unit; and
the first processor is configured to control the light emitting unit to emit light according to the movement detected by the movement detection unit.

17. The operation system according to claim 1, wherein:
- the terminal is composed of a smartphone, a tablet type terminal, a personal data assistant, a mobile computer including a laptop personal computer, a digital camera, a portable game machine, a cellular phone, or a mobile printer; and
- the portable electronic device is composed of a smartphone, a tablet type terminal, a personal data assistant, a mobile computer including a laptop personal computer, a digital camera, a portable game machine, a cellular phone, or a mobile printer.

18. An operation method of operating a terminal with a portable electronic device capable of wirelessly communicating with the terminal, the method comprising:
- at a side of the portable electronic device, detecting a movement of a main body of the portable electronic device, and transmitting an operation signal corresponding to the detected movement to the terminal; and
- at a side of the terminal, receiving the operation signal from the portable electronic device, and controlling an operation of the terminal according to the received operation signal,
- wherein the method further comprises, at a side of the portable electronic device:
  - setting the operation of the terminal to be controlled at the side of the terminal according to the received operation signal; and
  - assigning the movement of the main body that is being detected to the set operation of the terminal.

\* \* \* \* \*